US012671069B2

(12) United States Patent
Hoyes

(10) Patent No.: US 12,671,069 B2
(45) Date of Patent: Jun. 30, 2026

(54) MASS SPECTROMETER AND METHOD

(71) Applicant: TRUEMASS LTD, High Peak (GB)

(72) Inventor: John Brian Hoyes, High Peak (GB)

(73) Assignee: TRUEMASS LTD, High Peak (GB)

( * ) Notice: Subject to any disclaimer, the term of this patent is extended or adjusted under 35 U.S.C. 154(b) by 322 days.

(21) Appl. No.: 18/554,024

(22) PCT Filed: Apr. 7, 2022

(86) PCT No.: PCT/GB2022/050871
§ 371 (c)(1),
(2) Date: Oct. 5, 2023

(87) PCT Pub. No.: WO2022/214815
PCT Pub. Date: Oct. 13, 2022

(65) Prior Publication Data

US 2024/0136167 A1 Apr. 25, 2024

(30) Foreign Application Priority Data

Apr. 7, 2021 (GB) ...................................... 2104932

(51) Int. Cl.

*H01J 49/02* (2006.01)
*H01J 49/00* (2006.01)
*H01J 49/06* (2006.01)
*H01J 49/42* (2006.01)

(52) U.S. Cl.

CPC ........ *H01J 49/027* (2013.01); *H01J 49/0045* (2013.01); *H01J 49/4245* (2013.01); *H01J 49/061* (2013.01); *H01J 49/067* (2013.01)

(58) Field of Classification Search

CPC .. H01J 49/027; H01J 49/0045; H01J 49/4245; H01J 49/061; H01J 49/067
See application file for complete search history.

(56) References Cited

U.S. PATENT DOCUMENTS 5,770,857 A 6/1998 Fuerstenau et al.
6,300,625 B1 10/2001 Ishihara
9,082,604 B2 7/2015 Verenchikov
2005/0045817 A1 3/2005 Yamaguchi et al.
(Continued)

FOREIGN PATENT DOCUMENTS

GB 2476964 7/2011
GB 2476964 A 7/2011
(Continued)

OTHER PUBLICATIONS

Benner, W., "A Gated Electrostatic Ion Trap To Repetitiously Measure the Charge and m/z of Large Electrospray Ions," Analytical Chemistry, Oct. 15, 1997, vol. 69, No. 20, pp. 4162-4168.
(Continued)

*Primary Examiner* — Nicole M Ippolito
(74) *Attorney, Agent, or Firm* — DP IP GROUP; Franco S. De Liguori

(57) ABSTRACT

A charge detection mass spectrometer, CDMS, is described. The CDMS comprises: an electrostatic sector field ion trap and an inductive charge detector, wherein the electrostatic sector field ion trap is configured to define, at least in part, an ion path via the inductive charge detector; and a fragmentation device. A method is also described.

18 Claims, 25 Drawing Sheets

(56) References Cited

U.S. PATENT DOCUMENTS

| | | | | |
|---|---|---|---|---|
| 2009/0166527 | A1 | 7/2009 | Makarov | |
| 2010/0301199 | A1* | 12/2010 | Chen | H01J 49/10 250/288 |
| 2011/0192971 | A1 | 8/2011 | Yamaguchi | |
| 2012/0305760 | A1* | 12/2012 | Blick | H01J 49/025 250/282 |
| 2016/0077054 | A1* | 3/2016 | Giles | G01N 27/622 250/282 |
| 2021/0050200 | A1* | 2/2021 | Song | H03F 3/087 |
| 2024/0290605 | A1* | 8/2024 | Hoyes | H01J 49/4245 |
| 2024/0404810 | A1* | 12/2024 | Hoyes | H01J 49/0036 |

FOREIGN PATENT DOCUMENTS

| | | | |
|---|---|---|---|
| GB | 2598591 | | 3/2022 |
| GB | 2598591 | A | 3/2022 |
| GB | 2605775 | | 8/2025 |
| JP | 2011146180 | A | 7/2011 |
| WO | 2007104992 | A2 | 9/2007 |
| WO | 2007122378 | A2 | 11/2007 |
| WO | WO2007/122378 | | 11/2007 |
| WO | 2007122378 | A3 | 8/2008 |
| WO | 2012083031 | A1 | 6/2012 |
| WO | 2017042665 | A1 | 3/2017 |
| WO | 2022049388 | A1 | 3/2022 |

OTHER PUBLICATIONS

Contino et al., "Charge detection mass spectrometry for single ions with a limit of detection of 30 charges," International Journal of Mass Spectrometry, 2013, vol. 345-347, pp. 153-159.

Doussineau et al., "Infrared multiphoton dissociation tandem charge detection-mass spectrometry of single megadalton electrosprayed ions," Review of Scientific Instruments, 2011, vol. 82, pp. 1-9.

Guilhaus et al., "Orthogonal Acceleration Time-of-Flight Mass Spectrometry," Mass Spectrometry Reviews, 2000, vol. 19, pp. 65-107.

Hawkes et al., "Charged Particles in Electromagnetic Fields," Advances in Imaging and Electron Physics, 2019, vol. 157, pp. 1-388.

Hogan et al., "Optimized Electrostatic Linear Ion Trap for Charge Detection Mass Spectrometry," Journal of American Society for Mass Spectrometry, 2018, pp. 1-10.

PCT International Search Report and Written Opinion for International Application No. PCT/GB2022/050871, dated Jul. 5, 2022, 14 pages.

Keifer et al., "Charge Detection Mass Spectrometry with Almost Perfect Charge Accuracy," Analytical Chemistry, 2015, vol. 87, pp. 10330-10337.

Keifer et al., "Charge detection mass spectrometry: weighing heavier things," Analyst, 2017, vol. 142, pp. 1654-1671.

Nikolaev et al., "Analysis of harmonics for an elongated FTMS cell with multiple electrode detection," International Journal of Mass Spectrometry and Ion Processes, 1996, vol. 157-158, pp. 215-232.

Nishiguchi et al., "Design of a new multi-turn ion optical system 'IRIS' for a time-of-flight mass spectrometer," Journal of Mass Spectrometry, 2009, vol. 44, pp. 594-604.

Poschenrieder, "Multiple-Focusing Time-of-Flight Mass Spectrometers Part II. TOFMS with Equal Energy Acceleration," International Journal of Mass Spectrometry and Ion Physics, 1972, vol. 9, pp. 357-373.

Sakurai et al., "A new multi-passage time-of-flight mass spectrometer at JAIST," Nuclear Instruments and Methods in Physics Research Section A, 1999, vol. 427, pp. 182-186.

Toyoda et al., "Multi-turn time-of-flight mass spectrometers with electrostatic sectors," Journal of Mass Spectrometry, Nov. 3, 2003, vol. 38, pp. 1124-1142.

Mckerman et al., "TOF-SIMS: Materials Analysis by Mass Spectrometry 2nd Edition," IM Publications LLP and SurfaceSpectra Limited, 2013, pp. 1-743.

Wollnik, "Energy-Isochronous Time-of-Flight Mass Spectrometers" Proceedings of the NATO Advanced Study Institute on Mass Spectrometry in Biomolecular Sciences Laceo Ameno, Ischia, Italy Jun. 2-Jul. 5, 1993, pp. 111-146.

K. Kazuki, "Development of an Inductive Charge Detector for a Multi-Turn Time-of-Flight Mass Spectrometer", Dept. of Phys., Grad. School of Science, Osaka Univ., JP, Mar. 2009.

N. Contino et al., "Charge detection mass spectrometry for single ions with a limit of detection . . . ", Int. J.Mass Spectrom, Elsevier, vols. 345/347, pp. 153/159, Jul. 20, 2012.

M. Toyoda et al., "Multi-turn time-of-flight mass spectrometers with electrostatic sectors," J. Mass Spectrom., Wiley InterScience, UK, vol. 38, pp. 1125-1142, Nov. 3, 2003.

D. Nakashima, "Development of a Novel Multi-Turn Time-of-Flight Mass Spectrometry Method . . . ", Mass Spectrometry Group, Dept. of Physics, Osaka Univ., Japan, Mar. 2011.

Bajo, K. et al., "Development of Electrostatic-Induced Charge Detector for Multiturn Time-of-Flight Mass Spectrometer," Journal of Mass Spectrometry, vol. 57, No. 11, 2022.

Y. Toyoda et al., "Multi-turn time-of-flight mass spectrometer", J. Mass Spectrom. Soc. jpn., vol. 60, No. 6, 2012.

* cited by examiner

MASS SPECTROMETER AND METHOD

FIELD

The present invention relates to charge detection mass spectrometers (CDMS).

BACKGROUND TO THE INVENTION

Charge Detection Mass Spectrometry (CDMS) is a technique that allows deconvolution of complex spectra of macromolecules. As molecules increase in size, the number of different charge states they may acquire increases. In the limit, overlapping charge states of molecules having different masses cause a blurred continuum on the mass to charge m/z scale of conventional mass spectrometers (MS). Such mass spectra yield little or no analytically useful information because individual species no longer stand out as distinct peaks. This is particularly problematic in the case of the electrospray of macromolecules as this ionisation technique yields many different charge states as molecular mass increases. In contrast to MS, which determines mass to charge m/z of ions, CDMS determines masses (i.e. not merely mass to charge m/z) by determining both mass to charge m/z and charge z of the ions. In conventional CDMS, individual ions are injected into an ion trap and are made to oscillate backwards and forwards through an inductive charge detection tube. As a particular ion enters the inductive charge detection tube, the particular ion induces a small, measurable voltage, the amplitude of which is proportional to its charge. The measured periodic time of the oscillation yields the mass to charge ratio m/z of the particular ion and the product of these two measurements gives the true mass of the particular ion. Allowing many oscillations within the ion trap and analysing the resulting signal by Fourier Transform (FT) improves the accuracy of both the charge and the mass to charge ratio m/z measurements. The measurement of true mass is in contrast to conventional MS such as orthogonal-acceleration time-of-flight (oa-TOF) MS which determine only mass to charge ratios m/z. The accuracy of CDMS depends on two limiting factors: electronic noise in the detection electronics giving uncertainty in charge measurements; and energy spread of incoming ions giving variations in oscillation periods.

In 2012, Contino and Jarrold [1] presented a Charge Detection Mass Spectrometer (CDMS, clear from context, also known as CDMS analyser) with a limit of detection of 30 elementary charges for a single ion. This paper gives a comprehensive review of CDMS at that time and is incorporated in its entirety by reference herein. This CDMS comprised an electrospray source coupled to a dual hemispherical deflection analyser (HDA) followed by a cone trap incorporating an image charge detector. Ions were energy selected by the dual HDA prior to entering the trap. The fundamental oscillation frequency of the trapped ions was extracted by a fast Fourier transform (FFT). The oscillation frequency and kinetic energy provided the mass to charge ratios m/z of the trapped ions. The magnitude of the FFT at the fundamental frequency was proportional to the charge. Particularly, this CDMS required use of the dual HDA as an energy filter to limit the spread of ion energies entering the electrostatic cone trap and thereby reduce the variation in oscillation frequency, so as to achieve the limit of detection of 30 elementary charges for a single ion. However, limiting the spread of ion energies entering the electrostatic cone trap reduced the throughput of the CDMS. Lower noise electronics meant that by 2015, Keifer, Shinholt and Jarrold [2] demonstrated improved charge accuracy to better than integer level—which is sufficient for true mass determination.

In 2018, Hogan and Jarrold [3] employed a segmented Electrostatic Linear Ion Trap (ELIT), which had a lower dependence on oscillation period with ion energy than the cone trap of their previous CDMS. This CDMS also required use of the dual HDA energy filter while significant dependence on oscillation frequency due to ion energy spread and radial position remained. Particularly, for this CDMS, the kinetic energy dependence of the ion oscillation frequency was reduced by an order of magnitude, which should have led to an order of magnitude reduction in the uncertainty of the mass to charge ratio m/z ratio determination. However, only a factor of four improvement was achieved, attributed to the trajectory dependence of the ion oscillation frequency.

Hence, there is a need to improve CDMS.

SUMMARY OF THE INVENTION

It is one aim of the present invention, amongst others, to provide a CDMS which at least partially obviates or mitigates at least some of the disadvantages of the prior art, whether identified herein or elsewhere. For instance, it is an aim of embodiments of the invention to provide a CDMS having an ion trap geometry which eliminates the requirement for an upstream energy filter or selector. For instance, it is an aim of embodiments of the invention to provide a CDMS that improves isochronicity of ion oscillation periods, for example by reducing dependency on ion initial conditions. For instance, it is an aim of embodiments of the invention to provide a CDMS having an ion trap geometry which eliminates the requirement for an upstream energy filter or selector while improving isochronicity of ion oscillation periods, for example by reducing dependency on ion initial conditions. For instance, it is an aim of embodiments to provide a CDMS that provides structural information of ions, for example by providing masses of precursor ions and product ions thereof.

A first aspect provides a charge detection mass spectrometer, CDMS, comprising:

- an electrostatic sector field ion trap and an inductive charge detector;
- wherein the electrostatic sector field ion trap is configured to define, at least in part, an ion path via the inductive charge detector.

A second aspect provides a method of determining masses of ions, the method comprising:

- moving, by an electrostatic sector field ion trap, an ion around an ion path defined, at least in part, thereby, via an inductive charge detector;
- inducing, by the moving ion, a signal in the inductive charge detector; and determining a mass of the ion using the induced signal.

A third aspect provides a charge detection mass spectrometer, CDMS, comprising:

- an electrostatic sector field ion trap and an inductive charge detector, wherein the electrostatic sector field ion trap is configured to define, at least in part, an ion path via the inductive charge detector; and
- a fragmentation device.

A fourth aspect provides a method of determining masses of ions, the method comprising:

- moving, by an electrostatic sector field ion trap, a precursor ion around an ion path defined, at least in part, thereby, via an inductive charge detector;
- inducing, by the moving precursor ion, a signal in the inductive charge detector;

determining a mass of the precursor ion using the induced signal;

fragmenting the precursor ion and providing a product ion therefrom; and determining a mass of the product ion.

A fifth aspect provides a charge detection mass spectrometer, CDMS, comprising:

an electrostatic ion trap and an inductive charge detector, wherein the electrostatic ion trap is configured to define, at least in part, an ion path via the inductive charge detector;

a fragmentation device;

means for ejecting ions from the ion path into the fragmentation device; and optionally means for injecting ions from the fragmentation device into the ion path.

A sixth aspect provides a method of determining masses of ions, the method comprising:

moving, by an electrostatic ion trap, a precursor ion around an ion path defined, at least in part, thereby, via an inductive charge detector;

inducing, by the moving precursor ion, a signal in the inductive charge detector;

determining a mass of the precursor ion using the induced signal;

fragmenting the precursor ion and providing a product ion therefrom, comprising ejecting the precursor ion from the ion path into a fragmentation device, fragmenting the precursor ion therein to provide the product ion and ejecting the product ion from the fragmentation device optionally into the ion path; and determining a mass of the product ion.

DETAILED DESCRIPTION OF THE INVENTION

According to the present invention there is provided a CDMS, as set forth in the appended claims. Also provided is a method. Other features of the invention will be apparent from the dependent claims, and the description that follows.

The first aspect provides a charge detection mass spectrometer, CDMS, comprising:

an electrostatic sector field ion trap and an inductive charge detector;

wherein the electrostatic sector field ion trap is configured to define, at least in part, an ion path via the inductive charge detector.

The CDMS according to the first aspect may be configured to determine a mass of an ion moving around the ion path by detecting a mass to charge ratio m/z and a charge z of the ion using signals induced by the ion in the inductive charge detector.

The inventor has recognised that a major limitation of state of the art CDMS instruments lies in the dependence of ion oscillation frequency on the initial angular, positional and particularly the energy spreads of the incoming ions. A further limitation is the low space charge capacity of state-of-the-art electrostatic reflecting traps. It is known that slow ions interact more strongly with each other than fast ions. The low space charge capacity arises from the fact that ions are slowed down to near zero velocity as they reverse direction in the mirror section of the reflecting traps. This low space charge capacity of these reflecting traps generally necessitates sequential injection of single ion species and consequently low duty cycle and long experimental times.

The inventor has recognised that the requirements for an improved CDMS trap are provided by the ion optical properties of a stigmatic TOF analyser comprising electrostatic sector fields. In a seminal paper of 1972 by Poschenrieder [4] (incorporated by reference herein), the general theory of isochronous focussing using a combination of toroidal electric sectors and field free drift regions was presented. The work was geared towards classical time of flight analysers with entrance and exit apertures with destructive electron multiplier-based detection. It was shown that effects of initial energy and angular spreads may be eliminated to first order and that in certain special cases, also the positional spread. An analyser that satisfies all three initial conditions namely: energy, position and angle to first order at the detector plane is known as a stigmatic analyser. In this paper, Poschenrieder presented a special geometry utilising two opposing spherical field sectors arranged to send ions in a three-dimensional figure of eight (8) path. Symmetry considerations lead to stigmatic behaviour of the proposed geometry and also to stable ion confinement for many round trips of the analyser. The utilisation of this geometry is problematic for TOF analysers as injection and detection are difficult due to the closed path taken by the ions. It is well known that closed path multiple round-trip analysers suffer from mass range limitation as ions of different masses overtake one another leading to an aliased spectrum. CDMS is different to TOF as ions are not injected in isochronous packets; rather, a section of an ion beam containing individual ions is allowed to enter the device and trapped so they can oscillate independently around the closed ion path. Such a figure of eight analyser satisfies the requirements for an improved ion trap for a CDMS instrument due to its superior ion optical properties in terms of energy and transverse acceptance. In operation, ions may be injected through a hole in the outer sphere which is held at a low potential during injection and then raised to trap ions for the desired period of time. Such an injection method for a figure of eight sector TOF is described in a patent by Ishihara [13].

Electrostatic Sector Field Ion Trap

It should be understood that the electrostatic sector field ion trap is a periodic structure and defines, at least in part, a closed ion path (also known as an orbit), such that ions may move (also known as oscillate) around the closed ion path repeatedly, for example an integral or a non-integral number of turns. Generally, ions move around the ion path through at least 1 turn, preferably through at least N turns where N is a natural number greater than or equal to 1, for example 2, 3, 4, 5, 6, 7, 8, 9, 10, 20, 50, 100, 200, 500 or more. Hence, the electrostatic sector field ion trap may be known as a multi-turn (also known as multi-pass) electrostatic sector field ion trap and in turn, the CDMS may be known as a multi-turn CDMS. Generally, increasing the number of turns through which the ions move and hence the measurement time reduces uncertainties in masses determined therefore. However, increasing the number of turns also increases an analysis time while likelihood of loss of a particular ion, such as through collisions such as with residual gas, other ions and/or walls of the CDMS, increases. By improving the vacuum, for example to at most $2\times10^{-9}$ Torr or better, the likelihood of loss of a particular ion through collisions with residual gas may be reduced, thereby increasing the number of turns. Hence, the number of turns through which the ions move may be balanced accordingly. The fundamental frequency f of an ion moving around the ion path is dependent on the mass to charge ratio m/z and is measured as described below, using the inductive charge detector. If the electrostatic sector field ion trap is isochronous to first order, the uncertainty in mass is reduced, compared with the ELIT of reference [3], for example, and as described below in more detail.

It should be understood that the electrostatic sector field ion trap is configured to define, at least in part, the ion path via the inductive charge detector. That is, in use, the electrostatic sector field ion trap defines, at least in part, the ion path via the inductive charge detector. By at least in part it should be understood that the ion path may be entirely defined by the electrostatic sector field ion trap or alternatively, may be partly defined by the electrostatic sector field ion trap and partly defined by one or more ion optical elements, for example lenses and/or magnets. In one example, the electrostatic sector field ion trap is configured to define (i.e. entirely) the ion path via the inductive charge detector. It should be understood that the ion path is the ion optical axis for a hypothetical perfect ion, in which the ion optical axis is an arcuate, closed line defining a plane. In contrast, the energy spread together with the angular and spatial deviations of a population of ions means that the respective ion trajectories deviate from the ion optical axis, in and out of the plane, such that the ion path sweeps volumetrically around the ion optical axis. It should be understood that a cross-section, for example a shape and/or dimension thereof, of the ion path, orthogonal thereto, may vary around the ion path. Particularly, as described in more detail below, the ions may be brought into point focus and parallel focus, for example alternately, around the ion path, while spherical electrostatic sectors may, for example, give rise to at least partly spherical ion paths. Additionally and/or alternatively, the ion path may be described and/or defined as an ion beam.

It should be understood that ions move around the ion path with a constant sense, which for convenience may be termed unidirectional, in that the orbital direction is constant, notwithstanding that the instantaneous directions of motion of the ions change constantly. In contrast, ions move in ELITs, such as the ELITs of references [2] and [3], with alternating, opposite senses, forwards and backwards, which for convenience may be termed bidirectional or reciprocating, thereby resulting in mutual interaction between ions moving in opposite directions, that precludes introducing more than a single ion therein. In more detail, typically thousands of ions are measured to generate a mass spectrum, depending on sample heterogeneity. According to the continuous (or random) trapping mode of reference [3], the probability that the ELIT contains zero ions, one ion, or more than one ion is given by a Poisson distribution such that the maximum number of single ion ELIT trapping events that can be realized is just 37% (i.e. a duty cycle of 37%). For 100 ms long trapping periods, the optimum fraction of single ion trapping events equates to a maximum of around 13,300 single ion events per hour for the ELIT such that a spectrum of a homogeneous sample may be acquired in under half an hour under optimum conditions (i.e. when the signal is stable and the number of single ion trapping events is close to the maximum that may be realized). In contrast, the unidirectional, closed ion path defined, at least in part, by the electrostatic sector field ion trap may be used to simultaneously determine the respective masses of a plurality of ions, for example as described below in detail, thereby reducing the acquisition time compared with the ELIT. Particularly, as discussed previously, a space charge capacity of the electrostatic sector field ion trap is increased compared with reflecting based ion traps, in which ions must slow to a low speed as they turn around in the mirror sections, since the unidirectional ion path reduces or eliminates mutual interactions between ions of the plurality thereof. Furthermore, for a given ion path length, the effective mean cross-sectional area of the ion path and hence the volume thereof is greater for the electrostatic sector field ion trap than for an ELIT, for example, since the ion path for the electrostatic sector field ion trap generally permits ions to fan out, for example arcuately, transversely to the ion optical axis. Hence, the electrostatic sector field ion trap may be filled with relatively more ions, for example one or more orders of magnitude more compared with the ELIT, while the kinetic energies of the ions are relatively constant. Furthermore, the bidirectional or reciprocating ion path of the ELIT of references [2] and [3], for example, results in overlapping signals induced in the charged tubes thereof if more than one ion is trapped, thereby preventing mass determination. In contrast, the unidirectional ion path means that a likelihood of overlapping signals induced in the inductive charge detector by two or more ions is reduced. It should be understood that generally, partially overlapping induced signals may be separated in the frequency domain but completely overlapping induced signals, for example due to phase coherent ions, overtaking ions or ions moving in opposite directions, may preclude mass determination. Hence, ion packets or clouds are preferably avoided, to avoid phase coherent ions, while the unidirectional path eliminates moving in opposite directions. Particularly, as described below in more detail, the plurality of ions may be introduced so as to be mutually spatially and/or temporally separated, thereby reducing or eliminating likelihood of overlapping signals induced in the inductive charge detector. Thus, by increasing the number of ions in the electrostatic sector field ion trap to even just 10 and since the duty cycle is not limited to just 37%, as for the ELIT, the same mass spectrum may be instead acquired in less than a minute. Generally, the ion-optical description of transfer of ions between the entrance and exit of an analyser may be expressed as a transfer matrix or via ray tracing. A curvilinear coordinate system (x, y, z) may be defined having its origin on the optical axis and the z therealong. For ions of equal masses, such a transfer matrix may be expressed, where time is of interest, as:

$$\begin{pmatrix} X_{i+1} \\ A_{i+1} \\ \delta K \\ \delta T_{i+1} \end{pmatrix} = \begin{pmatrix} (X|X) & (X|A) & (X|\delta K) & 0 \\ (A|X) & (A|A) & (A|\delta K) & 0 \\ 0 & 0 & 1 & 0 \\ (\delta T|X) & (\delta T|A) & (\delta T|K) & 1 \end{pmatrix} \begin{pmatrix} X_i \\ A_i \\ \delta K \\ \delta T_i \end{pmatrix}$$

where X and A respectively describe the position (typically resolved into lateral deviations x, y) and angle of inclination (typically resolved into angular deviations α, β) of a particular ion relative to the z axis, where $\delta K=(K/K_0-1)$ and $\delta T=(T/T_0-1)$ respectively are the relative energy and time deviations and the indices i and i+1 respectively denote these quantities at the entrance and the exit. K and $K_0$ respectively are the energies of a reference ion and the particular ion while T and $T_0$ respectively are the times when the reference ion and the particular ion enter or leave the analyser. (X|X) and (A|A) represent magnification terms while (X|A) and (A|X) represent focusing terms. Equating these terms respectively to zero provides parallel to point, point to parallel, point to point and parallel to parallel ion optics. (X|δK), (A|δK) and (δT|δK) represent dispersion terms, with respect to energy deviations. Alternatively, a transfer matrix may be expressed alternatively in terms of lateral deviations x, y, angular deviations $\alpha$, $\beta$ and/or mass deviation $\gamma$, for example.

For applications of interest, the ions originate from low intensity sources, having relatively low energy (i.e. low-energy ions), but have relatively large energy spreads $\delta K$.

Ions having the same mass to charge ratios m/z but different energies will move through the analyser in the same time if $(\delta T|\delta K)=0$. Such an analyser is energy isochronous. In one example, $|(\delta T|\delta K)|\leq 0.1$; preferably $|(\delta T|\delta K)|\leq 0.5$; more preferably $|(\delta T|\delta K)|\leq 0.1$. That is, the analyser may be quasi-energy isochronous, thereby still allowing a relatively large number of turns while relaxing tolerancing of the geometry. Ranges for $(\delta T|X)$, $(\delta T|A)$, $(X|\delta K)$ and/or $(A|\delta K)$ may be defined similarly.

It should be understood that focal plane is the position where ions sent from the optic axis with an angular distribution are brought to a focal point after passing through the analyser. In one dimension x, this is mathematically expressed in aberration theory notation as $(x|a)=0$. An analyser behaves stigmatically (i.e. is stigmatic) if $(x|a)=(y|b)=0$ at the focal plane.

More generally, ions having the same mass to charge ratios m/z but different energies and different angles of inclination at the entrance will move through the exit independently of energy and entrance angle of inclination if $(X|A)=(A|X)=(A|\delta K)=0$. Such an analyser is stigmatic and achromatic focusing and the trajectories are mirror symmetric. In one example, $|(X|A)|$, $|(A|X)|$ and/or $|(A|\delta K)|\leq 0.1$, preferably $|(X|A)|$, $|(A|X)|$ and/or $|(A|\delta K)|\leq 0.05$, more preferably $|(X|A)|$, $|(A|X)|$ and/or $|(A|\delta K)|\leq 0.01$. That is, the analyser may be quasi-stigmatic and/or quasi-achromatic, thereby still allowing a relatively large number of turns while relaxing tolerancing of the geometry.

Generally, an achromatic system is one where the transfer matrix elements for the transverse coordinates do not depend on momentum. Generally, an isochronous system is one where the transit time of a trajectory through the system does not depend on the initial coordinates. It is well known that a first-order achromatic system is also isochronous, except for pure momentum dependence. The converse is also true. This result is entended to higher orders. Conditions may be found so that for a system whose chromatic terms all vanish up to a certain order the transit time will be independent of the transverse coordinates up the same order. Under the same conditions, the converse will also be true.

However, the spatial focusing requirement of $(X|A)=(A|X)=0$ requires identical ion trajectories for the particular ion for every turn. For the applications of interest, spatial focusing requirement may be relaxed by postulating only that the particular ion moves stably in phase space, thus requiring:

$$-2\leq(X|X)+(A|A)\leq 2$$

In this way, the particular ion may move on different trajectories during different turns. This relaxation also may increase design freedom and/or tolerate constructional errors, for example, while alternatively and/or additionally accommodate spatial and/or angular deviations arising from ion injection, for example.

Conversely, perfect spatial and temporal focusing eliminates ion beam divergence and mass resolution degradation as the number of turns increases, by returning the particular ion to the same position and at the same angle of inclination upon every turn. TOF MS analyser geometries having such perfect spatial and temporal focusing have been proposed (MULTUM, MULTUM II and planar figure of eight) and some constructed, as described in more detail below with reference to [15], which is incorporated herein in entirety by reference.

In one example, the electrostatic sector field ion trap comprises a set of electrostatic sectors, including a first electrostatic sector and a second electrostatic sector. It should be understood that the first electrostatic sector and the second electrostatic sector are mutually spaced apart, for example by a field-free region (also known as a drift space), traversed by the ion path. It should be understood that the inductive charge detector is disposed in a field-free region. While the inductive charge detector could be disposed in an electric field, direct capacitive coupling of noise from the power supply limits detection. In one example, the electrostatic sector field ion trap comprises a set of electrostatic sectors, including a first electrostatic sector and a second electrostatic sector, and a set of electric quadrupole lenses, including Q quadrupole lenses, wherein Q is a natural number greater than or equal to 1, for example wherein Q is four or six times the number of electrostatic sectors. Generally, a quadrupole lens focuses in one coordinate direction and defocuses in a mutually orthogonal coordinate direction. Hence, a single quadrupole lens cannot be used to focus an ion beam to a point or to produce a two-dimensional image, for example. However, two-dimensional focusing may be accomplished with combinations of quadrupole lenses, such as two quadrupole lenses (doublets) and three quadrupole lenses (triplets). For example, two quadrupole lens doublets may be arranged corresponding with the entrance and the exit of an electrostatic sector, respectively. In one example, the electrostatic sector field ion trap does not comprise a set of electric quadrupole lenses and/or RF electric lenses, thereby reducing a complexity. It should be understood that an electrostatic sector comprises two corresponding electrodes mutually spaced apart radially, having corresponding radii of curvature in two mutually orthogonal dimensions, to which corresponding and opposed electrical DC potentials are applied to thereby provide a toroidal electric field defining the ion optical axis therethrough, wherein the electrical potential on the ion optical axis (i.e. the central trajectory) is preferably the same as that in the field free region, for example ground. It should be understood that the electrostatic sector field ion trap comprises a set of power supplies, for example DC power supplies, electrically coupled thereto.

Additionally and/or alternatively, the electrostatic sector field ion trap may be defined by a set of cells (also known as unit or elements), including a first cell and a second cell, wherein the first cell comprises a set of drift spaces, a set of electrostatic sectors including a first electrostatic sector and optionally, a set of quadrupole lenses. It should be understood that the second cell may be as described with respect to the first cell. Symmetrical geometries of cells are more readily understood but the principles extend to asymmetrical geometries cells. An electrostatic sector field ion trap defined by four cells may be considered to be a doubly symmetric geometry of two cells, such as the MULTUM and the MULTUM II of reference [15]. While the planar figure of eight geometry of reference [15] prima facie appears to be defined by two cells, perfect focussing is achieved after two turns and hence this planar figure of eight geometry is defined also by four cells.

In one example, the first electrostatic sector comprises and/or is a cylindrical, a toroidal or a spherical electrostatic sector. A cylindrical electrostatic sector provides the simplest geometry, having effectively a single radius of curvature in one dimension only (the second radius of curvature in a mutually orthogonal dimension being infinite) but does not confine ions in that orthogonal dimension e.g. y direction and thus generally requires confining electric fields in said y direction (curvilinear coordinates). Cylindrical electrostatic sectors are generally used together with electric quadrupole lenses. MULTUM and the planar figure of eight geometry of reference [15] comprise respectively four and two cylindrical electrostatic sectors, each together with eight electric quadrupole lenses. A toroidal electrostatic sector has two different radii of curvature in the two mutually orthogonal dimensions, the ratio of which must be defined for enablement, and may confine ions in both dimensions such that electric quadrupole lenses may not be required. Since toroidal electrostatic sectors have two different radii of curvature, construction thereof is relatively more complex. MULTUM II of reference [15] and the rhomboid geometry of reference [16] each comprise four toroidal electrostatic sectors and do not require electric quadrupole lenses. A spherical electrostatic sector is a special case of a toroidal electrostatic sector, having two radii of curvature that are the same, and may confine ions in both dimensions such that electric quadrupole lenses may not be required. The figure of eight geometry of reference [4] comprises two spherical electrostatic sectors and does not require electric quadrupole lenses. Hence, by basing a cell on a spherical electrostatic sector, the number of ion optical components may be reduced compared with a cell based on a cylindrical electrostatic sector or a toroidal sector.

In one example, the first electrostatic sector has a deflection angle $\psi_0$ greater than 45.0°, preferably at least 60.0°, for example in a range from greater than 60.0° to 270.0°, preferably in a range from 90.0° to 240.0°. In one example, the second electrostatic sector is as described with respect to the first electrostatic sector, for example having the same or a different deflection angle $\psi_0$. In one example, each electrostatic sector of the set of electrostatic sectors has the same deflection angle $\psi_0$. In this way, a complexity is reduced and/or a symmetry increased. In one example, alternate electrostatic sectors of the set of electrostatic sectors have the same respective deflection angles $\psi_0$.

In one example, the set of electrostatic sectors has a total deflection angle $\psi_0$ greater than 360.0°, preferably at least 390.0°, for example in a range from greater than 360.0° to 720.0°, preferably in a range from 390.0° to 660.0°. That is, the ion path includes a crossover.

In one example, the set of electrostatic sectors does not comprise or consist of a ring of eight 45° toroidal electrostatic sectors.

In one example, the first electrostatic sector and the second electrostatic sector are mutually opposed, for example directly, diagonally and/or diametrically wherein the ion path and/or ion optical axis is linear between the exit of the first electrostatic sector and the entrance of the second electrostatic sector. In one example, the ion path and/or ion optical axis between the exit of the first electrostatic sector and the entrance of the second electrostatic sector is in a field-free region. That is, the ion path and/or ion optical axis between the exit of the first electrostatic sector and the entrance of the second electrostatic sector does not include a quadrupole lens, for example.

In one example, the set of electrostatic sectors includes only the first electrostatic sector and the second electrostatic sector, preferably wherein the first electrostatic sector and the second electrostatic sector are spherical electrostatic sectors, of radius r, having a deflection angle $\psi_0$ of nominally 199.2°, for example within a range from 198.2° to 200.2°, preferably in a range from 198.7° to 199.7°, more preferably in a range from 199.0° to 199.4°, for example 199.2°, and wherein the electrostatic sector field ion trap comprises four field-free regions of length $g_r$ of nominally 5.9r (for example, within 2%, preferably within 1%), thereby providing a three-dimensional figure of eight geometry according to reference [4].

In one example, the electrostatic sector field ion trap comprises a set of field free regions (also known as drift regions), including a first field free region and a second field free region. In one example, a length of the ion path through the set of field free regions is at least 50%, preferably at least 55%, more preferably at least 60%, most preferably at least 65% of the total length of the ion path. In this way, the inductive charger detector may be arranged in the set of field free regions to extend along about 50% of the ion path, thereby increasing a measurement duty cycle.

In one example, the first electrostatic sector comprises a set of shunts, including a first shunt, arranged to delimit a field due to the first electrostatic sector. In this way, fringe fields due to the first electrostatic sector may be controlled and/or the inductive charge detector shielded from the field due thereto. For example, shunts may attenuate noise coupled to the inductive charge detector up to several orders of magnitude. For example, a 100 V power supply electrically coupled to the first electrostatic sector may exhibit <1 mV RMS noise. Using shunts, this noise may be attenuated to about 1 μV RMS, and hence compatible with suitable charge sensitive amplifiers having sensitivities of typically 0.6 μV/charge.

In one example, the electrostatic sector field ion trap (i.e. the behaviour thereof) is isochronous, for example to first order with respect to energy (i.e. energy isochronous), as discussed above, for example after 1 turn and/or after an integral number of turns. In this way, the uncertainty in the mass to charge ratio m/z is reduced, compared with an ELIT such as the ELIT of reference [3]. Example geometries for such an electrostatic sector field ion trap include the figure of eight of reference [4], the MULTUM, MULTUM II and planar figure of eight of reference [15] and the rhomboid of reference [16]. Other geometries are known. In one example, the electrostatic sector field ion trap is isochronous to first order with respect to energy, having a residual to second order, for example a parabolic residual to second order. In this way, the uncertainty in the mass to charge ratio m/z due to a small dispersion in energy ΔE of the ion is further reduced. Second order spatial aberrations result in precession of the ions while orbiting, which may be controlled using constraining electric fields, for example to prevent ion losses arising from precession in electrostatic sector field ion traps based on cylindrical and/or toroidal electrostatic sectors, or may be allowed for electrostatic sector field ion traps based on spherical electrostatic sectors, for example.

In one example, the electrostatic sector field ion trap is configured to define, at least in part, the ion path in two or three mutually-orthogonal dimensions. For example, the electrostatic sector field ion trap may be configured to define, at least in part, the ion path in two mutually-orthogonal dimensions, such as in the x, z dimensions, and may be referred to as a planar electrostatic sector field ion traps, in which the ion optical axis defines the plane. It should be understood that deviations in position, angle of inclination and/or energy cause ions to depart from the ion optical axis such that the ion beam may be represented by a distribution transverse thereto, for example in phase space. Examples planar electrostatic sector field ion traps include the MULTUM, MULTUM II and planar figure of eight of reference [15] and the rhomboid of reference [16]. Construction of such planar electrostatic sector field ion traps may be simplified and may be based on cylindrical, toroidal and/or spherical electrostatic sectors, including quadrupole lenses as required.

In one example, the ion path defined by the electrostatic sector field ion trap includes a crossover or point focus, for example the MULTUM, MULTUM II and planar figure of eight of reference [15] and the figure of eight of reference [4]. In this way, the electrostatic sector field ion trap may be isochronous with respect to energy while a length of the ion path increased for a given perimeter or area of the electrostatic sector field ion trap, compared with a ring, for example.

Inductive Charge Detector

The CDMS comprises the inductive charge detector and the ion path is defined via (i.e. through) the inductive charge detector. In other words, the inductive charge detector encloses or surrounds, at least in part, the ion path.

Generally, when an ion moves through the inductive charge detector, the ion induces a charge that is detected by a charge sensitive amplifier, which outputs a signal. It should be understood that the inductive charge detector comprises a charge sensitive amplifier and optionally a digitiser, communicatively coupleable or coupled to a computer comprising a processor and a memory. The mass of the ion may be determined using the signal by Fourier analysis for example using a Fourier Transform (FT) or fast Fourier Transform (FFT), least squares, Filter Diagonalization Method (FDM) and/or Maximum Likelihood method or similar. In one example, the signal comprises and/or is a time domain signal, which may be amplified and/or digitized for analysis. The use of FFTs, for example, enables detection of charges which do not rise above the noise in the time domain and lowers the LOD to <7 e (elementary charges). The mass to charge ratio m/z is inversely proportional to the square of the fundamental frequency f by the relationship:

$$m/z = \frac{C}{f^2}$$

where C is a constant that is a function of the ion energy and the dimensions of the electrostatic sector field ion trap. Typically, C is determined from ion trajectory simulations or by calibration of the device using known species. The charge z of the ion is proportional to the FFT magnitude (when the number of ion cycles or trapping time is taken into account). Hence, by determining the mass to charge ratio m/z and the charge z of the ion, the mass m of the ion may be trivially calculated by multiplication.

In one example, the inductive charge detector comprises a first set of charge detector tubes, including a first charge detector tube. For example, charge detector tubes may be disposed in one or more of the field free regions, for example in all of the field free regions. For example, the first set of charge detector tubes may comprise and/or be a segmented charge detector tube, including a plurality of charge detector tubes. In one example, the inductive charge detector comprises C sets of charge detector tubes, including the first set of charge detector tubes, wherein C is a natural number greater than or equal to 1, for example 1, 2, 3, 4, 5, 6, 7, 8, 9, 10 or more, for example wherein C is equal to the number of field free regions. In this way, a duty cycle of inductive charge detection may be increased. In one example, the first set of charge detector tubes comprise and/or is a segmented charge detector tube, for example an axially and/or a radially segmented charge detector tube. By segmenting a charge detector tube axially, such that the segments are in series or tandem, signals may be induced in each of the segments successively by an ion moving therethrough. For example, as described below, increasing the length of a segment beyond about twice the width thereof does not substantially increase the magnitude of the induced signal while a plurality of segments and hence induced signals improves measurement statistics. By segmenting a charge detector tube radially, such that the segments are in parallel, two ions substantially coincident in the z dimension (curvilinear coordinates) but mutually separated in the x and/or y dimensions may induce signals in different radial segments, thereby reducing the likelihood of signal overlap due to the two ions otherwise moving together through the charge detected tube. In this way, an ion capacity of the CDMS may be increased. In one example, an internal cross-section, for example a shape, of the inductive charge detector corresponds with, for example is similar to, a cross-section, for example a shape, of the ion path therethrough. For example, while a charge detector tube having a cylindrical bore is suitable for a generally cylindrical ion path, the first charge detector tube may be adapted to have a tapered bore to correspond with a frustoconical ion path entering and/or exiting an electric quadrupole lens or to provide an annulus or a tapered annulus for an ion path entering and/or exiting a spherical electrostatic sector, for example. In one example, the first charge detector tube comprises an outer electrode and an inner electrode, thereby providing an annulus or a tapered annulus there through for the ion path, optionally comprising one or more supports therebetween, for example being disposed and/or having cross sections adapted to reduce likelihood of ion collisions therewith.

In one example, the first charge detector tube, having a length L and a width W, has a ratio of the length L to the width Win a range from 3:2 to 8:2, preferably in a range from 3:2 to 5:2, for example 2:1 and/or a ratio of the length L to the width W of at least 2:1. Particularly, a magnitude of the induced signal does not substantially increase by further lengthening the first charge detector tube relative to its width.

In one example, a portion of the ion path via the inductive charge detector is in a range from 30% to 70%, preferably in a range from 40% to 60%, for example 50% of the ion path defined by the electrostatic sector field ion trap. In this way, artifacts, such as signal processing artifacts, in a time-domain signal of an ion, as analysed by FT for example, are reduced. Particularly, if the portion of the ion path via the inductive charge detector is about 50% of the ion path defined by the electrostatic sector field ion trap, even order harmonics when analysing the time-domain signal by FT maybe reduced or eliminated. An ideal, 50% duty cycle square wave does not have even order harmonics in its FFT and fewer harmonics results in a fundamental peak having a larger magnitude. Since the magnitude of the fundamental peak is proportional to the charge of the ion, an increase in the magnitude may decrease uncertainty in the charge by increasing the signal-to-noise ratio of the fundamental peak.

In one example, the CDMS comprises a set of electrostatic focus lenses, including a first electrostatic focus lens, arranged to constrain, at least in part, the ion path in a first dimension, for example transverse thereto. In other words, the ion path may be compressed, for example uniaxially. In one example, the set of electrostatic focus lenses is arranged to constrain, at least in part, the ion path in a second dimension, for example transverse thereto, wherein the first dimensional and the second dimension are mutually orthogonal. In other words, the ion path may be compressed, for example biaxially. In this way, construction of the CDMS may be simplified while spatial aberrations, if any, arising due to the set of electrostatic focus lenses are not significant. Additionally and/or alternatively, by constraining the ion path, an internal dimension, for example an internal diameter, of the inductive charge detector may be reduced since a cross-sectional area of the ion path is reduced, thereby improving a rise time thereof. In one example, the first dimension is orthogonal to a direction of the ion path via the inductive charge detector. In one example, the first focus lens comprises and/or is a cylinder lens, an einzel lens and/or a plate lens, for example disposed across a crossover in the ion path. In this way, symmetry about the crossover may be maintained while the geometry simplified. For example, an einzel lens may maintain at least rotational symmetry. In one example, the set of electrostatic focus lenses is arranged to constrain, at least in part, the ion path in a second dimension, for example transverse thereto, wherein the first dimensional and the second dimension are mutually orthogonal. It should be understood that the set of electrostatic focus lenses, including the first focus lens, are arranged to constrain, at least in part, the ion path in the first dimension rather than, for example, an RF field and/or a magnetic field.

In one example, a cross-section of the ion path via the inductive charge detector is arcuate, having a central angle in a range from −3° to +3°, preferably in a range from −2° to +2°, more preferably in a range from −1° to +1°. This way, the ion beam is confined to a relatively narrow arc whereby an internal dimension, for example an internal diameter, of the inductive charge detector may be reduced since a cross-sectional area of the ion path is reduced, thereby improving a rise time thereof.

In one example, the inductive charge detector is configured to operate at ground potential. In this way, a noise level thereof is reduced, thereby enabling detection of very low induced signals.

Ion Introduction

In one example, the CDMS comprises means for introduction of ions into the ion path. In one example, introduction of the ions is via a field-free region, for example by switched ion displacement in the x direction and/or the y direction (curvilinear coordinates), such as using deflecting electrodes as described in [14]. In one example, introduction of the ions is via the electrostatic sector field ion trap, for example by switching the first electrostatic sector for example only the first electrostatic sector, such as described in [13] or by switching the set of electrostatic sectors, for example two or more or all of the electrostatic sectors, mutatis mutantis. By switching only the first electrostatic sector, thereby operating the remaining electrostatic sectors at their respective operating potentials, ions may be successively introduced into the ion path so as to fill the ion path until the first ion introduced reaches proximally the first electrostatic sector, whereupon the first electrostatic sector is switched back to its respective operating potential. For example, for a figure of 8 geometry, ions may be introduced so as to fill about an upper ¾ of the figure of 8. Conversely, by switching all the electrostatic sectors of the set thereof, control is simplified while the number of power supplies required is reduced. In one example, the electrostatic sector field ion trap, for example the first electrostatic sector, comprises an ion inlet for introduction of ions therethrough into the ion path. In one example, the ion inlet comprises and/or is a passageway through the outer electrode of the first electrostatic sector.

Energy Filter

In one example, the CDMS does not comprise an energy filter to limit the spread of ion energies entering the electrostatic sector field ion trap, for example a dual HDA as described previously. In contrast to the cone trap and the ELIT of references [2] and [3], the electrostatic sector field ion trap the CDMS has a relatively broader tolerance to deviations to ion energy spread and/or radial and/or angular position ions, while ions outside of this relatively broader tolerance, for example high-energy or off-axis ions, are unstable and thus rapidly collide with walls of the electrostatic sector field ion trap without adversely affecting mass determination of other ions. In one example, the CDMS has an energy acceptance of greater than 0.40%, preferably at least 0.5%, more preferably at least 1%, most preferably at least 2%, 3% or 4%. In one example, the CDMS has an energy acceptance of at most 20%, preferably at most 15%, more preferably at most 10%.

Lift Device

In one example, the CDMS comprises a lift device configured to increase an ion energy of the ions to be introduced into the ion path. In one example, the lift device is configured to trap the ions to be introduced into the ion path. In this way, the ions may be gated for introduction into the electrostatic sector field ion trap, for example to mutually spatially and/or temporally separate a plurality of ions introduced therein, such that the plurality of ions moves generally mutually spatially and/or temporally separated therearound simultaneously. In one example, the lift device is configured to collimate the ions to be introduced into the ion path, thereby providing a pencil of mutually spatially separated ions. In one example, the lift device is configured to introduce a plurality P of ions (i.e. a population of ions), wherein P is a natural number greater than 1, for example 2, 3, 4, 5, 6, 7, 8, 9, 10, 20, 50, 100 or more ions, preferably wherein P is at least 4, more preferably wherein P is at least 10, 10, 20, 50, 100 or more ions. It should be understood that P is the mean number of ions introduced, the number of ions having a typically Poisson distribution and wherein the ions are mutually spatially separated randomly, thereby adopting substantially random discrete initial positions along a portion of the ion path i.e. mutually spatially and/or temporally separated, such that the plurality of ions moves generally mutually spatially and/or temporally separated therearound simultaneously. In the high intensity limit, like on a magnetic sector, the ion beam would include many ions per linear distance along the beam. At the other end of the scale, ions are injected individually according to the Poisson distribution (but it is still a beam in its behaviour apart from space charge considerations). In one example, the lift device is configured to introduce the ions into the ion path by pulsing the ions into the ion path. More generally, in one example, the CDMS comprises means for introducing the ions into the ion path, generally as described with respect to the lift device but optionally increasing the ion energy. In one example, the means for introducing the ions into the ion path comprises means for introducing a plurality P (i.e. a population) of ions into the ion path, wherein P is a natural number greater than 1, wherein the plurality of ions respectively adopt substantially random discrete initial positions along a portion of the ion path, such that the plurality of ions moves generally mutually spatially and/or temporally separated therearound simultaneously. That is, the ions, for example the plurality of ions, are not focussed spatially and/or temporally, as typically focussed for introduction into a convention mass to charge analyser, such as quadrupole analyser, a time of flight analyser or an ion trap analyser, such as a three-dimensional quadrupole ion trap, a cylindrical ion trap, a linear quadrupole ion trap or an orbitrap. In other words, no effort is made to focus the ions. Rather, a disordered population of ions is introduced into the ion path, for example as provided by thermalizing the ions in a gas cell, which reduces the energy distribution of the ions without focussing. If these ions are trapped and/or the respective energies of the ions increased (for example, using a lift device) before introduction into the ion path, the ions may be introduced into the ion path by applying a potential gradient that substantially maintains disorder and/or non-correlation, spatially and/or temporally, of the ions upon introduction into the ion path.

Power Supplies

In one example, the CDMS comprises a set of power supplies, for example DC power supplies, including a first power supply, electrically coupled to the electrostatic sector field ion trap. In one example, the set of power supplies comprises the first power supply and a second power supply, respectively electrically coupled to the inner electrodes and the outer electrodes of the set of electrostatic sectors. In one example, the CDMS comprises a set of electrostatic focus lenses, including a first focus lens, and the set of power supplies includes a third power supply electrically coupled to the set of electrostatic focus lenses, for example the first focus lens.

Ion Source

In one example, the CDMS comprises an ion source, for example an atmospheric pressure ionisation (API) source such as an electrospray ionisation (ESI) source or a Nano spray ionisation source. Other ion sources are known.

Magnets

In one example, the CDMS does not comprise a magnetic deflector or sector. That is, the CMS may comprise only electrostatic sectors and optionally, electric quadrupole lenses and/or electric lenses as described herein.

Ion Processing

In one example, the CDMS comprises one or more devices upstream and/or downstream of the electrostatic sector field ion trap for ion processing, for example activation of ions using externally injected particles such as reagent ions or reagent ions co-trapped with precursor ions, interactions with (e.g. externally injected) electrons, manipulation of the mass-to-charge ratio of ions preferably by electron detachment (e.g. using energetic charged particles, including fast electrons), proton attachment or charge reduction processes, interactions between ions and neutral molecules (e.g. externally injected) in ground or excited state, interactions with photons, excitation of ion motion using auxiliary AC waveforms or duty cycle variations of the RF trapping waveform, ion isolation using AC waveforms or duty cycle control, collisional activation dissociation, ion accumulation and transfer. Processing may involve one or more of the above functions to be performed simultaneously or sequentially.

Vacuum System

In one example, the CDMS comprises a vacuum system, for example including a chamber housing the electrostatic sector field ion trap and the inductive charge detector therein, a vacuum pump and a controller. In one example, the chamber is a differentially pumped chamber, for example having a vacuum, of at most $1\times10^{-8}$ Torr, preferably of at most $5\times10^{-9}$ Torr, more preferably of at most $2\times10^{-9}$ Torr or better.

Mass Spectrometer

In one example, the CDMS comprises and/or is a standalone CDMS. Conversely, in one example, the CDMS is included in a mass spectrometer, for example integrally included (i.e. ab initio) therein or included as an upgrade or retrofit.

Preferred Example

In one preferred example, the charge detection mass spectrometer, CDMS, comprises:

- the electrostatic sector field ion trap and the inductive charge detector;
- wherein the electrostatic sector field ion trap is configured to define, at least in part, the ion path via the inductive charge detector;
- wherein the electrostatic sector field ion trap comprises a set of electrostatic sectors, including a first electrostatic sector and a second electrostatic sector, wherein the first electrostatic sector and the second electrostatic sector are mutually spaced apart by a field-free region traversed by the ion path, wherein the electrostatic sector field ion trap is a periodic structure and defines, at least in part, a closed ion path, such that ions around the closed ion path repeatedly, for example an integral or a non-integral number of turns;
- wherein the CDMS comprises means for introducing a plurality P of ions into the ion path, wherein P is a natural number greater than 1, wherein the plurality of ions respectively adopt substantially random discrete initial positions along a portion of the ion path, such that the plurality of ions moves generally mutually spatially and/or temporally separated therearound simultaneously.

Method

The second aspect provides a method of determining masses of ions, the method comprising:

- moving, by an electrostatic sector field ion trap, an ion around an ion path defined, at least in part, thereby, via an inductive charge detector;
- inducing, by the moving ion, a signal in the inductive charge detector; and
- determining a mass of the ion using the induced signal.

The ion, the ion path, the inductive charge detector and/or the electrostatic sector field ion trap may be as described with respect to the first aspect. In one example, the method according to the second aspect is performed using a CDMS according to the first aspect.

In one example, the method comprises providing ions, for example using an ion source, as described with respect to the first aspect. In one example, the method comprises processing the ions upstream and/or downstream of the electrostatic sector field ion trap, as described with respect to the first aspect. In one example, the method comprises introducing the ion into the ion path, for example via a field-free region, for example by displacing the ion in the x direction and/or the y direction (curvilinear coordinates), such as using deflecting electrodes as described in [14] and/or via an ion inlet in the first electrostatic sector, such as described in [13], for example wherein the ion inlet comprises and/or is a passageway through the outer electrode of the first electrostatic sector. In one example, introducing the ion into the ion path via the ion inlet comprises controlling the electrical potential applied to the first electrostatic sector, for example holding the first electrostatic sector at first electrical potential, such as ground electrical potential, while introducing the ion and applying a second electrical potential, such as an operating electrical potential, to the first electrostatic sector after introducing the ion into the ion path. In other words, the first electrostatic sector may be grounded, for example, during ion injection and the applied electrical potential subsequently raised (or lowered, depending on ion polarity). In one example, introducing the ion into the ion path via the ion inlet comprises controlling the electrical potential applied to the second electrostatic sector, for example applying the second electrical potential to the second electrostatic sector while introducing the ion. In other words, the electrical potential applied to the second electrostatic sector may be maintained during ion injection. In one example, introducing the ion into the ion path comprises introducing a plurality of ions into the ion path, wherein the ions are mutually spatially and/or temporally separated, such that the plurality of ions moves generally mutually spatially and/or temporally separated therearound simultaneously, as described with respect to the first aspect. In one example, the plurality of ions includes P ions, as described with respect to the first aspect. That is, in contrast to a TOF MS, the plurality of ions is not in a packet but are instead discrete. Packeted (also known as bunched or a cloud of) ions, as typically provided by a pusher and/or spatially focussed, are required for TOF MS to reduce uncertainty in TOF measurement. By mutually spatially and/or temporally separating the plurality of ions, the masses of the individual ions of each of the plurality thereof may be determined. Particularly, respective signals of the ions are thus unlikely to overlap, even after multiple turns and even if of the same mass to charge ratio m/z, because the ion path is unidirectional rather than bidirectional or reciprocating. Even where the ion path comprises a crossover, such as in a figure of eight geometry, mutual interaction between two ions of the plurality thereof proximal the crossover is unlikely while these ions are also moving with a constant speed around the ion path. In contrast, conventional CDMS such as the ELIT of reference [3] are limited to determining the mass of only a single ion since linear reflection of a plurality of ions will result in overlap of respective signals when the ions move through the inductive charge detector bidirectionally or reciprocally between mutually opposed reflectors. Furthermore, mutual interaction between two ions maybe substantial in the mutually opposed reflectors, where the ions are decelerated to stationary before acceleration therefrom. In one example, the method comprises increasing an ion energy of the ion and/or the plurality of ions to be introduced into the ion path, as described with respect to the first aspect. In one example, the method comprises collimating the plurality of ions to be introduced into the ion path, as described with respect to the first aspect. In one example, the method does not comprise energy filtering the ion and/or the plurality of ions to limit the spread of ion energies entering the electrostatic sector field ion trap.

In one example, moving the ion around the ion path comprises moving the ion around the ion path through at least 1 turn, preferably through at least N turns where N is a natural number greater than or equal to 1, for example 2, 3, 4, 5, 6, 7, 8, 9, 10, 20, 50, 100, 200, 500 or more. In one example, moving the ion around the ion path comprises moving the ion quasi-energy isochronously or isochronously, as described with respect to the first aspect. In one example, moving the ion around the ion path comprises spatially and/or temporally focussing the ion. In one example, moving the ion around the ion path comprises moving the ion through a cylindrical, a toroidal or a spherical electrostatic sector, as described with respect to the first aspect. In one example, moving the ion around the ion path comprises moving the ion through a total deflection angle $\psi_0$ greater than 360.0°, preferably at least 390.0°, for example in a range from greater than 360.0° to 720.0°, preferably in a range from 390.0° to 660.0°, and hence through a crossover. In one example, moving the ion around the ion path comprises moving the ion through a figure of eight geometry in two or three dimensions, as described with respect to the first aspect. In one example, moving the ion around the ion path comprises constraining, at least in part, the ion in a first dimension, for example transverse to the ion path, as described with respect to the first aspect.

In one example, inducing the signal in the inductive charge detector comprises inducing the signal wherein the inductive charge detector is operating at ground potential. In one example, inducing the signal in the inductive charge detector comprises inducing a set of signals in a first set of charge detector tubes comprised in the inductive charge detector, as described with respect to the first aspect.

In one example, determining the mass of the ion using the signal comprises Fourier analysis for example using a Fourier Transform (FT) or fast Fourier Transform (FFT), least squares, Filter Diagonalization Method (FDM) and/or Maximum Likelihood method or similar of the signal, as described with respect to the first aspect Fragmentation The third aspect provides a charge detection mass spectrometer, CDMS, comprising:

an electrostatic sector field ion trap and an inductive charge detector, wherein the electrostatic sector field ion trap is configured to define, at least in part, an ion path via the inductive charge detector; and a fragmentation device.

The CDMS may be configured to determine a mass of an ion moving around the ion path by detecting a mass to charge ratio m/z and a charge z of the ion using signals induced by the ion in the inductive charge detector.

Tandem mass spectrometry is a well-established technique that yields structural information and increased specificity (also known as selectivity) for selected precursor ions. Generally, an ion (i.e. a precursor ion) having a targeted (i.e. selected) mass to charge ratio m/z is isolated and subsequently fragmented to yield information on the ion's structure in full spectral mode. In triple quadrupole (also known as tandem quadrupole) experiments, targeted fragment ions are monitored to increase the specificity of the experiment yielding highly quantitative information on the target molecule. Tandem mass spectrometry experiments are performed using a variety of mass spectrometer combinations including Quadrupoles, Ion Traps, Time-of-Flight, FTICR, Magnetic Sector and Orbitrap (RTM) instruments. For all these experiments, knowledge of the mass to charge ratio m/z of the selected precursor ion (and hence mass) is required in order to perform the desired isolation step. In the particular case of very high mass ions, utilising electrospray ionisation knowledge of the mass to charge ratio m/z of the precursor ion alone is insufficient to determine the true mass of the selected ion, since this ionisation technique yields many different charge states as molecular mass increases, as described previously. Hence there is a need to be able to select a large molecular weight species of targeted mass in order to subsequently fragment it to obtain structural and/or quantitative information. As described herein, CDMS is a proven technique to measure the mass of these very large electrospray created ions. Fragmentation studies have been performed using CDMS instruments utilising cone trap geometries described initially by Benner [17], and also the ELIT [18]. In these studies, photofragmentation takes place within the cone trap and ELIT, respectively. However, this approach results in sharing of ion kinetic energy between the produced photofragments (i.e. product ions), thereby causing some of these photofragments to become unstable within the traps (and hence loss of these photofragments) and a degradation of the mass resolution of remaining photofragments due to their deviations from the optimal design energy of the trap itself. Furthermore, this approach does not allow for selection of the precursor ion or ions to be photofragmented, not withstanding that these CDMS are inherently limited to determination of mass of a single ion.

In contrast, the CDMS according to the third aspect enables determination of respective masses of a mixture of ions (i.e. having different masses), isolation of a single chosen species (i.e. a single precursor ion or a plurality of precursor ions having the same mass) or a plurality of chosen species (i.e. a plurality of precursor ions having different masses within a mass window) for fragmentation internal or external to the electrostatic sector field ion trap device, with the product ions (generally, product ion(s) i.e. or one or more product ions or a plurality of product ions) reintroduced into the ion path, thereby providing true tandem mass spectrometry experiments across the full mass range of the product ions.

The isolation of a plurality of chosen species may improve the throughput and sensitivity of the CDMS. When a population P of ions are introduced in the CDMS, each ion having its own m/z and z values may allow measurement of the masses of the population of ions. According to the third aspect, a true mass window may be selected, the mass window having a lower mass threshold and an upper mass threshold. Ions of the population that have masses falling inside this mass window may be isolated for fragmentation, while others having masses that fall outside the mass window may be rejected. The chosen species can then be subjected to fragmentation and the product ions may then be reinjected back into the CDMS for acquisition of the tandem data.

In conventional tandem mass spectrometry techniques, the determination of m/z values of a population of ions is a destructive process, and so the fragmentation process is not carried out on the same ions for which the m/z values have been determined. In contrast, the CDMS according to the third aspect may be configured to determine respective masses of the mixture of ions in a non-destructive process. The chosen species for fragmentation may be the same one or more precursor ions for which the mass has been determined The CDMS according to the third aspect may be as described with respect to the CDMS according to the first aspect mutatis mutandis, description of which is not repeated for brevity. That is, the CDMS according to the first aspect may be adapted to further comprise the fragmentation device, thereby providing the CDMS according to the third aspect.

Fragmentation Device

In one example, the fragmentation device comprises and/or is an RF ion trap equipped with one or more of the following fragmentation techniques: Collisional Induced Dissociation (CID), Light based photofragmentation (Lamp or laser based, UV, visible or Infra-Red), Electron Capture Dissociation (ECD), Electron Transfer Dissociation (ETD), Electron Induced Dissociation (EID), Surface Induced Dissociation (SID), Resonantly Induced Dissociation. Other fragmentation techniques are known. In one example, the fragmentation device is configured to trap the precursor ion(s) and/or a product ion thereof, for example by comprising one or more regions for trapping the precursor ion(s) and/or a product ion thereof. In this way, the precursor ion(s) may be introduced (directly or indirectly from the ion path) and trapped, for example in the first region and subsequently moved for example by applying a potential gradient to a second region for fragmentation therein, whereupon the product ions are similarly moved back to the first region or to third region, optionally the respective energies there are increased, before being moved to the ion path.

In one example, the fragmentation device is configured to increase (more generally, control) an ion energy of the product ion to be introduced into the ion path, for example by accelerating the product ion by a predetermined potential difference. In this way, the ion energy of the product ion may be controlled to correspond with a design, for example optimum, of the electrostatic sector field trap, thereby overcoming a disadvantage of conventional CDMS including photofragmentation, as described previously.

In one example, the fragmentation device is configured to thermalize the product ion, for example by collisional cooling with a buffer gas, and accelerate the product ion (i.e. increase an ion energy thereof) to a desired kinetic energy into the electrostatic sector field trap for mass determination.

In one example, the fragmentation device comprises and/or is an RF ion trap, for example a multipole linear ion trap such as a quadrupole, hexapole or octopole, for example as described in U.S. Pat. No. 5,847,386, incorporated herein by reference in entirety. In one example, the fragmentation device comprises and/or is a stacked electrode device, for example as described in U.S. Pat. No. 5,206,506, incorporated herein by reference in entirety. In one example, the fragmentation device comprises and/or is a 3D quadrupole ion trap. In one example, the fragmentation device comprises and/or is a linear ion trap, for example as described in U.S. Pat. Nos. 7,312,442B2, 7,755,034B2, 6,995,366B2, EP1706890B1 or WO/2017/134436, incorporated herein by reference in entirety.

Internal Fragmentation Device

In one example, the electrostatic sector field ion trap is configured to define, at least in part, the ion path via the fragmentation device (c.f. via the inductive charge detector such that the fragmentation device and the inductive charge detector are in series along the ion path). That is, the fragmentation device is between, for example, a first electrostatic sector and a second electrostatic sector of a set of electrostatic sectors, such that the ion path traverses through the fragmentation device. In other words, the fragmentation device may be described as being internal or in-line with respect to the electrostatic sector field ion trap, such that the ion path is continuous through the fragmentation device. That is, entering of ions into the fragmentation device and exiting of ions therefrom is directly from and to the ion path, respectively. For example, the respective masses of one or more precursor ions are determined, for example as described with respect to the first aspect, while the fragmentation device is deactivated (i.e. configured in a first state to permit the one or more precursor ions to move therethrough without fragmentation). Subsequently, the fragmentation device is activated (i.e. configured in a second state to fragment the one or more precursor ions), whereupon the one or more precursor ions are fragmented into respective product ions therein upon moving therethrough, since the ion path is via the fragmentation device. Thereafter, the fragmentation device is deactivated and the respective masses of one or more product ions are determined, for example as described with respect to the first aspect. In one example, the fragmentation device is configured to trap a precursor ion, as described below, upon entering the fragmentation device, fragment the precursor ion thereby providing a plurality of product ions therefrom, optionally trap the plurality of product ions and increase respective ion energies of the plurality of product ions, as described below, whereupon the plurality of product ions exit the fragmentation device having the increased respective ion energies for determination of the respective masses of the plurality of product ions. That is, the precursor ion is trapped, fragmented and the ion energies of the resulting product ions increased for determination of the respective masses of the product ions in-line.

External Fragmentation Device

In one example, the CDMS comprises means for ejecting ions from the ion path into the fragmentation device. That is, the fragmentation device is outside the electrostatic sector field ion trap, such that the ion path does not traverse through the fragmentation device. In other words, the fragmentation device may be described as being external or off-line with respect to the electrostatic sector field ion trap. That is, entering of ions into the fragmentation device and exiting of ions therefrom is indirectly from and to the ion path, respectively. For example, the respective masses of one or more precursor ions are determined, for example as described with respect to the first aspect. Since the ion path is not via the fragmentation device, the fragmentation device may be deactivated or activated. Subsequently, the precursor ions are ejected from the ion path into the fragmentation device, which is activated (i.e. configured in a second state to fragment the one or more precursor ions), whereupon the one or more precursor ions are fragmented into respective product ions therein. Thereafter, product ions are injected (i.e. introduced) from the fragmentation device into the ion path and the respective masses of one or more product ions are determined, for example as described with respect to the first aspect. In one example, the means for ejecting ions is configured to eject a precursor from the ion path into the fragmentation device, the fragmentation device is configured to trap the ejected precursor ion, as described below, upon entering the fragmentation device, fragment the precursor ion thereby providing a plurality of product ions therefrom, optionally trap the plurality of product ions and increase respective ion energies of the plurality of product ions, as described below, and inject (i.e. introduce) the plurality of product ions having the increased respective ion energies into the ion path for determination of the respective masses of the plurality of product ions. That is, the precursor ion is ejected and the precursor ion trapped, fragmented and ion energies of the resulting product ions increased offline and the product ions injected into the ion path for determination of the respective masses of the product ions. In one example, the means for ejecting ions from the ion path into the fragmentation device comprises and/or is one or more deflection electrodes and/or a deflection/focussing field, for example applied in the orthogonal Y direction, such as described below. In one example, the electrostatic sector field ion trap comprises an ion outlet for exit of ejected ions therethrough from the ion path. The ion outlet may be as described with respect to the ion inlet. In one example, the ion inlet provides the ion outlet i.e. a combined ion inlet/outlet.

In one example, the fragmentation device is configured to introduce the product ion into the ion path by pulsing the product ion into the ion path, for example as described with respect to introducing precursor ions into the electrostatic sector field ion trap. In this way, the product ions enter the electrostatic sector field ion trap as a pencil of spatially-separated ions, thereby improving mass determination thereof.

In one example, the fragmentation device is combined with a lift device configured to increase an ion energy of ions to be introduced into the ion path, as described previously. That is, the fragmentation device and the lift device may be combined as a single device and the functions thereof performed independently or dependently e.g. lift only without fragmentation for precursor ions or fragmentation and lift for product ions.

Ion Isolating Optical Device

In one example, the CDMS comprises an ion isolating optical element configured to isolate a precursor ion for fragmentation by the fragmentation device. In this way, a particular precursor ion, having a mass or a mass to charge m/z determined by the CDMS, for example of a plurality of precursor ions such as a pencil of spatially-separated precursor ions, is selected for fragmentation by the fragmentation device, such that structural information may be obtained for that particular precursor ion, thereby overcoming a disadvantage of conventional CDMS including photofragmentation, as described previously. A plurality of precursor ions having a mass determined by the CDMS within a mass window may be selected for fragmentation by the fragmentation device. In an example, the mass window may be selected based on the determined of the masses of a population of ions by the CDMS, the mass window having a lower mass threshold and an upper mass threshold. In one example, the ion isolating optical element is configured to isolate a precursor ion species (i.e. a single precursor ion or a plurality of precursor ions having a particular mass or a particular mass to charge m/z,) or a plurality of precursor ion species (i.e. a plurality of precursor ions having a mass within a mass window) for fragmentation by the fragmentation device. In one example, the ion isolating optical element is configured to isolate the precursor ion by causing loss of ions other than the precursor ion to be isolated, for example by causing these other ions to be unstable in the ion isolating optical element and/or the electrostatic sector field trap.

In one example, the ion isolating optical element comprises and/or is a quadrupole lens, an einzel lens, a deflection plate; and/or is provided by the electrostatic sector field ion trap; or a combination thereof. In one example, the quadrupole lens is configured to isolate the one or more precursor ions using a focusing voltage, a defocusing and/or a deflection voltage, to selectively focus the one or more precursor ions to be isolated, selectively defocus ions other than the one or more precursor ions to be isolated and/or selectively deflect the one or more precursor ions to be isolated or the ions other than the one or more precursor ions to be isolated, respectively. In one example, the einzel lens is configured to isolate the one or more precursor ions using a focusing voltage, to selectively focus the one or more precursor ions to be isolated. In one example, the, deflection plate is configured to selectively deflect the one or more precursor ions to be isolated or to selectively deflect the ions other than the one or more precursor ions to be isolated. In one example, the electrostatic sector field ion trap is configured to isolate the one or more precursor ions by an oscillating voltage applied thereto according to a mass to charge m/z thereof, to cause ions other than the one or more precursor ions to be selected to be unstable therein. In this way, a single precursor ion or a plurality of precursor ions all having the mass to charge m/z or an harmonic thereof or a plurality of precursor ions all having a mass to charge m/z or a harmonic thereof in a mass window is or are isolated, respectively. In one example, the ion isolating optical element is configured to isolate the precursor ion(s) by applying an electrical field, according to a mass to charge m/z thereof, according to an oscillation frequency, for example a harmonic thereof, of the precursor ion(s) in the electrostatic sector field ion trap, for example as described by Verenchikov in [19], incorporated herein by reference in entirety. In more detail, Verenchikov [19] proposed a device entitled Resonance Mass Spectrometer whereby ions are passed into isochronous open trap. An open trap means that ions undergo a number of oscillations within the trap in a first direction. The device utilises two dimensional electric fields to trap ions in these two dimensions, while ions all allowed to progress in a third dimension to exit the device to a destructive detector. The ion path is not closed, hence the term open trap. A set of n ions of differing mass to charge ratios m/z have unique oscillation frequencies $\{f_1, f_2, \ldots, f_n\}$ each frequency being the reciprocal of the isochronous transit time through the analyser. By applying a high frequency deflection field of chosen frequency, F, only ions that have a high number harmonic of that frequency F are allowed (i.e. selected) to pass through the open trap to the detector. That is to say an ion having an unique frequency $f_i$ must satisfy the condition:

$$F=N\times f_i \text{ or } F=(N+0.5)\times f_i$$

where N is an integer and $f_i$ is the frequency of oscillation of the selected ion.

The Verenchikov patent utilises substantially 2-dimensional fields necessary for an open trap to allow ions to be modulated as they progress through the device in the orthogonal direction before they are detection by a destructive detector such as an Electron Multiplier (EMT) or Micro Channel Plate (MCP). In contrast, the CDMS according to the first aspect and the third aspect is a closed trap, particularly a closed 3-dimensional ion trap with inductive detection. Ions may be modulated by a deflection field placed in a field free region of the electrostatic sector field trap, allowing selection of unique species (i.e. a precursor ion or a plurality of precursor ions having a mass within a selected mass window) in the same principle as [19]. After isolation, the selected species may be passed out of the electrostatic sector field trap for subsequent fragmentation in the fragmentation device, as described previously. The resulting fragment or product ion population may be then reaccelerated back in to the electrostatic sector field trap for tandem mass analysis. As described with respect to the first aspect, the electrostatic sector field ion trap has a relatively high space charge capacity, enabling accurate simultaneous mass determination of the fragment population without distortion. The selection of the plurality of precursor ions may take advantage of the relatively high space charge capacity of the CDMS according to the first and third aspects.

MS$^n$

In one example, the CDMS is configured to perform MS$^n$ experiments of ions by repeatedly isolating and fragmenting n$^{th}$ generation product ions for further structural elucidation.

Real Time

In one example, determination of masses comprises real time Fourier Transform processing. In this way, early indication of required resonant frequency for isolation can be determined from examination of the signal, and isolation can occur more quickly. Efficient isolation of the selected species allows speeds up experimental cycle times and therefore reduces the possibility of loss of desired species due to collision with residual gas molecules within the CDMS chamber.

Preferred Example

In one preferred example, the charge detection mass spectrometer, CDMS, comprises:

the electrostatic sector field ion trap and the inductive charge detector;

wherein the electrostatic sector field ion trap is configured to define, at least in part, the ion path via the inductive charge detector;

and the fragmentation device;

wherein the electrostatic sector field ion trap comprises a set of electrostatic sectors, including a first electrostatic sector and a second electrostatic sector, wherein the first electrostatic sector and the second electrostatic sector are mutually spaced apart by a field-free region traversed by the ion path, wherein the electrostatic sector field ion trap is a periodic structure and defines, at least in part, a closed ion path, such that ions around the closed ion path repeatedly, for example an integral or a non-integral number of turns;

wherein the CDMS comprises means for introducing a population P of precursor ions into the ion path, wherein P is a natural number greater than 1, wherein the population of precursor ions respectively adopt substantially random discrete initial positions along a portion of the ion path, such that the population of precursor ions moves generally mutually spatially and/or temporally separated therearound simultaneously;

wherein the CDMS comprises an ion isolating optical element configured to isolate a particular precursor ion or plurality of precursor ions of the population of precursor ions for fragmentation by the fragmentation device, wherein the ion isolating optical element is configured to isolate the particular precursor ion or plurality of precursor ions by applying an electrical field, according to a mass to charge m/z thereof, according to an oscillation frequency, for example a harmonic thereof, of the particular precursor ion or plurality of precursor ions in the electrostatic sector field ion trap;

wherein the CDMS comprises means for ejecting ions from the ion path into the fragmentation device, wherein the means for ejecting ions is configured to eject the particular precursor ion or plurality of precursor ions from the ion path into the fragmentation device, wherein the fragmentation device is configured to trap the ejected particular precursor ion upon entering the fragmentation device, fragment the particular precursor ion or plurality of precursor ions thereby providing product ions therefrom, optionally trap the plurality of product ions and increase respective ion energies of the plurality of product ions, as described below, and inject the plurality of product ions having the increased respective ion energies into the ion path for determination of the respective masses of the plurality of product ions.

Method

The fourth aspect provides a method of determining masses of ions, the method comprising:

moving, by an electrostatic sector field ion trap, a precursor ion around an ion path defined, at least in part, thereby, via an inductive charge detector;

inducing, by the moving precursor ion, a signal in the inductive charge detector;

determining a mass of the precursor ion using the induced signal;

fragmenting the precursor ion and providing a product ion therefrom; and determining a mass of the product ion.

The precursor ion, the ion path, the inductive charge detector, the electrostatic sector field ion trap, the fragmenting and/or the product ion may be as described with respect to the third aspect. In one example, the method according to the fourth aspect is performed using a CDMS according to the third aspect.

In one example, the method comprises:

1. introducing a population of ions (i.e. an ion population) having different mass to charge m/z ratios, preferably as a pencil of mutually spatially separated ions, into the electrostatic sector field ion trap;
2. moving, by the electrostatic sector field ion trap, the ion population around the ion path via the inductive charge detector; inducing, by the moving ion population, respective signals in the inductive charge detector; and determining respective masses of the ion population using the measured respective fundamental frequencies of oscillation of the ion population and respective induced signals;
3. selecting a single mass species (i.e. a precursor to be isolated) or a plurality of mass species (i.e. a plurality of precursor ions to be isolated having a mass within a selected mass window) from the ion population by:
4. applying an oscillatory deflection and/or (de)focussing field in the ion path at a chosen harmonic of the frequency of oscillation of the selected species, to eject the other ions included in the ion population;
5. optionally, adjusting a lens potential to confine the selected species to a relatively narrower "Z" trajectory in preparation for ejection thereof;
6. ejecting the selected species upstream or downstream from the electrostatic sector field ion trap into a fragmentation device, for example by reducing a potential of an electrostatic sector of a set thereof of the electrostatic sector field ion trap, for example timed by use of frequency and/or phase information;
7. fragmenting, using the fragmentation device, the selected species thereby providing a product ion population therefrom and optionally, controlling (for example increasing) respective ion energies of the product ion population;
8. introducing the product ion population, preferably as a pencil of mutually spatially separated ions, into the electrostatic sector field ion trap;
9. determining respective masses of the product ion population as described with respect to the ion population mutatis mutandis; and
10. optionally, repeating steps 3 to 9 to provide $MS^n$ analysis.

CDMS

The fifth aspect provides a charge detection mass spectrometer, CDMS, comprising:

an electrostatic ion trap and an inductive charge detector, wherein the electrostatic ion trap is configured to define, at least in part, an ion path via the inductive charge detector;

a fragmentation device;

means for ejecting ions from the ion path into the fragmentation device; and means for injecting ions from the fragmentation device into the ion path.

In contrast to the CDMS according to the third aspect, the CDMS according to the fifth aspect comprises an electrostatic ion trap c.f. an electrostatic sector field ion trap, thereby including cone traps and ELITs, such as described by references [2], [3], [17] and [18]. However, the fragmentation device of the CDMS according to the fifth aspect comprises and/or is an external fragmentation device as described with respect to the third aspect, thereby overcoming a disadvantage of conventional CDMS including photofragmentation, as described previously.

The CDMS according to the fifth aspect may be as described with respect to the CDMS according to the third aspect, mutatis mutandis.

Method

The sixth aspect provides a method of determining masses of ions, the method comprising:

moving, by an electrostatic ion trap, a precursor ion around an ion path defined, at least in part, thereby, via an inductive charge detector;

inducing, by the moving precursor ion, a signal in the inductive charge detector;

determining a mass of the precursor ion using the induced signal;

fragmenting the precursor ion and providing a product ion therefrom, comprising ejecting the precursor ion from the ion path into a fragmentation device, fragmenting the precursor ion therein to provide the product ion and ejecting the product ion from the fragmentation device into the ion path; and determining a mass of the product ion.

The method according to the sixth aspect may be as described with respect to the method according to the fifth aspect, mutatis mutandis. In one example, the method according to the sixth aspect is performed using a CDMS according to the fifth aspect.

Definitions

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention, such as colourants, and the like. The term "consisting of" or "consists of" means including the components specified but excluding other components. Whenever appropriate, depending upon the context, the use of the term "comprises" or "comprising" may also be taken to include the meaning "consists essentially of" or "consisting essentially of", and also may also be taken to include the meaning "consists of" or "consisting of". The optional features set out herein may be used either individually or in combination with each other where appropriate and particularly in the combinations as set out in the accompanying claims. The optional features for each aspect or exemplary embodiment of the invention, as set out herein are also applicable to all other aspects or exemplary embodiments of the invention, where appropriate. In other words, the skilled person reading this specification should consider the optional features for each aspect or exemplary embodiment of the invention as interchangeable and combinable between different aspects and exemplary embodiments.

BRIEF DESCRIPTION OF THE DRAWINGS

For a better understanding of the invention, and to show how exemplary embodiments of the same may be brought into effect, reference will be made, by way of example only, to the accompanying diagrammatic Figures, in which.

DETAILED DESCRIPTION OF THE DRAWINGS

Figure 1A:
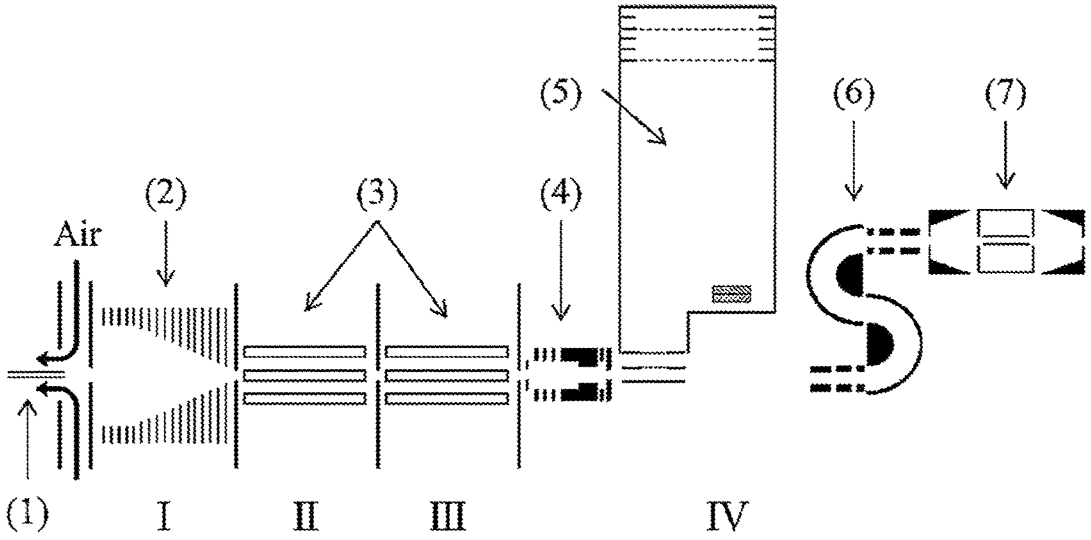
Fig. 1A (prior art)
FIG. 1A schematically depicts a conventional CDMS.
Figure 1B:
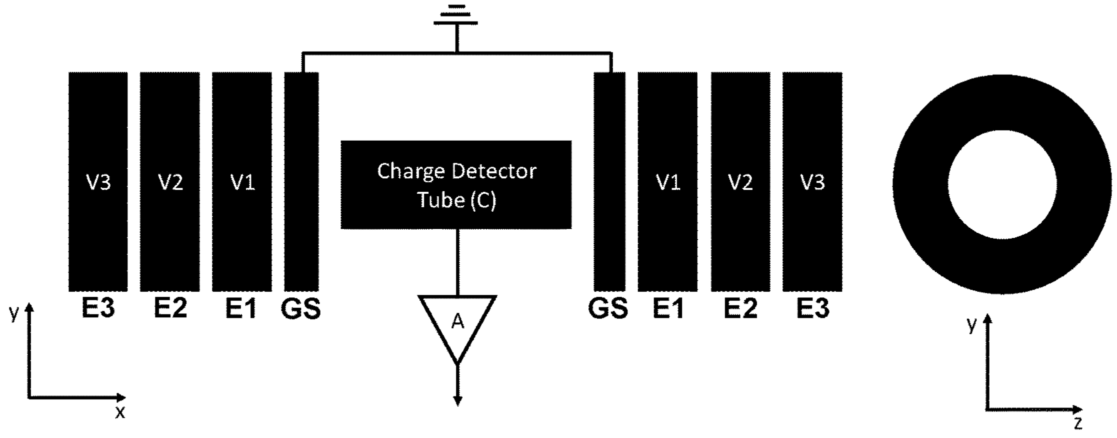
Fig. 1B (prior art)
FIG. 1B schematically depicts a conventional CDMS, based on the conventional CDMS of FIG. 1A.

FIG. 1A schematically depicts a conventional CDMS 10; and FIG. 1B schematically depicts a conventional CDMS 20, based on the conventional CDMS 10 of FIG. 1A.

FIG. 1A, in more detail, schematically depicts the CDMS 10 due to Contino and Jarrold [1]. The CDMS 10 includes an electrospray source 1 and is divided into four differentially pumped regions (I to IV). The first region I includes an ion funnel 2, the second and third regions II, III each include a hexapole ion guide 3 and the fourth region IV provides two alternative paths for ions via a focusing lens 4: an orthogonal reflectron time-of-flight mass spectrometer (TOF-MS) 5 or a dual hemispherical deflection analyser (HDA) 6 followed by a cone trap 7 incorporating an image charge detector tube. The oscillation frequency of an ion in the cone trap 7 is related to the m/z of the ion, but also depends on the ion's kinetic energy. To reduce the uncertainty in the m/z determination, the dual HDA 6 was employed to select a narrow window of ion kinetic energies to introduce into the cone trap 7. The HDA 6 consists of two concentric hemispherical electrodes, each having a deflection angle $\psi_0$ of 180°, held at different potentials, which produce an electric field proportional to $1/r^2$. As shown in FIG. 1A, the two hemispherical electrodes are placed in an S-shaped tandem arrangement, thus defining an open (c.f. a closed) ion path and allowing the ion beam to maintain its original direction upon exit. The electrode potentials applied to the two hemispherical electrodes determine which kinetic energies are passed and hence which ions are filtered. Carefully choosing these electrode potentials, as well the location and diameter of the entrance and exit apertures, improves the energy resolution of the dual HDA 6. The cone trap 7 consists of two conical end caps located 95.25 mm apart with a 6.35 mm diameter aperture, thereby providing an electrostatic linear ion trap. The number of ions entering the cone trap 7 was kept low enough such that the probability of trapping more than one ion was small. A charge detector tube (25.4 mm long, 6.35 mm ID) was held along the central axis by an insulator mounted within a shielded cylinder. When an ion passes through the detector tube, an image charge of equal magnitude but opposite sign is induced.

FIG. 1B, in more detail, schematically depicts the prior art geometry of the cylindrical ELIT trap (i.e. the CDMS 20) of reference [3]. This ELIT comprises two mutually-opposed equispaced three-electrode mirrors (E1, E2, E3) having grounded shield ring electrodes (GS) at respective entrances thereof to create field free regions between the end caps where the charge detector tube (C) is located. Potentials V1, V2, V3 respectively applied to the ring electrodes V1, V2, V3 were optimised to produce the smallest breadth in oscillation frequency for 100 axial ions having a Gaussian energy distribution of mean 130 eV/z and FWHM of 1 eV/z. This ELIT has a substantially improved energy dependence when compared to the cone trap 7 of the CDMS 10 and replaces the cone trap 7 of the CDMS 10. That is, the CDMS 20 also requires the upstream energy filtering device consisting of a dual hemisphere electrostatic energy selector (i.e. the dual HDA 6) so that the variation in oscillation frequency due to ion energy spread is kept to a minimum. The selection of a lower energy spread of ions reduces the overall transmission of the CDMS 20. As with the CDMS 10, the number of ions entering the ELIT was kept low enough such that the probability of trapping more than one ion was small.

It is an object of the present invention to improve ion transmission by allowing a larger portion of ions into the CDMS trap.

Figure 2B:
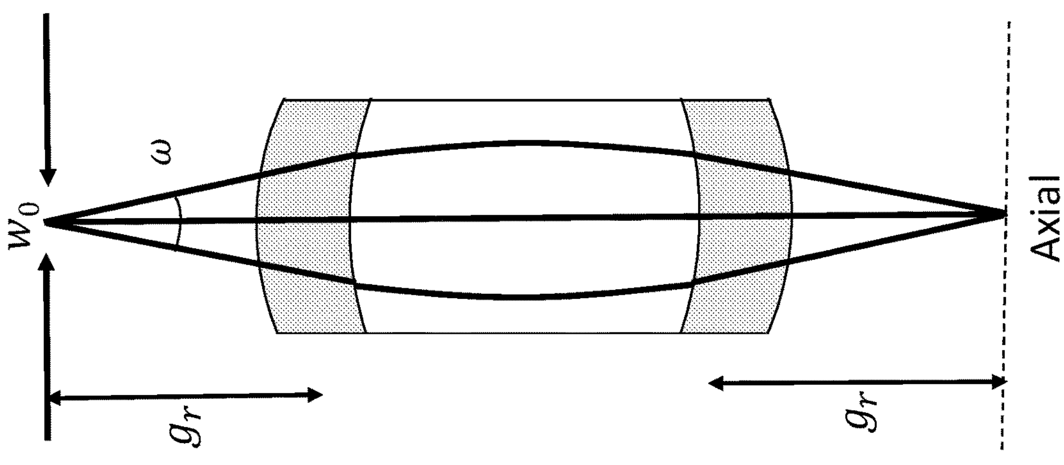
FIGS. 2A and 2B schematically depict a conventional electrostatic sector field employing toroidal sector fields.
Figure 2A:
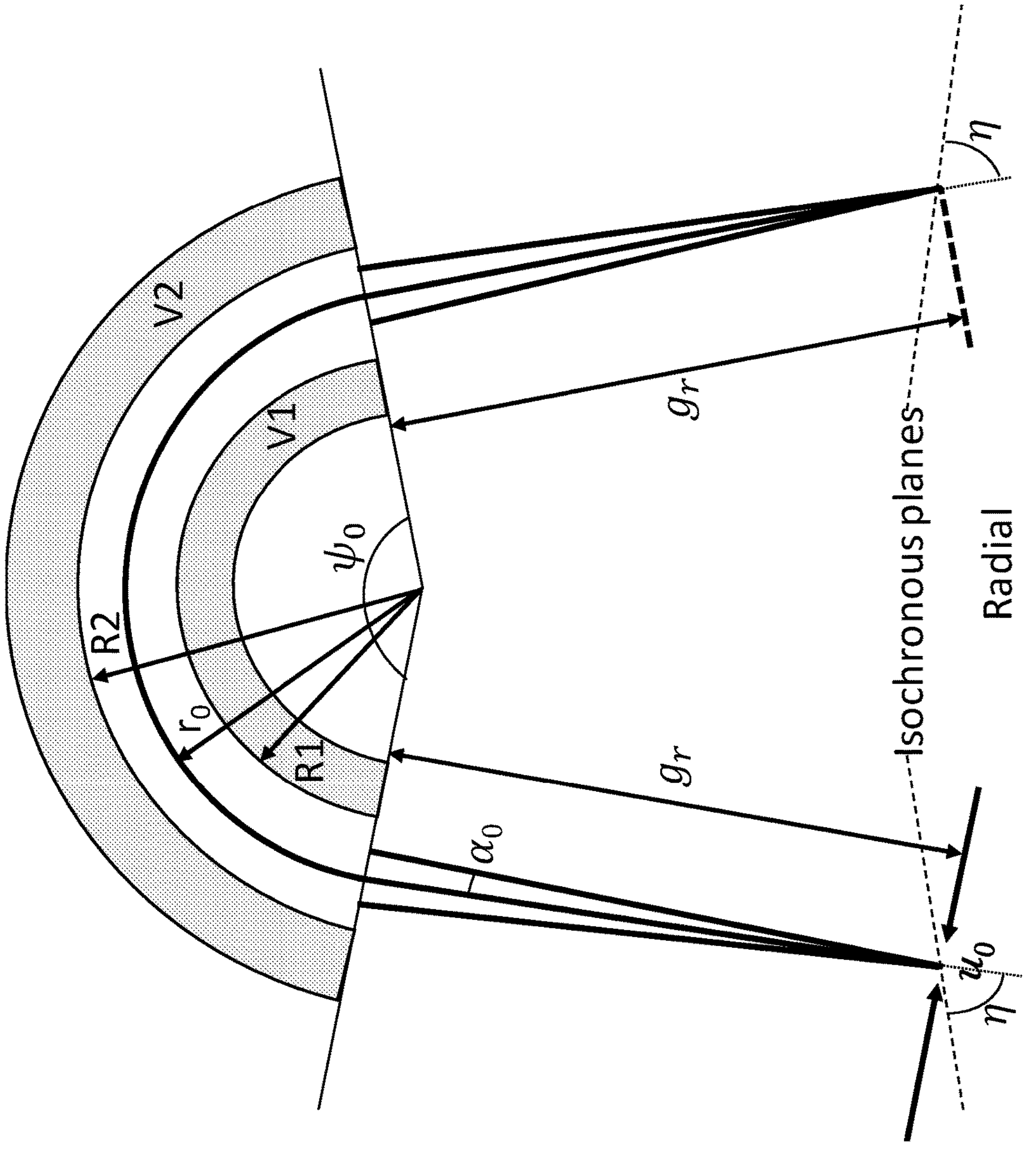

FIGS. 2A and 2B schematically depict a conventional electrostatic sector field employing toroidal sector fields.

The inventor of the present invention recognised that a better energy focussing characteristic may be achieved by employing a geometry first proposed by Poschenrieder [4], who considered time-of-flight energy focusing by electrostatic fields. Particularly, Poschenrieder considered configurations of linear drift spaces and fields in which the time-of-flight is no longer a function of the initial energy to first order but of the mass to charge ratio m/z only. Such configurations are also known as isochronous. For ions of about equal energy, electrostatic fields should be used since trajectories should be identical for all masses. While Poschenrieder limited treatment to toroidal sector fields, other configurations are possible, as described below.

Poschenrieder's work proposed the use of toroidal sector fields in special arrangements to compensate for initial ion conditions for time-of-flight mass spectrometry. FIGS. 2A and 2B shows the general form of such an arrangement. The device is considered from both radial (FIG. 2A) and axial (FIG. 2B) perspectives, each with a different radius of curvature for the electric field, hence they are known as toroidal sector field analysers. A DC potential V1 is applied to the inner electrode, having radius R1 in the radial plane and a DC potential V2 is applied to the outer electrode, having radius R2 in the radial plane. The ion optical axis has a radius R0 in the radial plane. The device has a deflection angle of $\psi_0$ and acceptance angles of $2\alpha_0$ radially and $2\omega$ axially, effectively delimited by slits having widths $u_0$ radially and $w_0$ axially, respectively. Isochronous planes are disposed a distance $g_r$ from the entrance and the exit of the device, at angles $\eta$ to the ion optical axis, providing point focusing of ions thereat. The paper presents a number of geometries intended to be operated as time-of-flight (TOF) analysers whereby packets (also known as clouds) of ions are injected through an entrance aperture and detected at an exit plane using an electron multiplier or similar destructive detector. Electric sector TOF analysers have found application in imaging applications such as TOF-SIMS instruments due to their stigmatic properties [5]. However, they are less suited to the mainstream application of orthogonal acceleration (oa) TOF analysers due to their energy focussing characteristic being limited to first order. This is because orthogonal acceleration leads to very large energy spreads in the ion beam which are better compensated by reflectron-based TOF analysers [6]. The particular case of a CDMS instrument has no requirement for orthogonal acceleration and so the variation in ion energy is given only by the longitudinal variation in beam energy as determined by the upstream beam conditioning. Typical energy variations of a few percent can easily be accommodated by the first order energy focussing characteristic of the electrostatic sector field ion traps, which is superior to that demonstrated in [3]. The electrostatic sector field ion traps has a further advantage in that the ions travel at a substantially constant speed as determined by the acceleration energy. This improves the space charge capacity of sectors when compared to reflecting based devices in which ions must slow to a low speed as they turn around in the mirror section.

A particular geometry proposed by Poschenrieder for a TOF MS (but still problematic for TOF MS injection and detection) and improvements to it provide, as appreciated for the first time by the inventor, an electrostatic sector field ion trap for CDMS according an exemplary embodiment.

Ion velocity v of an ideal ion, having a mass m, after entering an electrostatic sector field, with ion energy $$(1+\beta)mv_0^2/2,$$

is given to first order by Equation (7) of Poschenrieder [4]:

$$v = v_0\left[1 + \frac{1}{2}\beta - u_0 \cos\psi_0 h + \frac{\alpha_0}{h}\sin\psi_0 h + \frac{\beta}{h^2}(1-\cos\psi_0 h)\right]$$

where:

$\beta$ is the fractional ion energy spread for ions having been accelerated to an ion energy $E_a$ and where $\Delta E \ll E_a$:

$$\beta = \Delta E/E_a$$

u is the deviation of the ion from the central path $u_0$;

h and k are auxiliary parameters given by:

$$h = \sqrt{(2-c)}$$

$$k = \sqrt{cx}$$

$$c = \frac{r_0}{\rho_0}$$

where $r_0$ is the radial radius and $\rho_0$ is the axial radius of the central equipotential plane;

$\psi_0$ is the deflection angle of the sector field between the limits $180° \le \psi_0 h \le 360°$; and $\alpha_0$ is the entrance angle.

The time-of-flight $t_e$ through the electrostatic sector field is then obtained by integration of $$dt_e = r_0(1+u)ds/v$$

which to first order gives Equation (8) of Poschenrieder [4]:

$$t_e = r_0\sqrt{\frac{2m}{E_a}}\left\{\frac{\Omega_0}{2} + \beta\left[\left(\frac{1}{h^2}-\frac{1}{4}\right)\psi_0 - \frac{\sin\psi_0 h}{h^3}\right] + \frac{\alpha_0}{h}\left(\frac{u_0}{\alpha_0}h\sin\psi_0 h - \cos\psi_0 h + 1\right)\right\}$$

Elimination of the dependence of $t_e$ on the entrance angle $\alpha_0$ requires Equation (9) of Poschenrieder [4]:

$$g_r = \frac{u_0 r_0}{\alpha_0} = \frac{r_0}{h}\tan\left(180° - \frac{\psi_0 h}{2}\right)$$

which defines the distance $g_r$ of the source point form the field edge. With $g_r$ being positive, Equation (9) of Poschenrieder [4] describes an electrostatic sector field with a deflection angle (also known as sector angle) $\psi_0$ between the limits $180° \le \psi_0 h \le 360°$. This electrostatic sector field configuration has an intermediary image at $\psi_i = \psi_0/2$ and a second image symmetric to the source point at a distance $g_r' = g_r$ from the field edge on the exit side.

An electrostatic sector field obeying Equation (9) of Poschenrieder [4] is simultaneously free of first-order chromatic aberrations at the second image. However, large lateral energy dispersion may be found at the intermediary image, though the transmitted energy spread may be limited here by a suitable stop.

The dispersion in time-of-flight $\Delta t_e$ due to the fractional ion energy spread $\beta=\Delta E/E_a$ within the electrostatic sector field is given by Equation (10) of Poschenrieder [4]:

$$\Delta t_e = r_0\sqrt{\frac{2m}{E_a}}\beta\left[\left(\frac{1}{h^2}-\frac{1}{4}\right)\psi_0 - \frac{\sin\psi_0 h}{h^2}\right]$$

The dispersion $\Delta t_D$ along a linear drift tube of length D is given simply by Equation (11) of Poschenrieder [4]:

$$\Delta t_D = -\sqrt{\frac{2m}{E_a}}\beta\frac{D}{4}$$

For an electrostatic sector field to be free of this person requires that $\Delta t_e+\Delta t_D=0$, which leads to the focusing condition given by Equation 12 of Poschenrieder [4]:

$$\frac{D}{4} = r_0\left[\left(\frac{1}{h^2}-\frac{1}{4}\right)\psi_0 - \frac{\sin\psi_0 h}{h^3}\right]$$

The actual linear drift length D can comprise $g_r$ on the entrance side, $g_r'$ on the exit side and some additional drift range d.

Hence, an electrostatic sector field obeying Equation 12 of Poschenrieder [4] will be free of any energy-dependent dispersion in time-of-flight (isochronous) for any two points comprising a linear drift range of total length D. In addition, this electrostatic sector field will provide achromatic radial imaging for a point G at a distance $g_r$ from the field edge.

Consider an electrostatic sector field with stigmatic imaging in which a radial and an axial intermediary image coincide at $\psi_i=\psi_0/2$. If $g_a$ represents the distance of the entrance from the field slit for axial focusing, from the directional focusing properties of toroidal sector field, the distance $g_r$ of the source point form the field edge is given by Equation 20 of Poschenrieder [4]:

$$g_r = g_a = \frac{r_0}{h}\tan\left(180^\circ - \frac{\psi_0 h}{2}\right) = \frac{r_0}{k}\tan\left(180^\circ - \frac{\psi_0 k}{2}\right)$$

Hence, it follows that h=k and c=1, which corresponds to a spherical condenser field. From Equation 12 of Poschenrieder [4] and setting $D=2g_r=2g_a$, Equation 21 of Poschenrieder [4] is obtained:

$$\tan\frac{\psi_0}{2} = 2\sin\psi_0 - \frac{3}{2}\psi_0$$

A graphical solution yields the values:

$$\psi_0=199.2^\circ$$

$$g_r=5.9r$$

Figure 3:
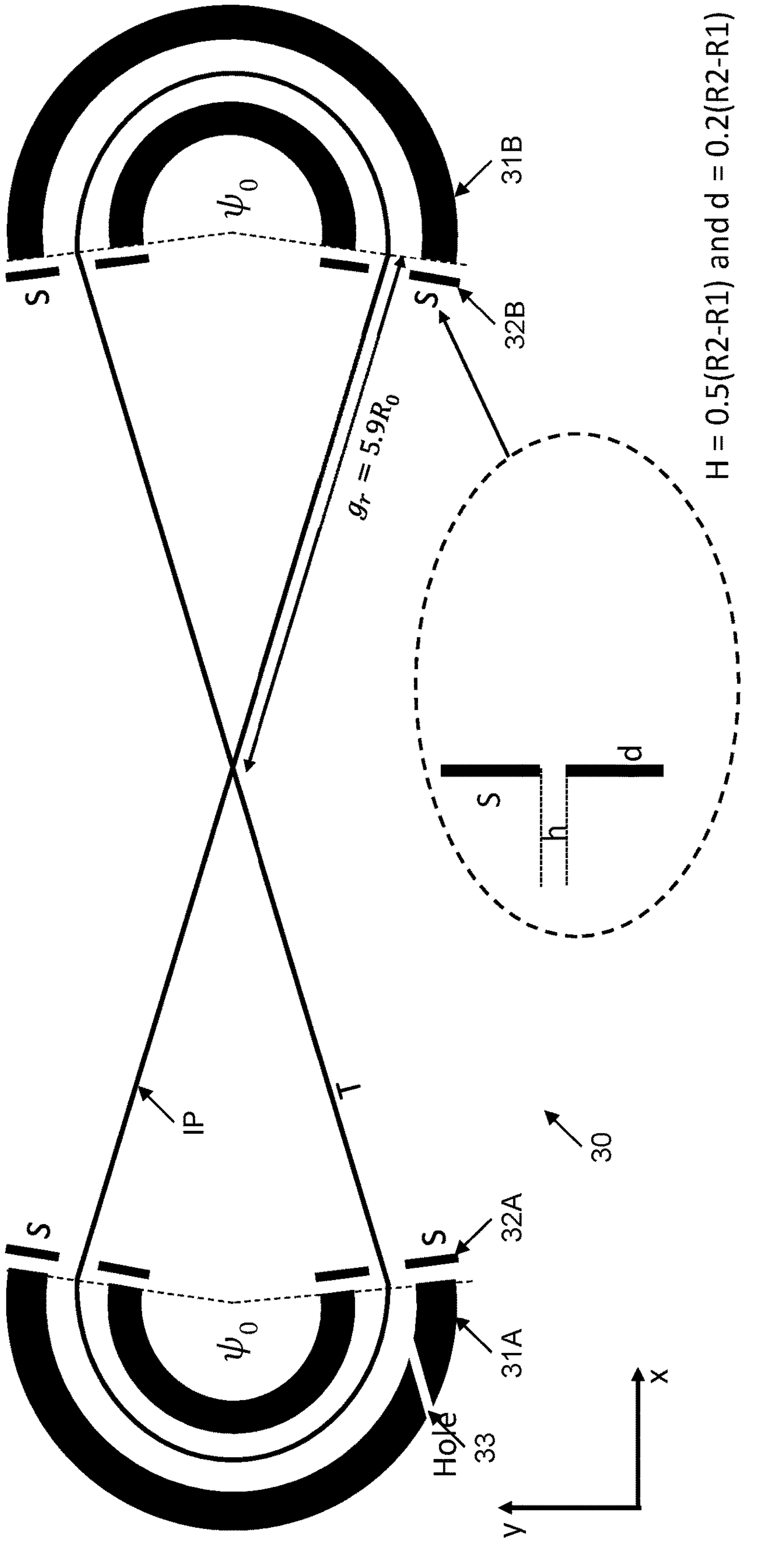
FIG. 3 schematically depicts an electrostatic sector field ion trap for an exemplary embodiment, additionally comprising shunts to control fringe fields.

For this electrostatic sector field, the source and its image exactly coincide, as schematically depicted in FIG. 3, such that time and space focussing coincide. While Poschenrieder [4] noted that this electrostatic sector field is not well suited to a TOF mass spectrometer, the inventor has conversely appreciated that this electrostatic field is instead well-suited to an electrostatic field ion trap. Particularly, this electrostatic sector field is completely isochronous with respect to energy, in which resolution no longer depends on slit width. Note that these values for the deflection angle $\psi_0=199.2^\circ$ and the distance $g_r=5.9r$ were obtained graphically and thus computational methods of calculation may provide refined solutions. Furthermore, constructed geometries may allow for interplay between these values to some extent and/or to compensate for other electric fields, including residual or fringe fields. However, the distance $g_r$ may be critical for achieving true stigmatic performance.

Poschenrieder paper [4] concentrates on isochronicity (time aberrations) with respect to beam initial conditions (all zero to first order) but its treatment of stigmatic (spatial) aberrations was much less expansive. Poschenrieder [4] does not seem to consider the spatial aberrations of ‘angle with respect to position’ or ‘angle with respect to energy’. However, the stigmatic (imaging) requirements of the CDMS are secondary compared with the isochronicity requirements of the CDMS: the stigmatic requirements being sufficiently stable ion trajectories for inductive charge detection, preferably to permit use of relatively narrow charge tubes as described herein, and to avoid ion loss arising from ions wandering away from the ion path.

FIG. 3 schematically depicts an electrostatic sector field ion trap 30 for an exemplary embodiment, additionally comprising shunts to control fringe fields. A Cartesian coordinate system (x, y, z) is employed for FIGS. 3 to 14, appropriately.

In this example, the electrostatic sector field ion trap 30 comprises a set of electrostatic sectors 31, including a first electrostatic sector 31A and a second electrostatic sector 31B. In this example, the first electrostatic sector 31A is a spherical electrostatic sector. In this example, the first electrostatic sector 31A and the second electrostatic sector 31B are mutually opposed. In this example, the set of electrostatic sectors 31 includes only the first electrostatic sector 31A and the second electrostatic 31B. In this example, the first electrostatic sector 31A comprises a set of shunts 32, including a first shunt 32A, arranged to delimit a field due to the first electrostatic sector 31A. In this example, the electrostatic sector field ion trap 30 is isochronous. In this example, the electrostatic sector field ion trap 30 is configured to define the ion path IP in three mutually-orthogonal dimensions. In this example, the ion path defined by the electrostatic sector field ion trap 30 includes a crossover. In this example, the electrostatic sector field ion trap 30 comprises an ion inlet 33 for introduction of ions therethrough into the ion path, particularly provided in the outer electrode of the first electrostatic sector 31A. In this example, the first electrostatic sector 31A has a deflection angle of $\psi_0=199.2^\circ$. In this example, the field-free region has a length of $g_r=5.9r$ to the central cross over point (i.e. the origin, at which point focus is achieved). In this example, the electrostatic sector field ion trap 30 has rotational symmetry about the x axis through the origin. In this example, the electrostatic sector field ion trap 30 is symmetric in the y-z plane through the origin. In this example, the basic unit comprises two drift spaces (i.e. two field-free regions each having a length of $g_r=5.9r$) and a spherical electrostatic sector 31A, 31B. In this example, the outer electrode of the first electrostatic sector 31A has an internal radius of 23 mm and the inner electrode of the first electrostatic sector 31A has an external radius of 17 mm such that there is a spherically radial gap of 6 mm therebetween. The first shunt 32A has a toroidal aperture of width 4 mm, thereby presenting a relatively large entrance aperture into the first electrostatic sector 31A. The second electrostatic sector 31B is generally as described with respect to the first electrostatic sector 31A, while not including the ion inlet 33.

FIG. 3, in more detail, shows the special case of two opposing spherical sectors 31A, 31B (same curvature for radial and axial fields) each with a deflection angle $\psi_0$=199.2°, and a field free region of 5.9$R_0$ (i.e. $g_r$=5.9r) distance to the central cross over point (i.e. point focus). Poschenrieder understood that the closed path of this arrangement could prove problematic for injection and detection for traditional TOF analysis and went on to propose open geometric solutions more suitable for injection and detection means. That is, Poschenrieder did not propose the ion inlet 33 for introduction of ions therethrough. Furthermore, Poschenrieder did not propose the use of such an analyser for inductive detection, as employed in Fourier Transform mass spectrometers. To the best of the inventor's knowledge, the use of toroidal fields for inductive detection of a small cloud of ions in a Fourier transform trap was first proposed by Wollnik [7] in an arrangement using eight 45° toroidal sectors, but of otherwise unknown geometry, arranged in a ring formation for a TOF MS analyser. Also, latterly Verenchikov proposed the use of toroidal field with Fourier transform detection [8]. However, neither of these two proposals considered using such geometries for a CDMS.

In the arrangement of FIG. 3, ions are injected through a hole (i.e. ion inlet 33) in the outer electrode of the first electrostatic sector 31A while the potentials of the electrodes of the first electrostatic sector 31A are held at ground level. Once the trap is filled, these potentials are raised to their operating levels and the trapping process begins. Note the addition of shunts 32A, 32B to terminate the electric fields of the electrodes of the first electrostatic sector 31A, which would otherwise leak into the field-free region and destroy the operation of the electrostatic sector field ion trap. This particular shunt geometry is known in the art and was proposed by Herzog in 1935, see Yavor pp 230 [9].

Figure 4A:
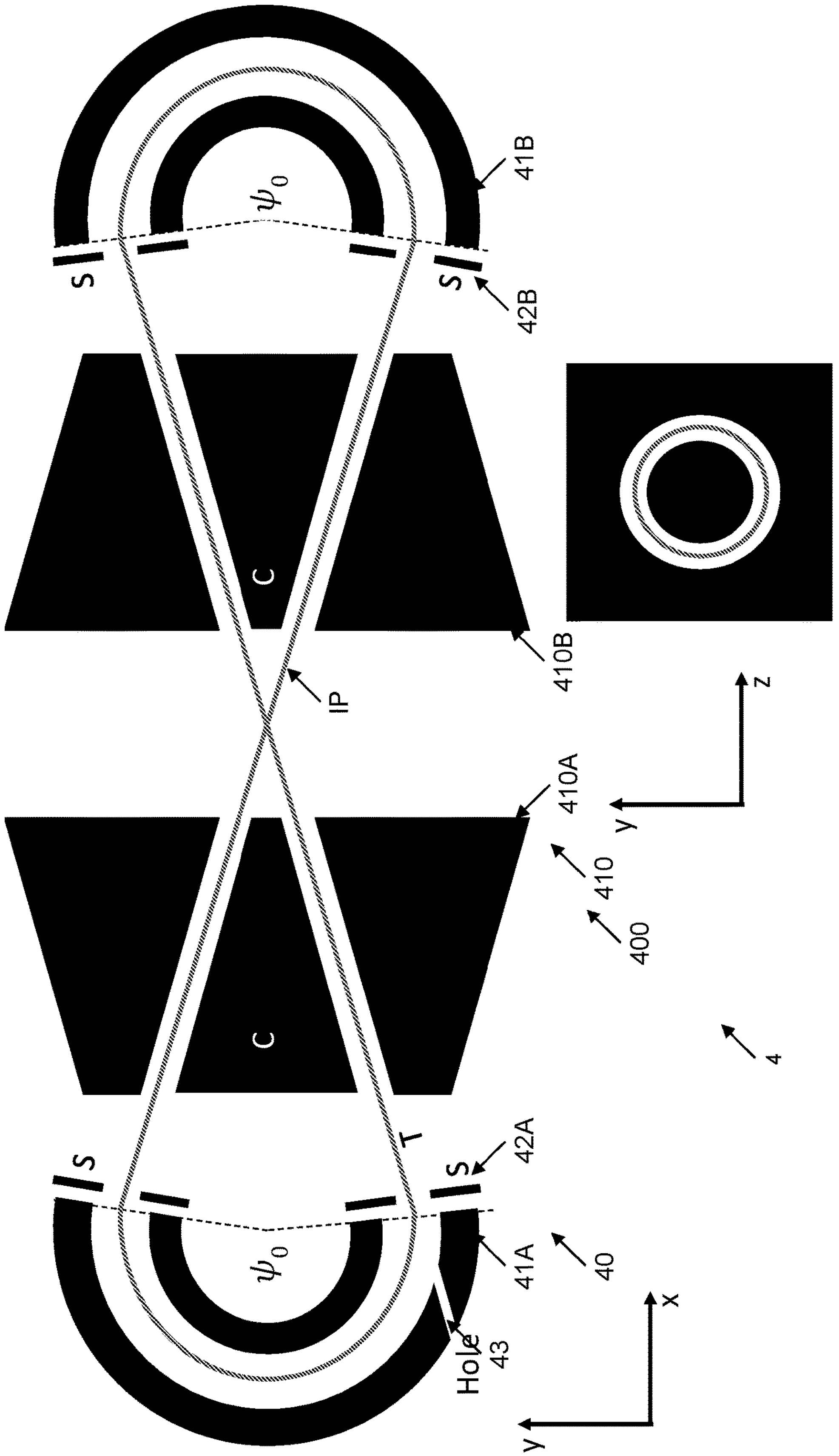
FIG. 4A schematically depicts a CDMS according to an exemplary embodiment.
Figure 4B:
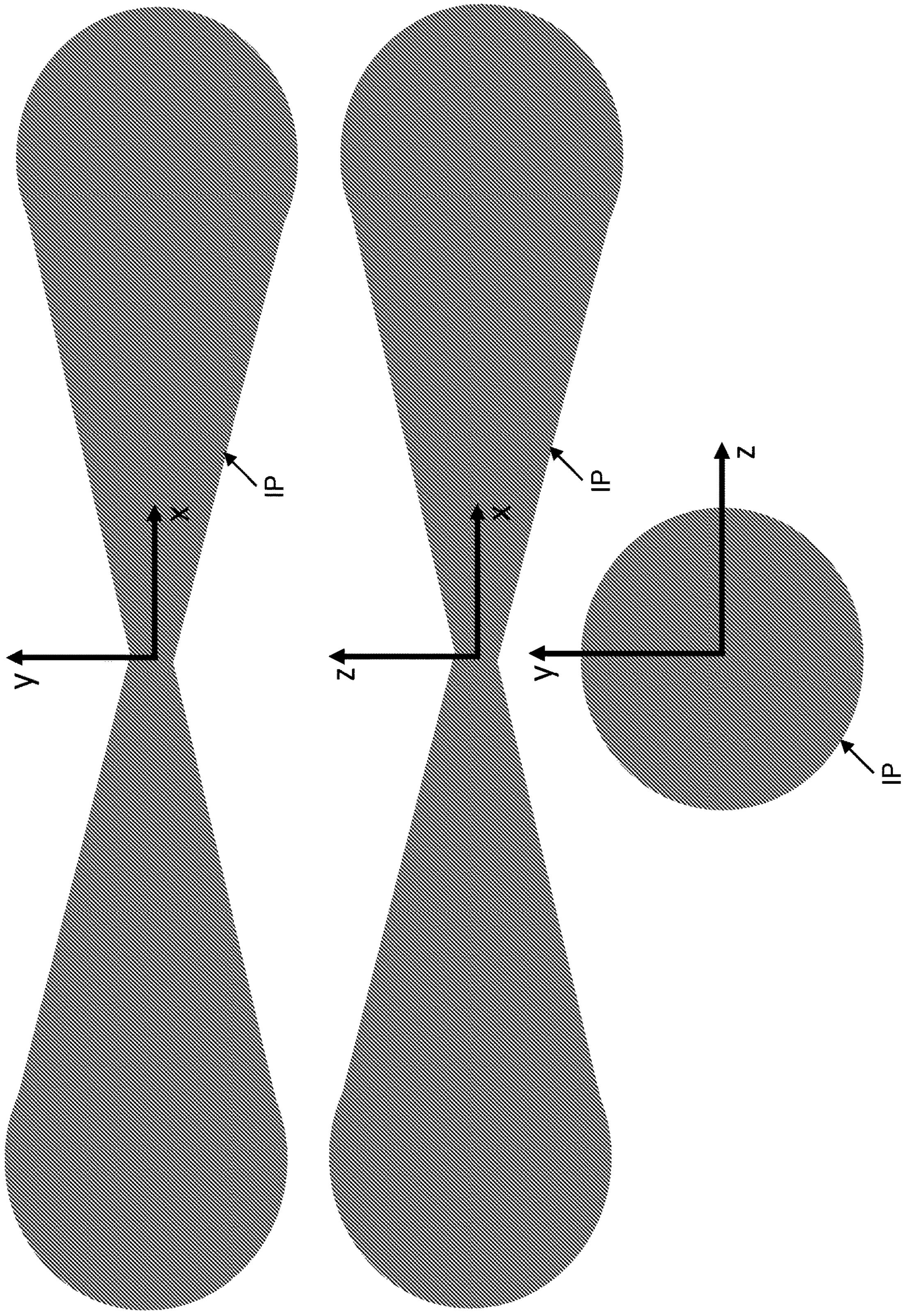
FIG. 4B schematically depicts elevation views, from above, the side and the end, of the locus of ion trajectories for the CDMS.

FIG. 4A schematically depicts a CDMS 4 according to an exemplary embodiment; and FIG. 4B schematically depicts elevation views, from above, the side and the end, of the locus of ion trajectories for the CDMS 4.

In this example, the CDMS 4, comprises: an electrostatic sector field ion trap 40 and an inductive charge detector 400; wherein the electrostatic sector field ion trap 40 is configured to define, at least in part, an ion path via the inductive charge detector 400.

The electrostatic sector field trap 40 is as described with respect to the electrostatic field ion trap 30, as described with respect to FIG. 3, description of which is omitted for brevity. Like reference signs denote like integers.

In this example, the electrostatic sector field ion trap 40 comprises a set of electrostatic sectors 41, including a first electrostatic sector 41A and a second electrostatic sector 41B. In this example, the first electrostatic sector 41A is a spherical electrostatic sector. In this example, the basic unit comprises two drift spaces and a spherical electrostatic sector. In this example, the first electrostatic sector 41A and the second electrostatic sector 41B are mutually opposed. In this example, the set of electrostatic sectors 41 includes only the first electrostatic sector 41A and the second electrostatic 41B. In this example, the first electrostatic sector 41A comprises a set of shunts 42, including a first shunt 42A, arranged to delimit a field due to the first electrostatic sector 41A. In this example, the electrostatic sector field ion trap 40 is isochronous to first order with respect to energy. In this example, the electrostatic sector field ion trap 40 is configured to define the ion path in three mutually-orthogonal dimensions. In this example, the ion path defined by the electrostatic sector field ion trap 40 includes a crossover. In this example, the electrostatic sector field ion trap 40 comprises an ion inlet 43 for introduction of ions therethrough into the ion path. In this example, the first electrostatic sector 41A has a deflection angle of $\psi_0$=199.2°. In this example, the field-free region has a length of $g_r$=5.9r to the central cross over point (i.e. the origin). In this example, the second electrostatic sector 41B is as described with respect to the first electrostatic sector 41A. In this example, the electrostatic sector field ion trap 40 has rotational symmetry about the x axis through the origin. In this example, the electrostatic sector field ion trap 40 is symmetric in the y-z plane through the origin. In this example, the inductive charge detector 400 comprises a first set of charge detector tubes 410, including a first charge detector tube 410A and a second charge detector tube 410B. In this example, the first charge detector tube, having a length L and a width W, has a ratio of the length L to the width W in a range from 3:2 to 5:2, for example 2:1. In this example, a portion of the ion path via the inductive charge detector 400 is about 50% of the ion path defined by the electrostatic sector field ion trap 40.

SIMION [10] simulations were performed with the geometry shown in FIG. 4A and ions could be trapped for an indefinite period dependent on their initial conditions, as schematically depicted in FIG. 4B. If ions are restricted to a narrow axial range (small $\Delta\alpha$), then the resulting trajectories fill a finite arc in the y-z plane. Referring again to FIG. 4A and noting that the input ion conditions take the form of a beam of ions along the trajectory, T, it can be understood that the restoring force in the radial direction is stronger than that of the axial direction. The device is rotational symmetric about the x axis through the origin and so ions with a large angular component $\beta$ or axial spread $\Delta\alpha$ cause the ion trajectories to fill the whole electrostatic sector after many passes around the ion path making a hollow cone shape in the field free regions and spherical surface inside the sectors. In other words, the ions are trapped in a thin wall (ideally of infinitesimal thickness) that may be described as a pair of intersecting and mutually opposed cones or lobes, having approximately hemispherical end caps (corresponding with the gaps between the spherical electrodes of the electrostatic sectors having a deflection angle $\psi_0$ of nominally) 199.2°. The geometrical projections of the ion beam IP (shown in grey) adopted after many passes of the analyser (as required by CDMS) is shown in FIG. 4B.

Figure 5A:
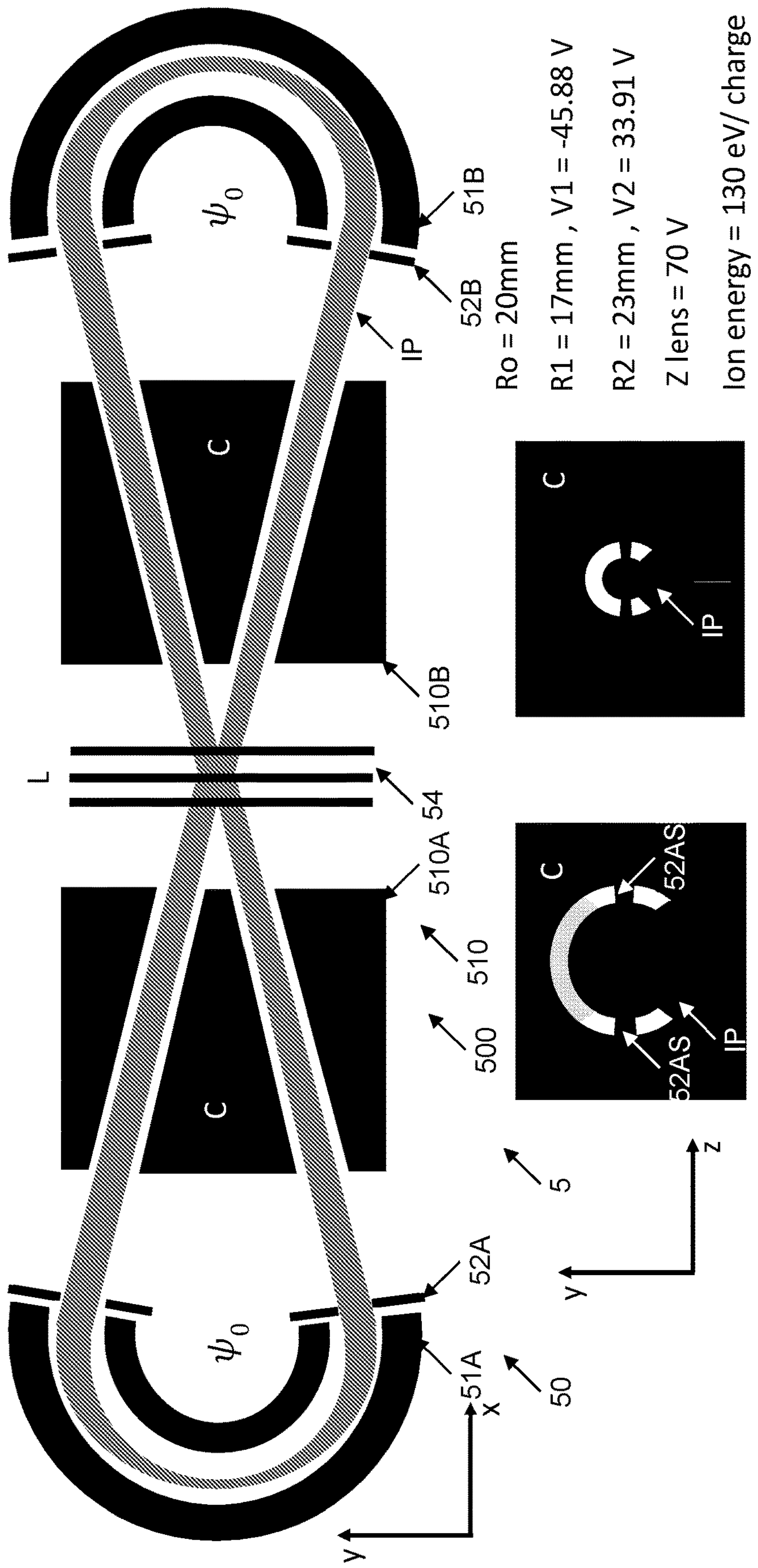
FIG. 5A schematically depicts a CDMS according to an exemplary embodiment, including a lens at the origin to confine ions in the axial (z) dimension.
Figure 5B:
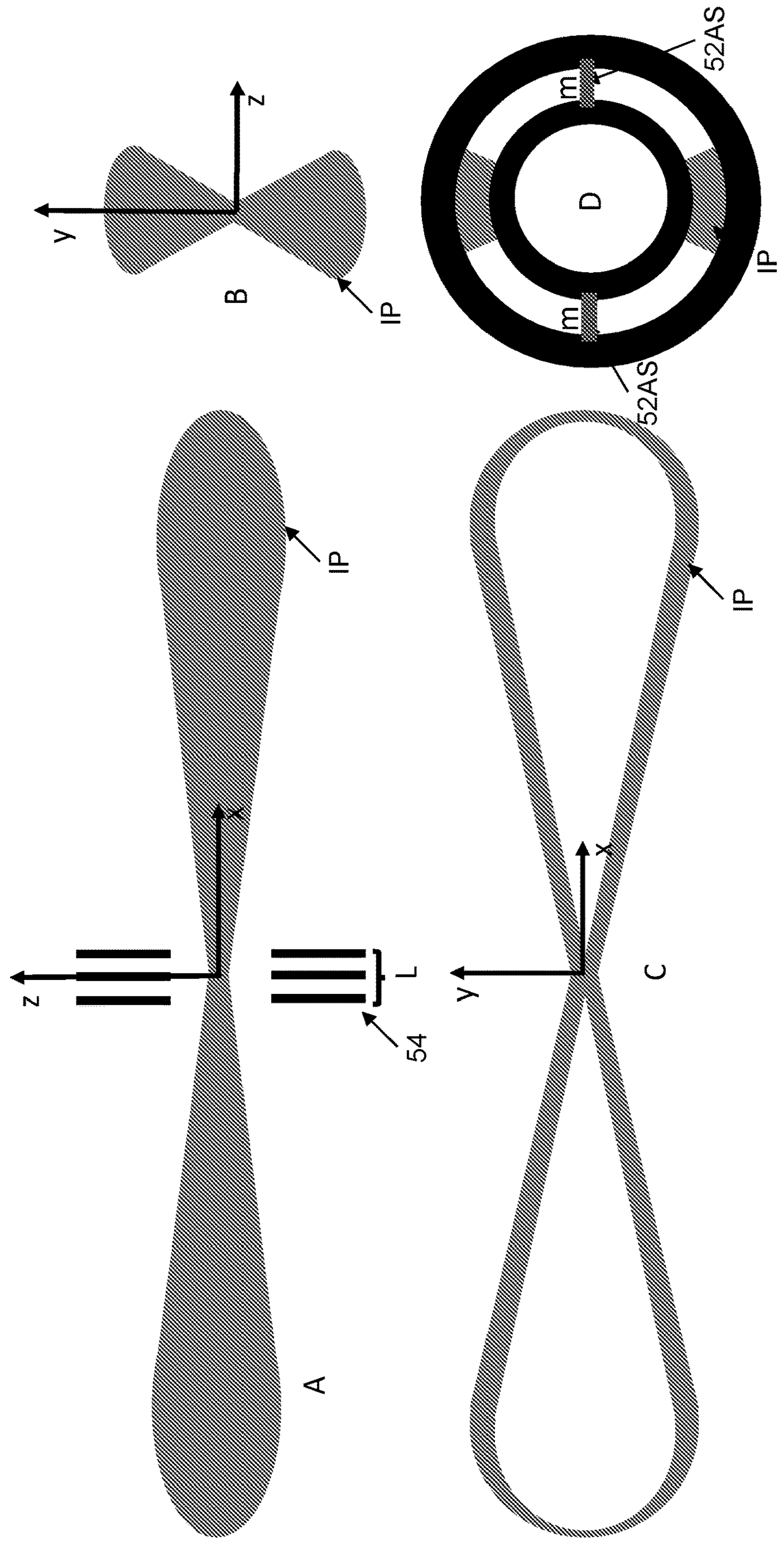
FIG. 5B schematically depicts elevation views, from above, the side and the end, of the locus of ion trajectories for the CDMS.
Figure 5C:
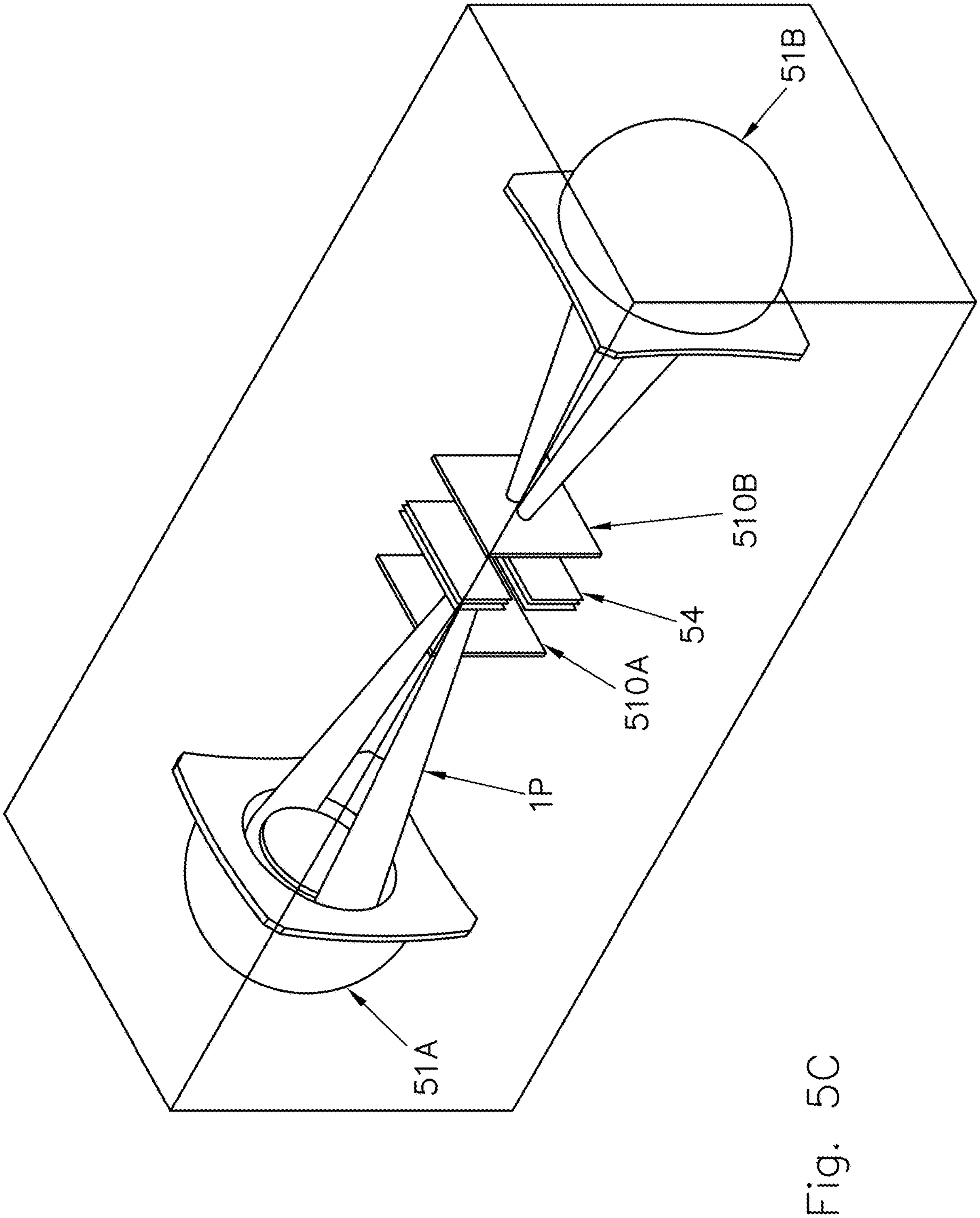
FIG. 5C is a perspective view of a SIMION simulation of ions for the CDMS.
Figure 5D:
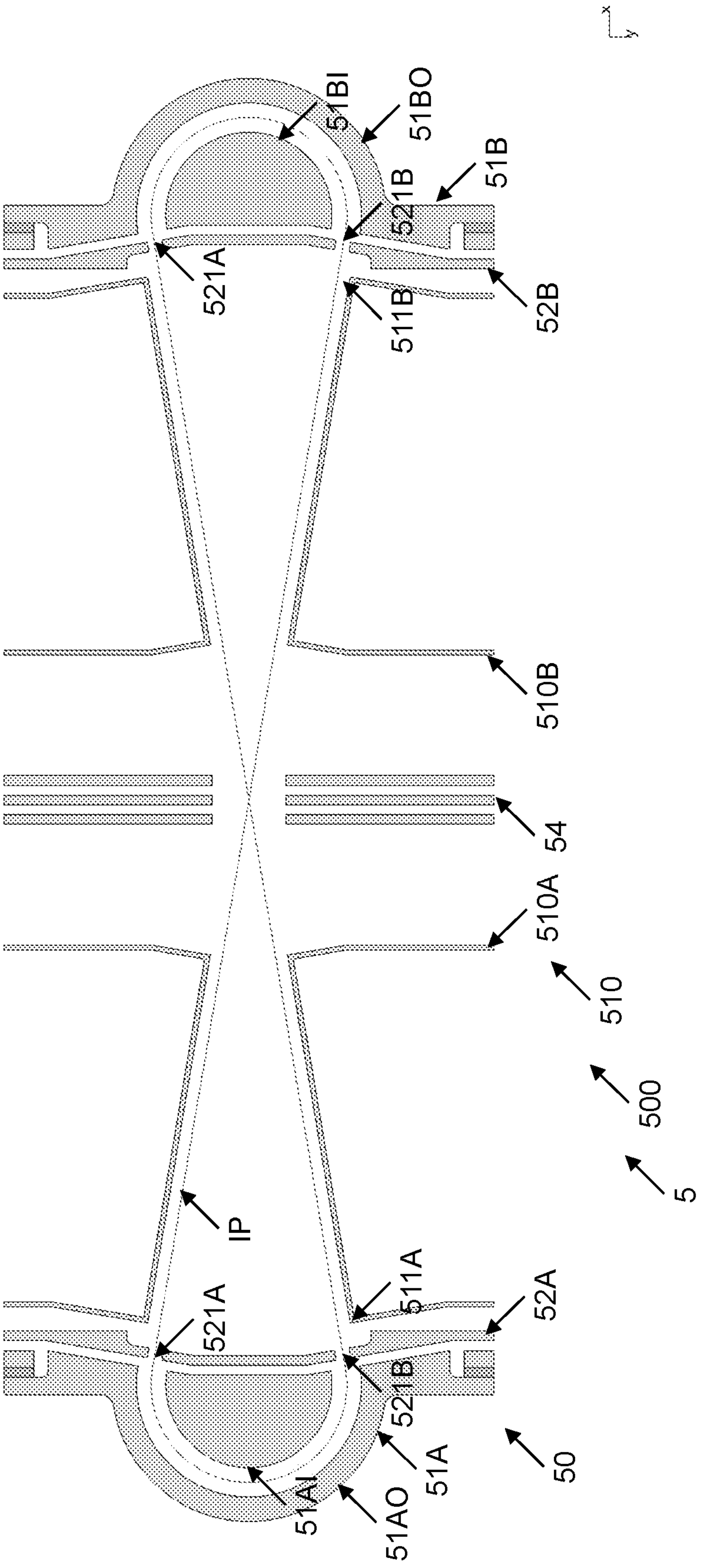
FIG. 5D is an axial cross-sectional view of the CDMS, in more detail.
Figure 5E:
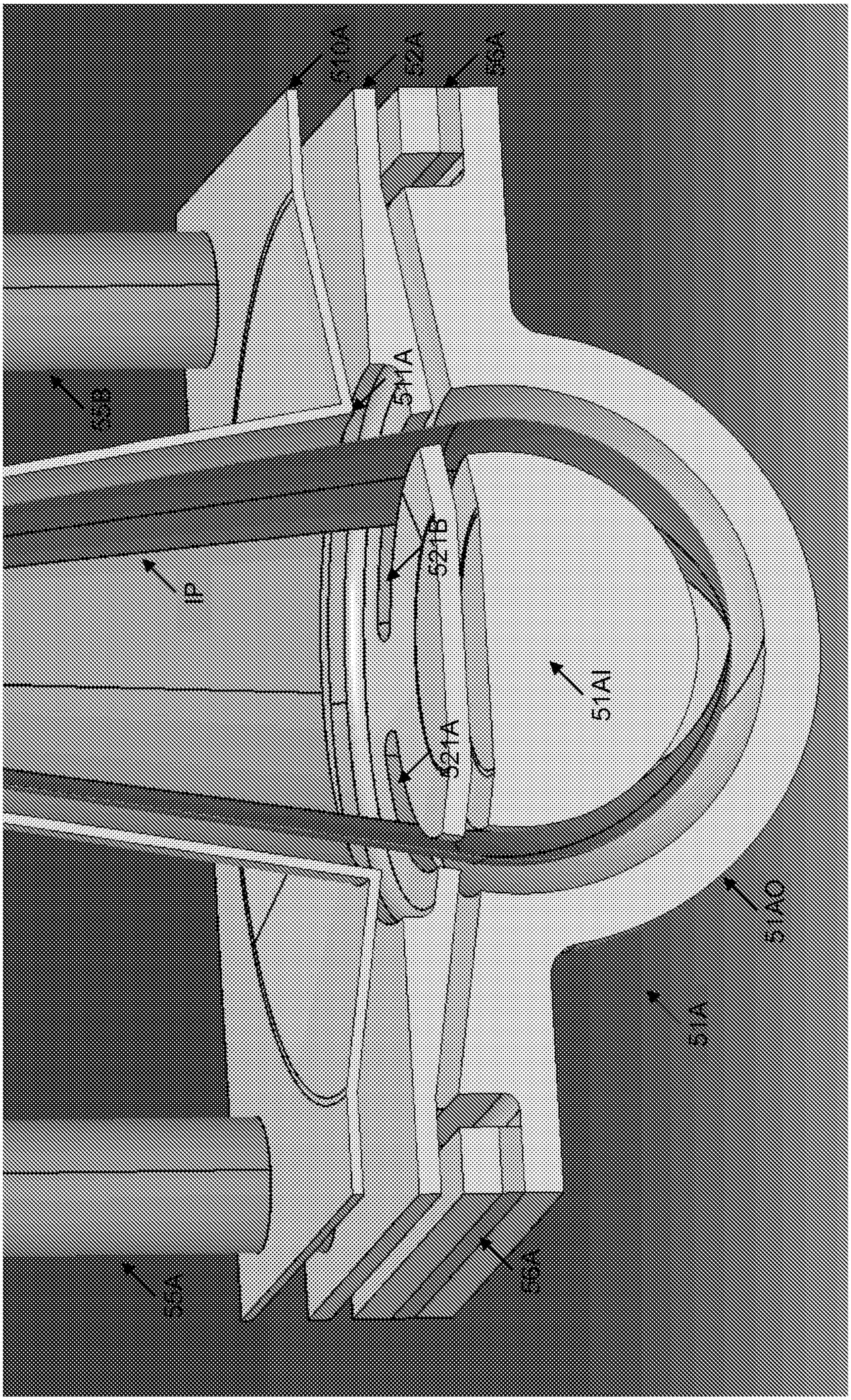
FIG. 5E is a cutaway perspective CAD image of part of the CDMS, in more detail.
Figure 5F:
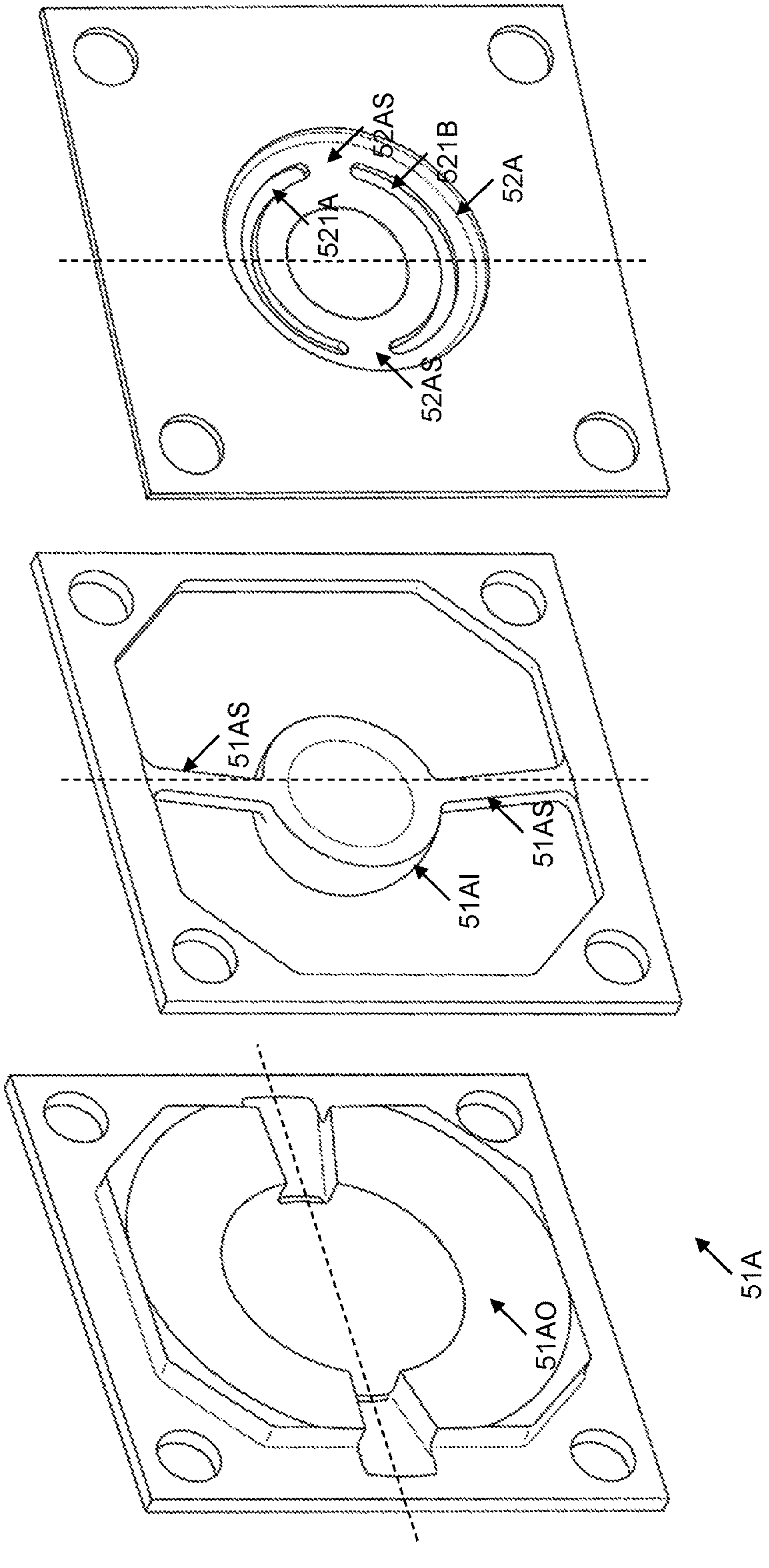
FIG. 5F is an exploded perspective CAD image of part of the CDMS, in more detail.
Figure 5G:
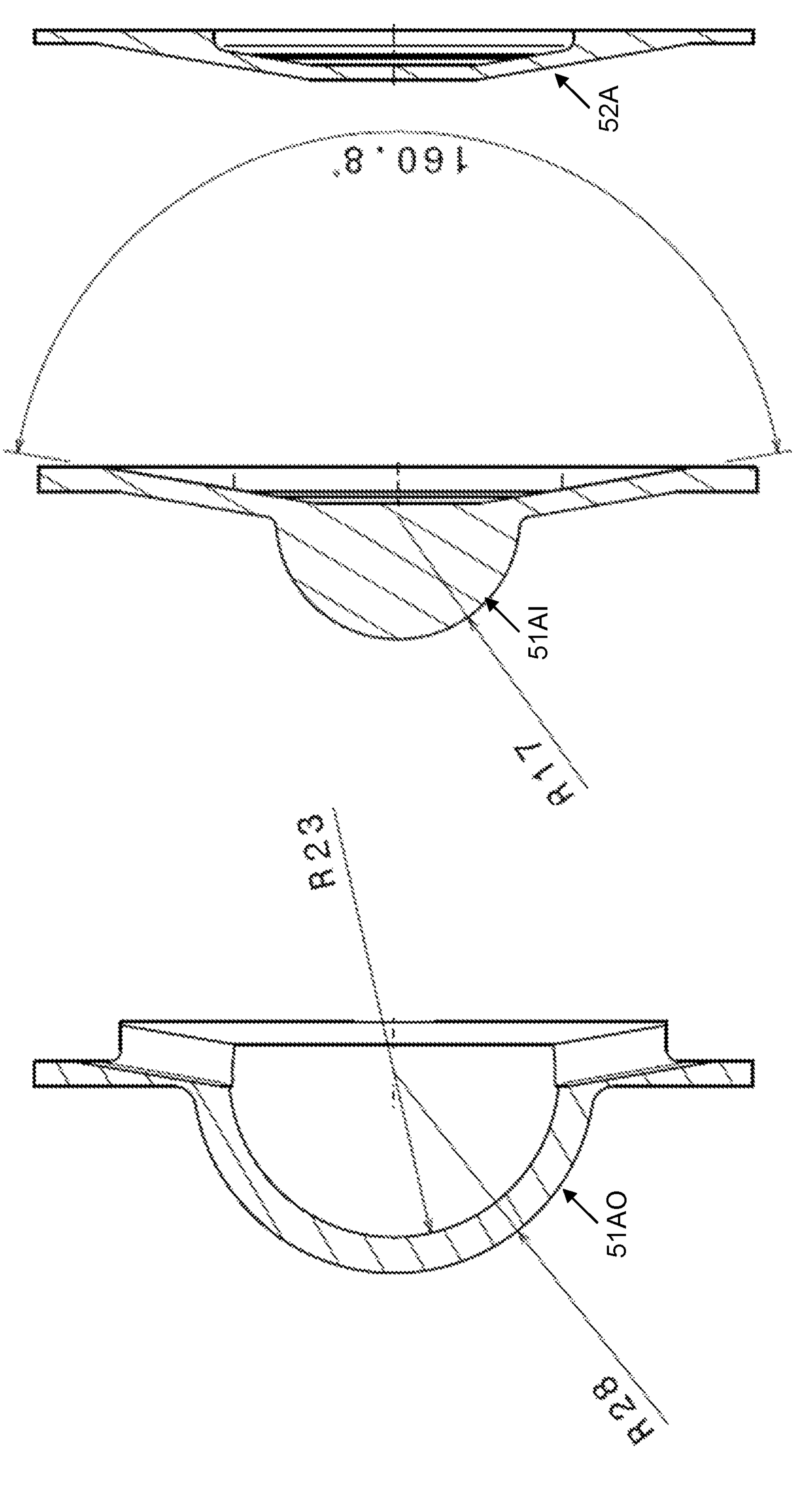
FIG. 5G is an axial cross-sectional view of the CDMS, in more detail.

FIG. 5A schematically depicts a CDMS 5 according to an exemplary embodiment, including a lens at the origin to confine ions in the axial z dimension; FIG. 5B schematically depicts elevation views, from above, the side and the end, of the locus of ion trajectories for the CDMS 5; and FIG. 5C is a perspective view of a SIMION simulation of ions for the CDMS 5; FIG. 5D is an axial cross-sectional view of the CDMS 5, in more detail; FIG. 5E is a cutaway perspective CAD image of part of the CDMS 5, in more detail; FIG. 5F is an exploded perspective CAD image of part of the CDMS 5, in more detail; and FIG. 5G is an axial cross-sectional view of the CDMS 5, in more detail.

The CDMS 5 is generally as described with respect to the CDMS 4, as described with respect to FIGS. 4A and 4B, description of which is omitted for brevity. Like reference signs denote like integers.

In this example, the electrostatic sector field ion trap 50 comprises a set of electrostatic sectors 51, including a first electrostatic sector 51A and a second electrostatic sector 51B. In this example, the first electrostatic sector 51A is a spherical electrostatic sector. In this example, the first electrostatic sector 51A and the second electrostatic sector 51B are mutually opposed. In this example, the set of electrostatic sectors 51 includes only the first electrostatic sector 51A and the second electrostatic 51B. In this example, the first electrostatic sector 51A comprises a set of shunts 52, including a first shunt 52A, arranged to delimit a field due to the first electrostatic sector 51A. In this example, the electrostatic sector field ion trap 50 is isochronous with respect to energy, to first order. In this example, the electrostatic sector field ion trap 50 is configured to define the ion path in three mutually-orthogonal dimensions. In this example, the ion path defined by the electrostatic sector field ion trap 50 includes a crossover. In this example, the electrostatic sector field ion trap 50 comprises an ion inlet 53 for introduction of ions therethrough into the ion path. In this example, the first electrostatic sector 51A has a deflection angle of $\psi_0$=199.2°. In this example, the field-free region has a length of $g_r$=5.9r to the central cross over point (i.e. the origin). In this example, the second electrostatic sector 51B is as described with respect to the first electrostatic sector 51A. In this example, the electrostatic sector field ion trap 50 has rotational symmetry about the x axis through the origin. In this example, the electrostatic sector field ion trap 50 is symmetric in the y-z plane through the origin. In this example, the inductive charge detector 500 comprises a first set of charge detector tubes 510, including a first charge detector tube 510A and a second charge detector tube 510B. In this example, the first set of charge detector tubes 510 comprises an axially segmented charge detector tube, including 10 segments. In this example, the first charge detector tube, having a length L and a width W, has a ratio of the length L to the width W in a range from 3:2 to 5:2, for example 2:1. In this example, a portion of the ion path via the inductive charge detector 500 is about 50% of the ion path defined by the electrostatic sector field ion trap 50.

Referring again to FIG. 4B, the surfaces of revolution create a potential topological problem when concerned with the construction of some CDMS. If ions were allowed to rotate around the whole of the central axis (i.e. the x axis), support of the central or inner electrodes of the inductive charge detector 500 and/or the inner electrodes of the first electrostatic sector 51A and/or the second electrostatic sector 51B may be problematic since the ion trajectories entirely surround these inner electrodes in three dimensions. Generally, addition of a support would cause ions to collide therewith which would reduce the number of oscillations possible in the analyser. One or more supports, such as supports 52AS between, may bridge between the inner and the outer electrodes, for example, and by reducing cross-sectional areas thereof in the ion path, loss of ions through collisions therewith may be reduced. Additionally and/or alternatively, the ion path may be constrained so as to avoid the supports. Hence, a solution to this problem of collisions with the support is to include a set of electrostatic focus lenses, including a first focus lens, arranged to constrain, at least in part, the ion path in a first dimension. In this example, a planar einzel lens 54, comprising three electrodes, is shown in FIG. 5A in the center of the device at the crossover point, providing additional focussing in the z direction (Cartesian coordinates). The geometric projections of the ions after this first focus lens is added are shown in FIG. 5B(A) to (C). A cross section through the spherical electrodes is shown in FIG. 5B(D) with supports 52AS. The result is that ions are now confined to a finite angle and the supports 52AS may be placed away from the ion beam, thereby facilitating construction of the CDMS.

FIG. 5A schematically depicts a preferred embodiment with some typical values for device construction. An ion energy of 130 eV/z has been chosen to allow direct comparison of the state of the art ELIT trap of reference [3]. It should be understood that increasing the operating voltage (ion energy) for these devices may give higher frequencies and consequential improvements in signal to noise and resolution. Such a method has not yet been employed due the need to operate the field free region at a high potential, meaning the possibility of noise injection from the power supply. In the embodiment shown in FIG. 5A, the two charge tubes 510A, 510B are employed either side of the central z lens 54. Referring again to FIG. 3, we can see that $g_r$=5.9r gives relatively long field free regions either side of the central lens allowing for charge tubes 510A, 510B of around 100 mm in length to be employed. Cross sections of the charge tubes 510A, 510B are shown. These charge tubes 510A, 510B present no topological problems for construction and may be easily made using the technique known as wire erosion or Electrical Discharge Machining (EDM), for example. Suitable segmented charge tubes are described with respect to FIG. 8.

FIGS. 5D to 5G depict the CDMS 5 in more detail. In this example, the first electrostatic sector 51A has a deflection angle of $\psi_0$=199.2°. In this example, the first electrostatic sector 51A comprises an outer spherical electrode 51AO, having an internal radius of 23 mm and an external radius of 28 mm, and an inner spherical electrode 51AI, having an external radius of 17 mm, concentric therewith, such that there is a spherically radial gap of 6 mm therebetween. In this example, the outer spherical electrode 51AO and the inner spherical electrode 51AI are respectively provided centrally in similarly square substantially planar frames, machined from UHV compatible electrical conductors such as 304 L or 316 L stainless steel (alternatively gold-coated glass, for example) and optionally electropolished. In this example, the shunt 52A is similarly provided in such a frame. Each frame includes four circular apertures formed proximal corners thereof for mounting on four corresponding insulator (e.g. ceramic such as alumina or Macor (RTM) or polymeric such as PTFE) rods 55A to 55D (55C and 55D not shown), for transversely aligning the outer spherical electrode 51AO, the inner spherical electrode 51AI and the shunt 52A. Insulator spacers 56A mutually space apart axially the outer spherical electrode 51AO and the inner spherical electrode 51AI. The outer spherical electrode 51AO, having a wall thickness of 5 mm, bulges quasi-hemispherically from the respective frame. The solid inner spherical electrode 51AI protrudes quasi-hemispherically from the respective frame, supported by two diametrically opposite supports 51AS, disposed so as to not present an obstruction in the figure of eight ion path IP, as flattened by the einzel lens 54. The dished shunt 52A inner electrode protrudes from the respective frame, supported by two diametrically opposite supports 52AS, generally as described with respect to the supports 51AS for the inner spherical electrode 51AI, thereby providing two quasi-semicircular apertures 521A, 521B (i.e. entrance and exit respectively) of radial width 4 mm.

The performance advantages of the present invention over the state of the art ELIT of reference [3] is shown in Table 1. The CDMS 5 has equivalent angular and spatial acceptance when compared to the ELIT of reference [3] but offers more transients per unit time and superior energy acceptance. This larger energy acceptance can lead to a better resolution/sensitivity characteristic. With prudent upstream beam collimation and an energy spread of 0.5 eV/z, single pass mass resolutions of several thousand are expected for this embodiment.

| Parameter | ELIT of reference [3] | CDMS 5 |
|---|---|---|
| Half TOF 50,000 m/z (s) | 1.25E−04 | 4.30E−04 |
| Transients/ms | 8.00 | 23.26 |
| Charge tube length (mm) | 50 | 2 × 100 |
| Charge tube (mm) | 6.35 | 5 |
| KE | 130 | 130 |
| Energy acceptance (%) | 0.40 | 4 |
| Radial acceptance (mm) | 1 | 1 (Y), 1.5 (Z) |
| Angular acceptance (°) | 2 | 2 |

Table 1: Performance advantages of the CDMS 5 according to an exemplary embodiment compared with the state of the art ELIT of reference [3]. The 23.26 transients per ms is based upon 10 segments of each charge tube. Without segmentation, the number of transients per ms is reduced to 2.326. Even without segmentation, the CDMS 5 is competitive and simpler, for example not requiring an upstream dual HAD to select a narrow window of ion kinetic energies to introduce into the electrostatic sector field ion trap 50. Conversely, even higher numbers of transients may be achieved using a lift device, as described with respect to of FIG. 9.

FIG. 5C is a SIMION simulation of ions for the CDMS 5, after hundreds of turns, without loss of ions. The einzel lens constrains the ion trajectories compared with the SIMION simulation of ions for the CDMS 4, as shown in FIG. 4B.

Figure 6:
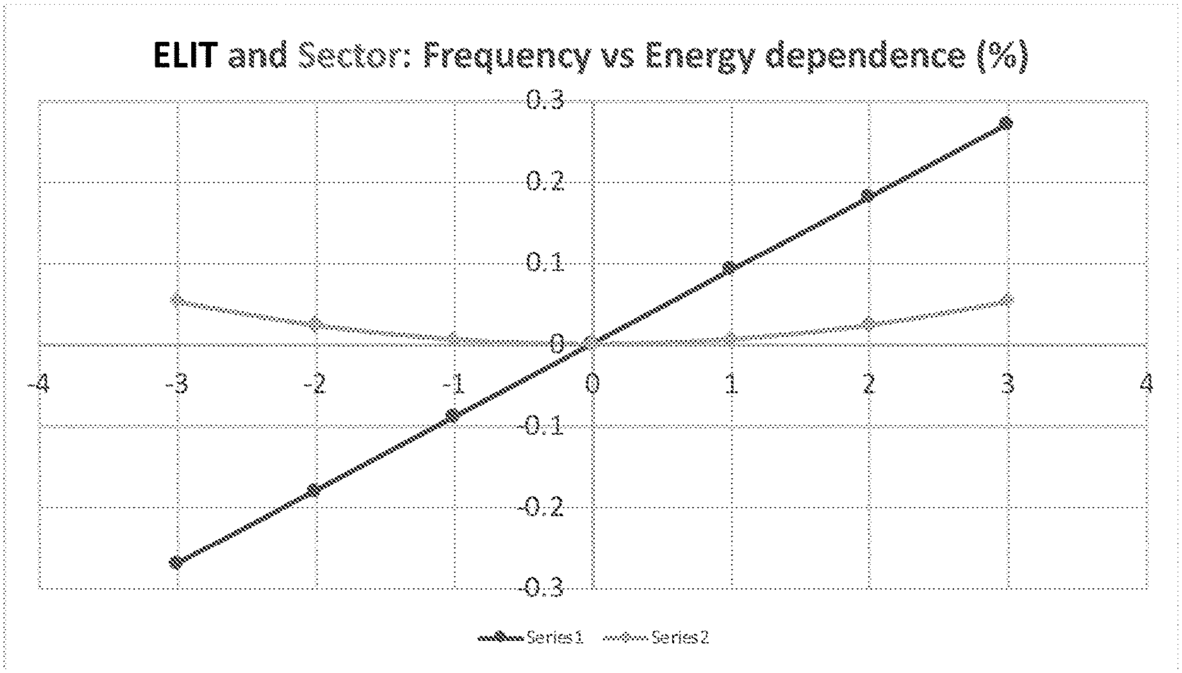
FIG. 6 is a graph of change in frequency (%) as a function of ion energy deviation from ideal (%) for the CDMS of FIGS. 5A to 5C compared with a conventional CDMS.
Figure 7:
FIGS. 7A and 7B schematically depict the advantage of a relatively narrow charge detection tube, to boost intensity of higher harmonics in the Fourier transform, for a CDMS according to an exemplary embodiment.

FIG. 6 is a graph of change in frequency (%) as a function of ion energy deviation from ideal (%) for the CDMS 5 of FIGS. 5A to 5C compared with a conventional CDMS, particularly the CDMS of FIG. 1B. In more detail, SIMION simulations were performed and the energy focussing characteristic of the CDMS 5 was calculated. It was found that the addition of the z lens 54 gave no noticeable deterioration in device resolution. The first order focussing of this geometry is expected to yield a residual aberration that is parabolic in nature and this characteristic shown in FIG. 6. In other words, the electrostatic sector field ion trap 50 of the CDMS 5 is isochronous to first order with a parabolic residual at second order, giving a change in frequency of about 0.05% for an ion energy deviation of ±3%. In comparison, the ELIT trap of reference [3] is not isochronous to first order, instead having a linear residual at first order, giving a change in frequency of about 0.275% for an ion energy deviation of +3% and a change in frequency of about −0.275% for an ion energy deviation of −3%. Hence, the electrostatic sector field ion trap 50 of the CDMS 5 shows a superior tolerance to energy spread compared with the ELIT trap of reference [3], which is one of the main advantages of the present invention.

FIGS. 7A and 7B schematically depict the advantage of a relatively narrow charge detection tube, to boost intensity of higher harmonics in the Fourier transform, for a CDMS according to an exemplary embodiment.

In more detail, a further advantage of the present invention is afforded by the stigmatic or quasi-stigmatic focussing properties of the electrostatic sector field ion trap. These properties mean that the ion beam is confined to a narrow arc as it traverses the analyser. A narrow ion beam means that it is possible to use a similarly narrow charge tube for detection of ions. FIGS. 7A and 7B show how a narrower charge tube gives rise to a sharper transient signal. This signal has increased harmonic content at higher frequencies as a consequence of Fourier theory. Signal to noise ratio of processed waveforms increases with frequency and it is well known that using higher harmonics in Fourier transform mass spectrometry gives improved resolution.

Figure 8:
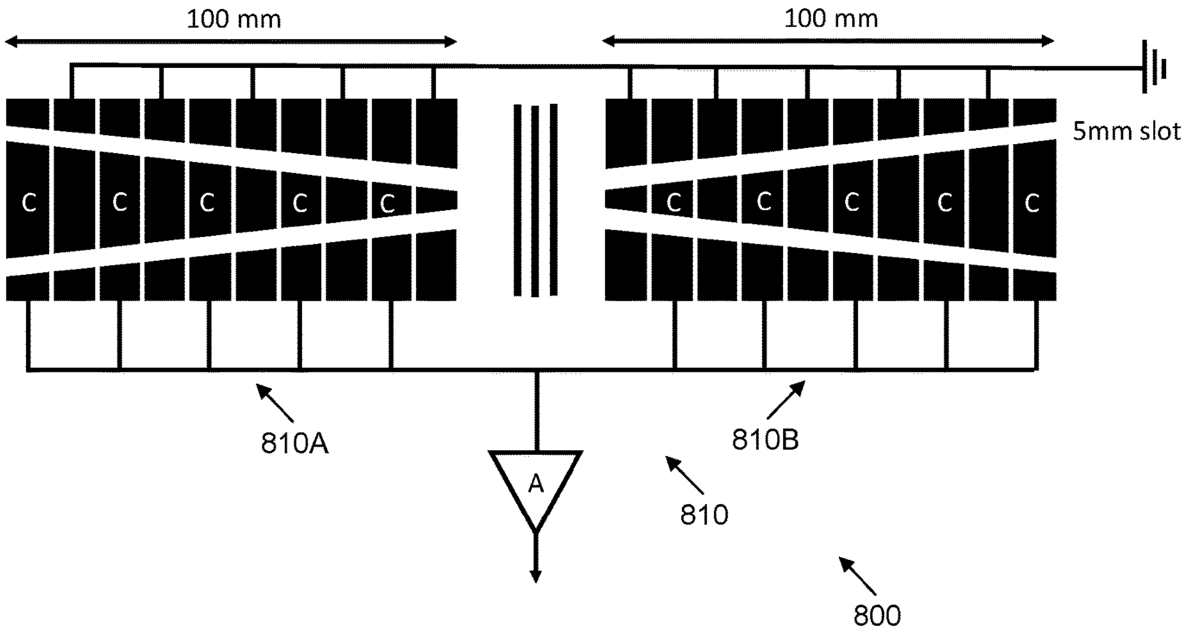
FIG. 8 schematically depicts a segmented charge detection tube, to give an increased number of transients per analyser pass, for a CDMS according to an exemplary embodiment.

FIG. 8 schematically depicts an inductive charge detector 800, generally as described with respect to the inductive charge detectors 400 and 500, comprising a first set of segmented charge detector tubes 810, including a first segmented charge detector tube 810A and a second segmented charge detector tube 810B to give an increased number of transients per analyser pass, for a CDMS according to an exemplary embodiment, such as the CDMS 4 and/or the CDMS 5. In this example, the first segmented charge detector tube 810A and the second segmented charge detector tube 810B are axially segmented, each including 10 segments.

The relatively long charge tubes afforded by the geometry of the CDMS 4 and the CDMS 5, for example, allow axial charge tube segmentation. As a general rule, the induced signal by the moving ion is negligible after it has passed a length of twice the tube width into said tube making an overly long tube wasteful of useful signal. FIG. 8 shows how segmentation may be employed to give a greater number of transient signals per pass. Such segmentation has been proposed before [11] with the use of multiple amplifiers. It is known that such segmentation will still provide an advantage with the use of a single amplifier as connected in FIG. 8. This principle was demonstrated in Fourier Transform Ion Cyclotron Resonance instruments, see for example, the work of Nikolaev [12].

Furthermore, the three-dimensional figure of eight path of the electrostatic sector field ion trap 40 and even the constrained three-dimensional figure of eight path of the electrostatic sector field ion trap 40 additionally and/or alternatively allow radial charge tube segmentation, as described previously.

Figure 9:
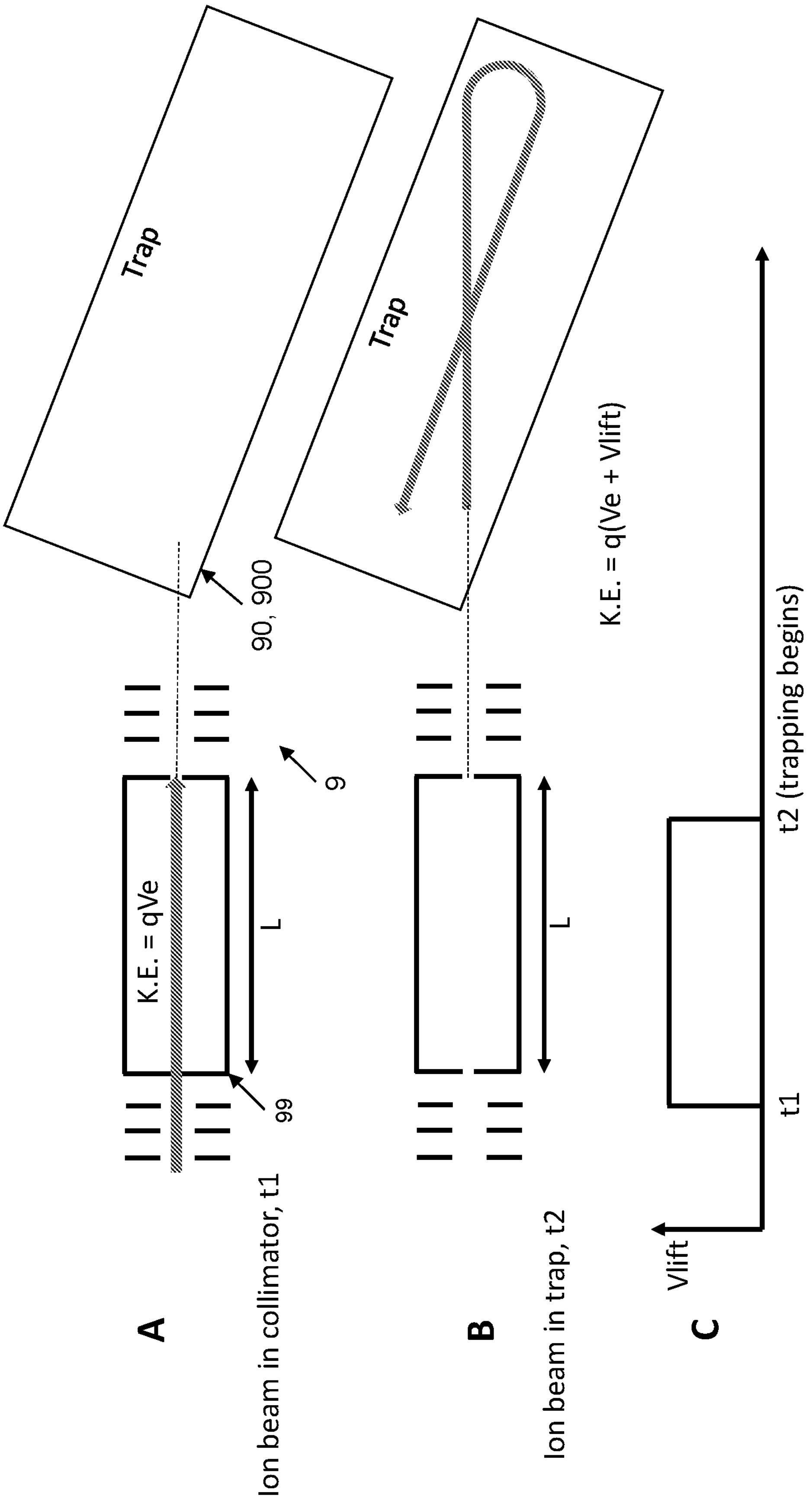
FIG. 9 schematically depicts a CDMS according to an exemplary embodiment, comprising a lift device.

FIG. 9 schematically depicts a CDMS 9 according to an exemplary embodiment, comprising a lift device 99. The CDMS 9 this generally is described with respect to the CDMS 5. The electrostatic sector field ion trap 90 and the inductive charge detector 900 are schematically depicted as a box, which may represent the electrostatic sector field ion trap 50 and the inductive charge detector 500 of the CDMS 5, for example. In order to increase throughput of an electrostatic sector field ion trap of a CDMS according to an exemplary embodiment, it is desirous to operate at relatively high ion beam kinetic energies, for example in a range from 100 eV to 1,000 eV. The advantages of operating at high energies are faster acquisitions and lower aberrations in respect of energy and angle. A first way to increase kinetic energy is to float the inductive charge detector 900 at a high accelerating potential (negative voltage for positive ions), as is commonly done for TOF analysers. However, in the case of CDMS, any noise present on the power supply will mask the very low induced signals of the CDMS analyser. Therefore, inductive charge detectors operated at ground potential are much preferred, as they can be effectively shielded from noise by adjacent grounded plates and coupled directly into the amplifier stage (which is a virtual earth). A second way to increase the kinetic energy is to float the upstream ion optical components by an elevated potential. This is known to be technically problematic and can cause electrical discharge of the components due to field breakdown arising from Paschen's Law. This effect is particularly problematic in the few mBar region, where RF ion guides are often employed, thereby limiting applied voltages to about 200 V and in turn, kinetic energy of the ions. A solution to the problem is to pulse a tube (such as a collimator) (i.e. the lift device 99) to a high potential during the fill up part of the CDMS cycle. In this way, problematic electrical discharges can be avoided as the collimator (or other ion optical elements) are operated at a high vacuum where voltage breakdown does not occur. FIG. 9 shows how such an upstream collimator 99 may be operated in a pulsed manner to increase the kinetic energy of the ions in the electrostatic sector field ion trap 90. Ions fill up a collimator tube 99 at some predetermined energy $qV_e$. At a time t1, when the collimator tube 99 is full of ions, it is pulsed to an increased potential, $V_{lift}$. This increases the energy of the ions as they enter the trap 90 as a pencil of spatially-separated ions, which is still operated with ground potential charge tubes 900 and shields (i.e. shunts). It should be understood that the electrostatic sector, through which the ions are introduced, is transiently also at ground potential while the ions are being introduced. The trap 90 is closed at a time t2, and the trapping cycle begins. Note that the sector electrodes, during the trapping cycle, must have increased voltages $V_i$ related to the ion energy by the following equation:

$$V_i = 2\left(\frac{R_0}{R_i} - 1\right)T_o$$

where i=1, 2 and the kinetic energy is $T_o$ in electron volts which equals $(V_e+V_{lift})$.

Figure 10:
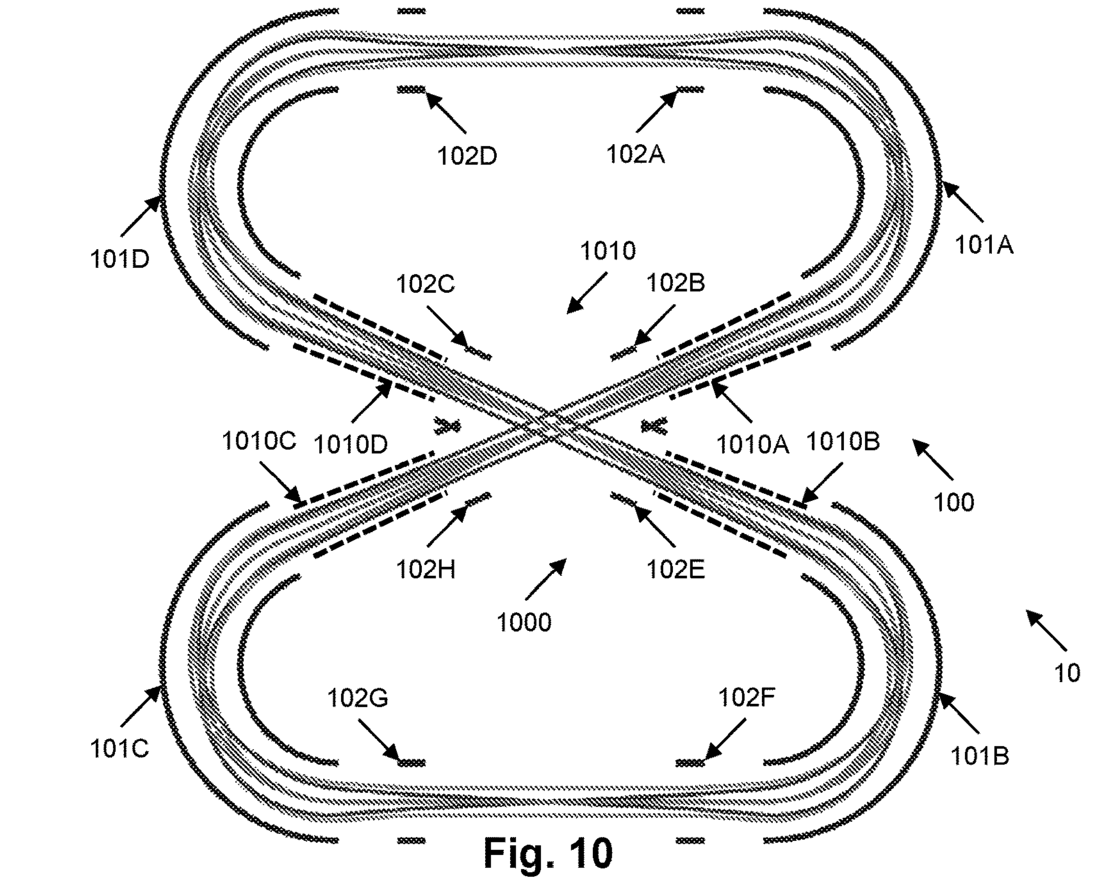
FIG. 10 schematically depicts a CDMS according to an exemplary embodiment.

FIG. 10 schematically depicts a CDMS 10 according to an exemplary embodiment. In this example, the CDMS 10 comprises: an electrostatic sector field ion trap 100 and an inductive charge detector 1000; wherein the electrostatic sector field ion trap 100 is configured to define, at least in part, an ion path via the inductive charge detector 1000.

In this example, the electrostatic sector field ion trap 100 is as described with respect to the MULTUM of reference [15]. In this example, the electrostatic sector field ion trap 100 comprises a set of electrostatic sectors 101, including a four similar cylindrical electrostatic sectors 101A to 101D, each having a deflection angle of $\psi_0$=156.87° and a deflection radius of 50 mm. In this example, the electrostatic sector field ion trap 100 comprises a set of electric quadrupole lenses 102, including eight electric quadrupole lenses 102A to 102H. In this example, the basic unit comprises four drift spaces, two electric quadrupole lenses and a cylindrical electrostatic sector. In this example, the electrostatic sector field ion trap 100 is isochronous to first order with respect to energy. In this example, the ion path defined by the electrostatic sector field ion trap 100 includes a crossover and has three fold planar symmetry therethrough. Ion injection may be by deflection, as described with respect to reference [14], or via an ion inlet.

In this example, the inductive charge detector 1000, generally as described with respect to the inductive charge detectors 400, 500 and 800, comprises a first set of segmented charge detector tubes 1010, including four segmented charge detector tubes 1010A, 1010B, 1010C, 1010D.

Figure 11:
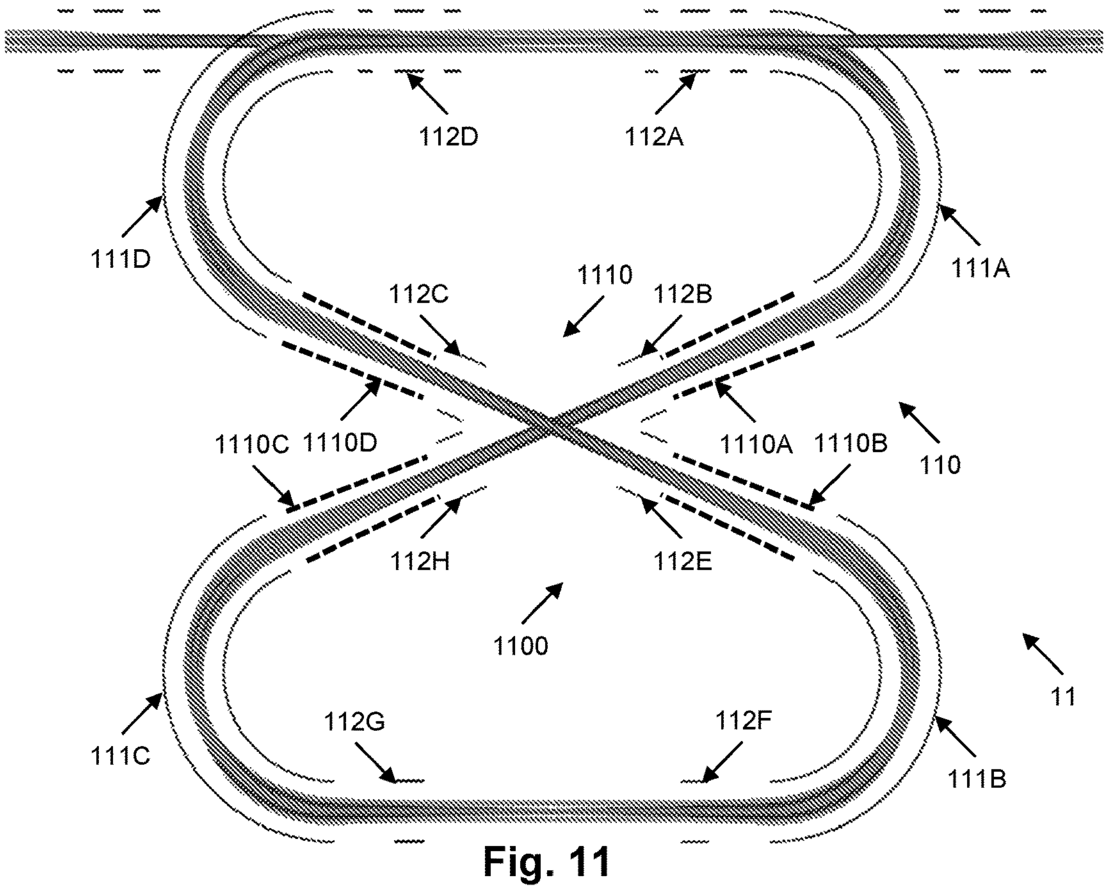
FIG. 11 schematically depicts a CDMS according to an exemplary embodiment.

FIG. 11 schematically depicts a CDMS 11 according to an exemplary embodiment. In this example, the CDMS 11 comprises: an electrostatic sector field ion trap 110 and an inductive charge detector 1100; wherein the electrostatic sector field ion trap 110 is configured to define, at least in part, an ion path via the inductive charge detector 1100.

In this example, the electrostatic sector field ion trap 110 is as described with respect to the MULTUM Linear plus of reference [15] and is generally as described with respect to the electrostatic sector field ion trap 100, having additional electric quadrupole lenses to enable ion injection (and ejection).

In this example, the inductive charge detector 1100, generally as described with respect to the inductive charge detector 1000, comprises a first set of segmented charge detector tubes 1110, including four segmented charge detector tubes 1110A, 1110B, 1110C, 1110D.

Figure 12:
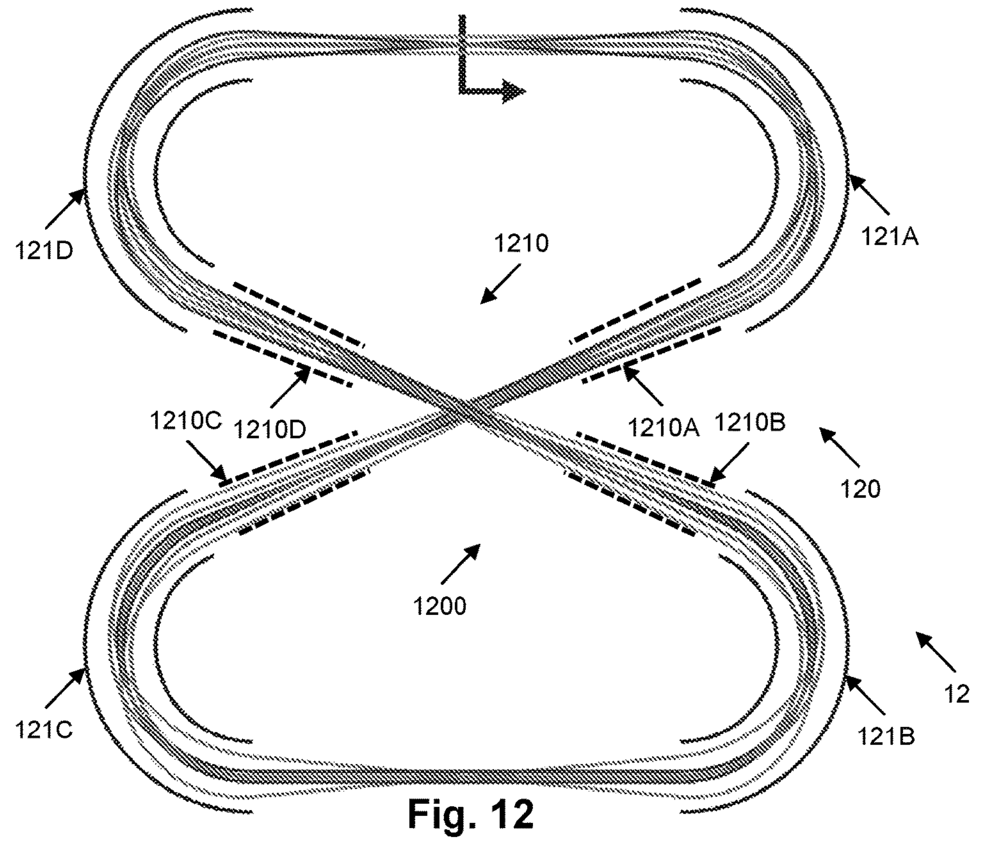
FIG. 12 schematically depicts a CDMS according to an exemplary embodiment.

FIG. 12 schematically depicts a CDMS 12 according to an exemplary embodiment. In this example, the CDMS 12 comprises: an electrostatic sector field ion trap 120 and an inductive charge detector 1200; wherein the electrostatic sector field ion trap 120 is configured to define, at least in part, an ion path via the inductive charge detector 1200.

In this example, the electrostatic sector field ion trap 120 is as described with respect to the MULTUM of reference [15]. In this example, the electrostatic sector field ion trap 120 comprises a set of electrostatic sectors 121, including four similar toroidal electrostatic sectors 121A to 121D, each having a deflection angle of $\psi_0$=157.10°, a deflection radius of 50 mm and a C1 value of 0.0337. In this example, the electrostatic sector field ion trap 120 does not comprise electric quadrupole lenses. In this example, the basic unit comprises two drift spaces and a toroidal electrostatic sector. In this example, the electrostatic sector field ion trap 120 is isochronous to first order with respect to energy. In this example, the ion path defined by the electrostatic sector field ion trap 120 includes a crossover and has three fold planar symmetry therethrough. Ion injection may be by deflection, as described with respect to reference [14], or via an ion inlet.

In this example, the inductive charge detector 1200, generally as described with respect to the inductive charge detector 1000, comprises a first set of segmented charge detector tubes 1210, including four segmented charge detector tubes 1210A, 1210B, 1210C, 1210D.

Figure 13:
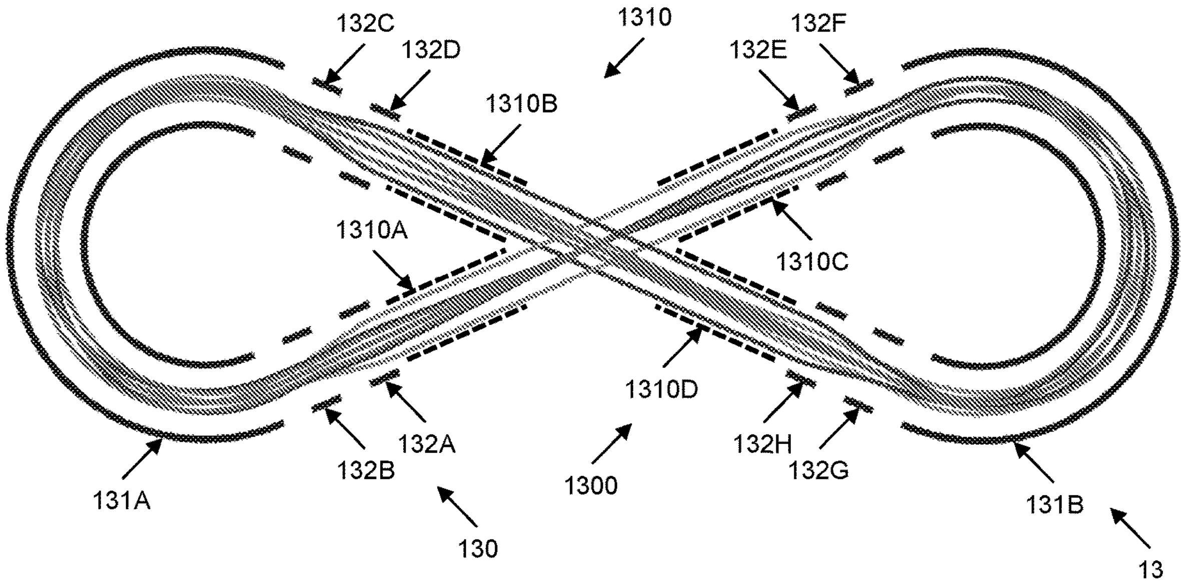
FIG. 13 schematically depicts a CDMS according to an exemplary embodiment.

FIG. 13 schematically depicts a CDMS 13 according to an exemplary embodiment. In this example, the CDMS 13 comprises: an electrostatic sector field ion trap 130 and an inductive charge detector 1300; wherein the electrostatic sector field ion trap 130 is configured to define, at least in part, an ion path via the inductive charge detector 1300.

In this example, the electrostatic sector field ion trap 130 is as described with respect to the planar figure of eight of reference [15]. In this example, the electrostatic sector field ion trap 130 comprises a set of electrostatic sectors 131, including two similar cylindrical electrostatic sectors 131A to 131B, each having a deflection angle $\psi_0$=227.95° and a deflection radius of 50 mm. In this example, the electrostatic sector field ion trap 130 comprises a set of electric quadrupole lenses 132, including eight electric quadrupole lenses 132A to 132H. In this example, the basic unit comprises six drift spaces, four electric quadrupole lenses and a cylindrical electrostatic sector. In this example, the electrostatic sector field ion trap 130 is isochronous to first order with respect to energy. In this example, the ion path defined by the electrostatic sector field ion trap 130 includes a crossover and has three fold planar symmetry therethrough. Ion injection may be by deflection, as described with respect to reference [14], or via an ion inlet. Since the electrostatic sector field ion trap 130 already has a planar figure of eight geometry, in contrast with the three dimensional figure of eight geometry of the electrostatic sector field ion traps 30, 40 and 50, the topological problem as described previously does not arise.

In this example, the inductive charge detector 1300, generally as described with respect to the inductive charge detector 1000, comprises a first set of segmented charge detector tubes 1310, including four segmented charge detector tubes 1310A, 1310B, 1310C, 1310D.

Figure 14:
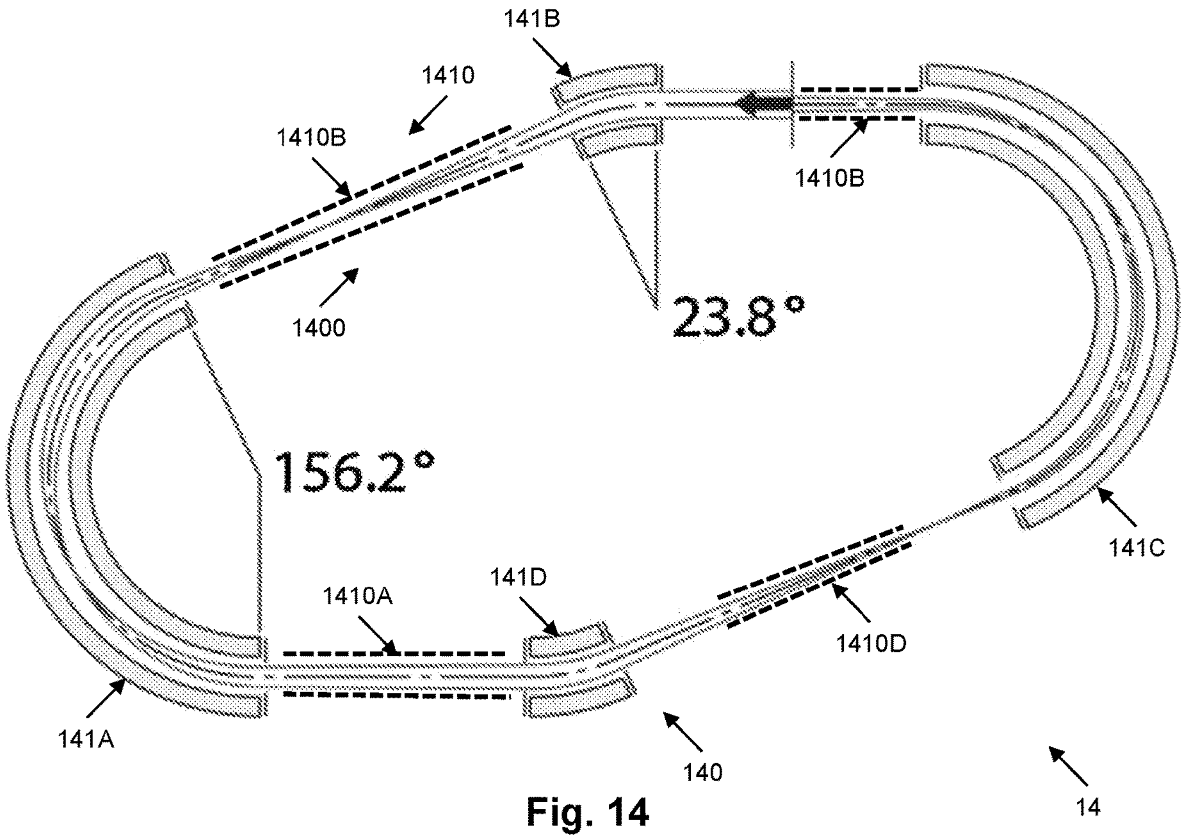
FIG. 14 schematically depicts a CDMS according to an exemplary embodiment.

FIG. 14 schematically depicts a CDMS 14 according to an exemplary embodiment. In this example, the CDMS 14 comprises: an electrostatic sector field ion trap 140 and an inductive charge detector 1400; wherein the electrostatic sector field ion trap 140 is configured to define, at least in part, an ion path via the inductive charge detector 1400.

In this example, the electrostatic sector field ion trap 140 is as described with respect to the rhomboid of reference [16]. In this example, the electrostatic sector field ion trap 140 comprises a set of electrostatic sectors 141, including two double toroidal electrostatic sectors 142A, 142B, each including a first toroidal electrostatic sector 141A having a deflection angle of $\psi_0$=156.2° and a second toroidal electrostatic sector 141A having a deflection angle of $\psi_0$=23.8°. In this example, the electrostatic sector field ion trap 120 does not comprise electric quadrupole lenses. In this example, the basic unit comprises three drift spaces and two toroidal electrostatic sectors. In this example, the electrostatic sector field ion trap 140 is isochronous to first order with respect to energy. In this example, the ion path defined by the electrostatic sector field ion trap 140 does not include a crossover and has one plane of symmetry. Ion injection may be by deflection, as described with respect to reference [14], or via an ion inlet.

In this example, the inductive charge detector 1400, generally as described with respect to the inductive charge detector 1000, comprises a first set of segmented charge detector tubes 1410, including four segmented charge detector tubes 1410A, 1410B, 1410C, 1410D.

It should be understood that any of the CDMS 4 to 9 interface with the hexapole 3 of region III of the CDMS 10, thereby replacing region IV of CDMS 10, or interface with focusing lens 4 of region IV, thereby replacing the HAD 6 and modified cone trap with image charge detector 7 of region IV, wherein the orthogonal TOF-MS 5 is optionally removed.

Figure 15:
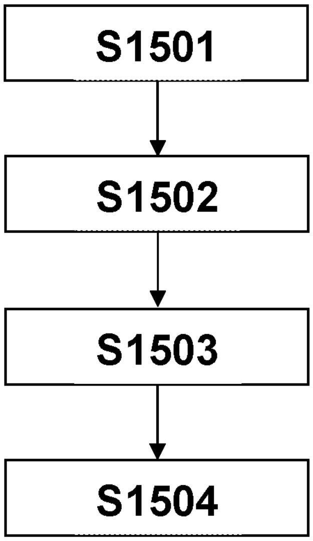
FIG. 15 schematically depicts a method according to an exemplary embodiment.

FIG. 15 schematically depicts a method according to an exemplary embodiment. Particularly, the method is of determining masses of ions. The method comprises moving, by an electrostatic sector field ion trap, an ion around an ion path defined, at least in part, thereby, via an inductive charge detector (S1501). The method comprises inducing, by the moving ion, a signal in the inductive charge detector (S1502). The method comprises determining a mass of the ion using the induced signal (S1503). The method may comprise any of the steps described herein.

Figure 16:
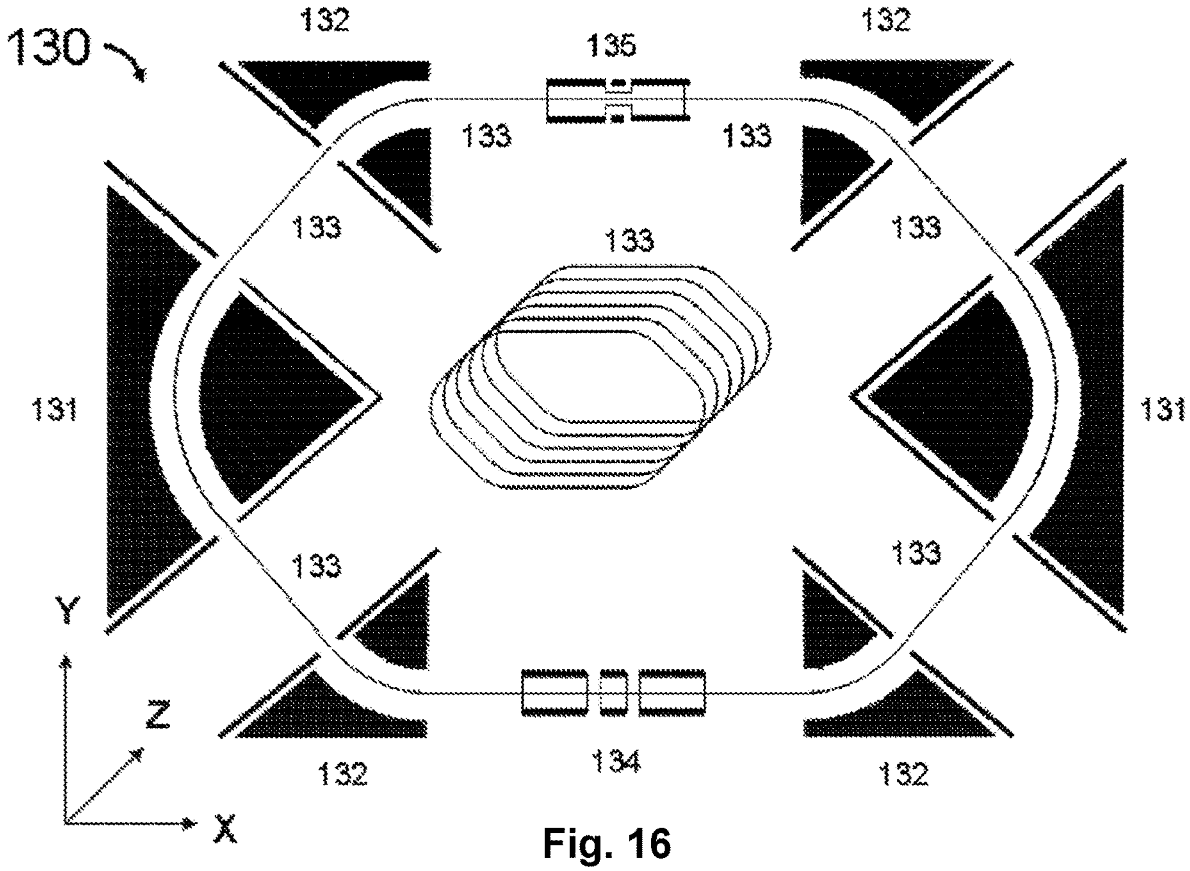
FIG. 16 schematically depicts a conventional resonance mass separator.

FIG. 16 schematically depicts a conventional resonance mass separator (RMS), as described in reference [19]. In more detail, FIG. 16 shows a SIMION model and spiral ion trajectories in a resonance mass separator, constructed of cylindrical sectors and sets of periodic einzel and quadrupolar lens. The model RMS 130 is constructed of cylindrical sectors 131 and 132 with different radii, similar to Sakurai et al (Nucl. Instrum. Meth. A427, 1999, 182-186). Cylindrical sectors generate substantially two-dimensional electrostatic field in the X-Y-plane. Ion path 133 is arranged spiral by injecting ion beam (or gently bunched ion packets) at small angle to the X-Y-plane and by confining ions with a set of periodic einzel lens 134 and with periodic quadrupolar lens 135. Ions follow a spiral ion path 133 which is composed of the curved oval mean ion path projection in the X-Y-plane and of relatively slow ion drift in the drift Z-direction. Periodic lens 134 and 135 do confine ion beam along the spiral ion path in spite of moderate ion packet divergence. Parameters of the modeled RMS are: ion trajectory is inscribed into 170×250 mm cell, ion path per revolution is 700 mm, Z-length is 200 mm to fit in 40 revolutions, forming overall L=28 m total flight path. Sectors are energized to pass 6 keV ion beams, so that target mass at m/z=1000 pass single revolution in $T_0$=20 µs and through the RMS in 800 us. Ion beam parameters are: 1 mm beam diameter, 4 mrad angular divergence, and FWHM=20 eV energy spread (Gauss distribution), which is excessive compared to ion beam emittance which could be obtained past gaseous RF guides. If no AC excitation is applied, ions of 1000 amu do pass through the RMS without losses. The AC excitation $$V = V_0^* \sin[2\pi(N+0.5)/T_0 + \Phi_0]$$

is then applied to quadrupolar lens 135, having 4 mm aperture and 4 mm effective length, accounting fringing fields. When AC signal is applied, the separator does filter multiple m/z bands, whose shape depends on the AC amplitude $V_0$ and frequency F=(N+0.5)/$T_0$.

Figure 17A:
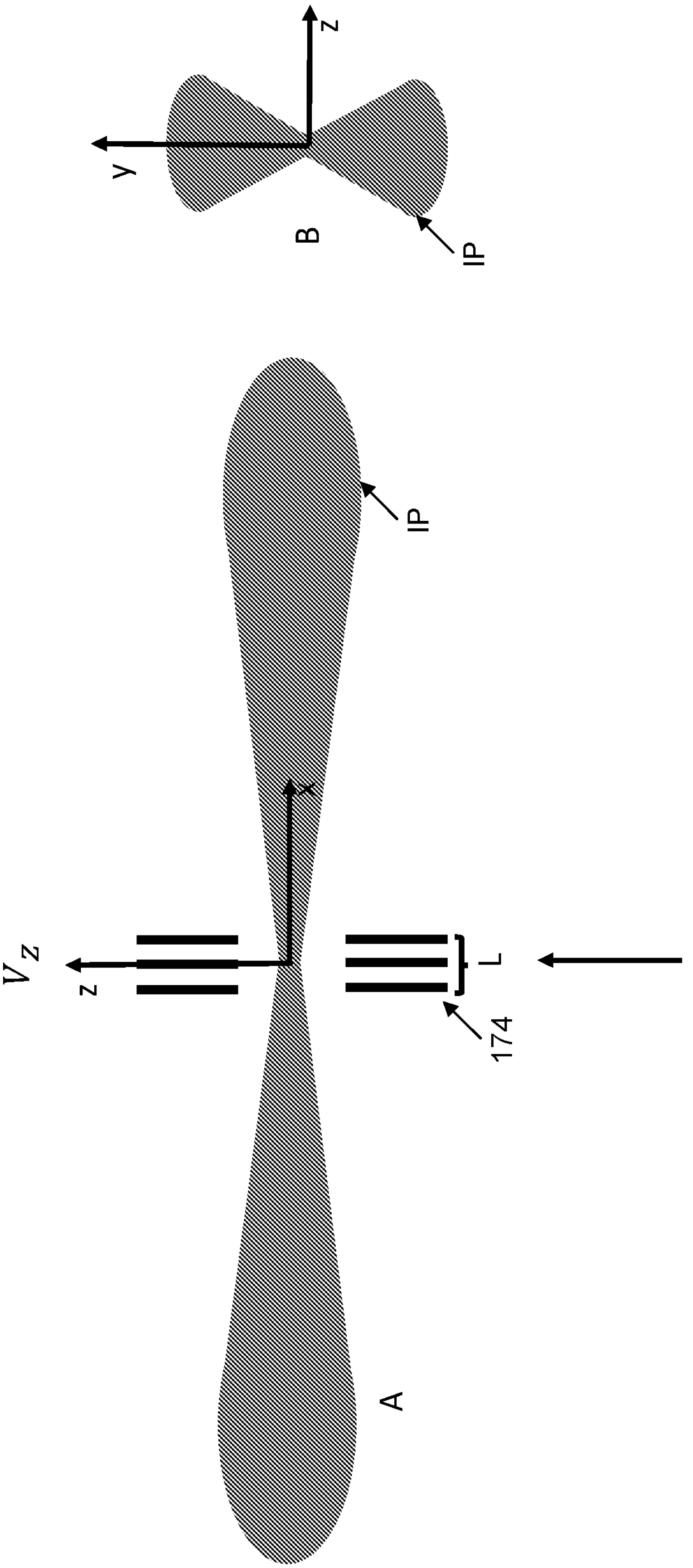
FIG. 17A schematically depicts elevation views, from the side and the end, of the locus of ion trajectories of a CDMS according to an exemplary embodiment, including an ion isolating optical element at the origin, upon applying a voltage on a lens thereof to confine ions in the axial (z) dimension.
Figure 17B:
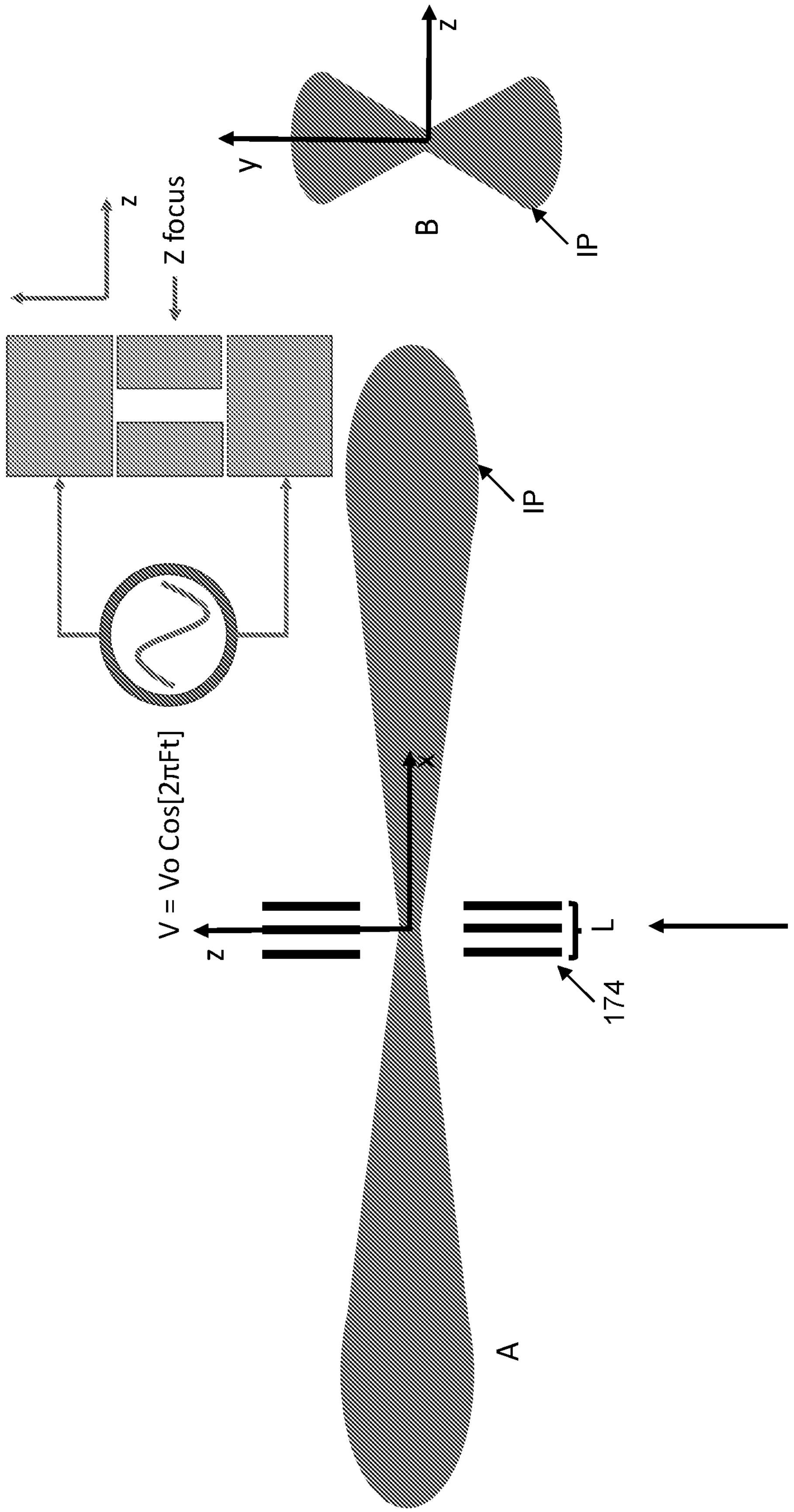
FIG. 17B schematically depicts elevation views, from the side and the end, of the locus of ion trajectories upon applying an isolation voltage on the lens.
Figure 17C:
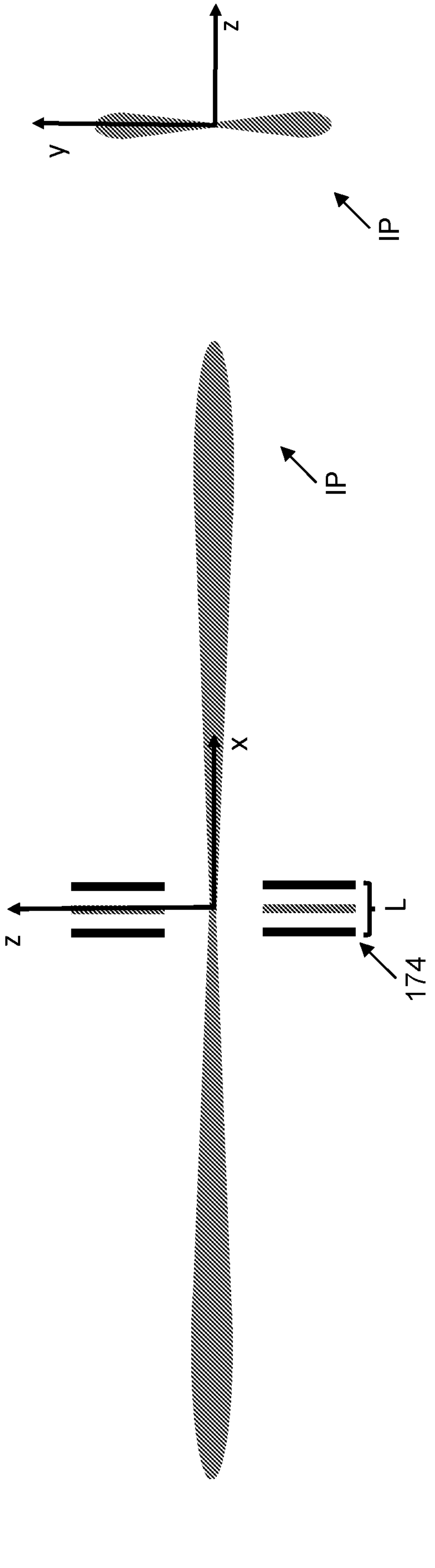
FIG. 17C schematically depicts elevation views, from the side and the end, of the locus of ion trajectories upon subsequently applying a voltage on the lens to further confine ions in the axial (z) dimension.

FIGS. 17A to 17C schematically depict a CDMS 17 according to an exemplary embodiment. The CDMS 17 is generally as described with respect to the CDMS 4 and further comprises a fragmentation device (not shown) and an ion isolating optical element at the origin. The central element of the focussing lens is modified, compared with the corresponding focussing element of the CDMS 4, to allow introduction of the high frequency deflection field. The Z focussing capability of the lens required for efficient trapping in this geometry is still retained, but an additional deflection/focussing field is introduced in the orthogonal Y direction. In order to perform tandem mass spectrometry, it is necessary to first identify the target species of interest to isolate, this is the normal voltage configuration for CDMS as shown in FIG. 17A. This is performed on a fill by fill basis. In order to achieve the highest possible mass measurement precision for CDMS, the are allowed ions to perform many round trips of the analyser in order to ascertain the frequency (a function of m/z) and intensity (a function of signal intensity). Once the desired precursor mass is identified, an appropriate oscillating voltage of the form:

$$V = V_0 \cos[2\pi F t]$$

is applied to the central lens plate as shown in FIG. 17B. The time taken to perform the isolating step will depend on the resolution of separation required. This resolution may be determined by the closest distance in terms of m/z dependent oscillation frequencies for the different species contained in the trap. Once the chosen mass species has been isolated, knowledge of its frequency and phase of oscillation allows switching of the trap electrodes to direct ions out of the trap along the optic axis of the ions. The DC voltage on the central lens may be increased to confine ions more tightly to the "Z" axis (FIG. 17C.) in order that they may be accurately directed out of the trap when the sector electrodes are switched. Ions may be sent back upstream or downstream to the external fragmentation device. Fragmentation devices may be provided for the CDMS 5, 10, 11, 12, 13, 14 and 16, mutatis mutandis.

Figure 18:
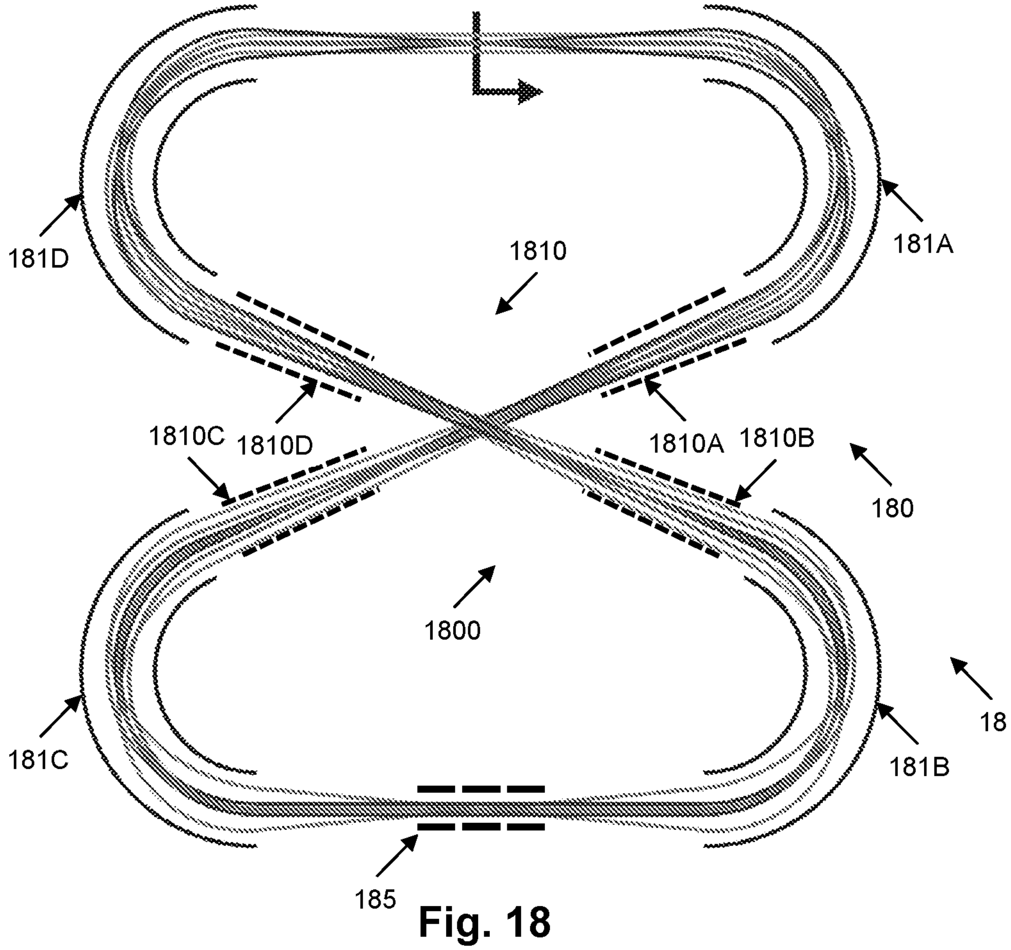
FIG. 18 schematically depicts a CDMS 18 according to an exemplary embodiment.

FIG. 18 schematically depicts a CDMS 18 according to an exemplary embodiment. The CDMS 18 is generally as described with respect to the CDMS 12 and further comprises a fragmentation device 185. In this example, the electrostatic sector field ion trap 180 is configured to define, at least in part, the ion path via the fragmentation device 185. Fragmentation devices may be provided for the CDMS 4, 5, 10, 11, 13, 14 and 16, mutatis mutandis.

Figure 19:
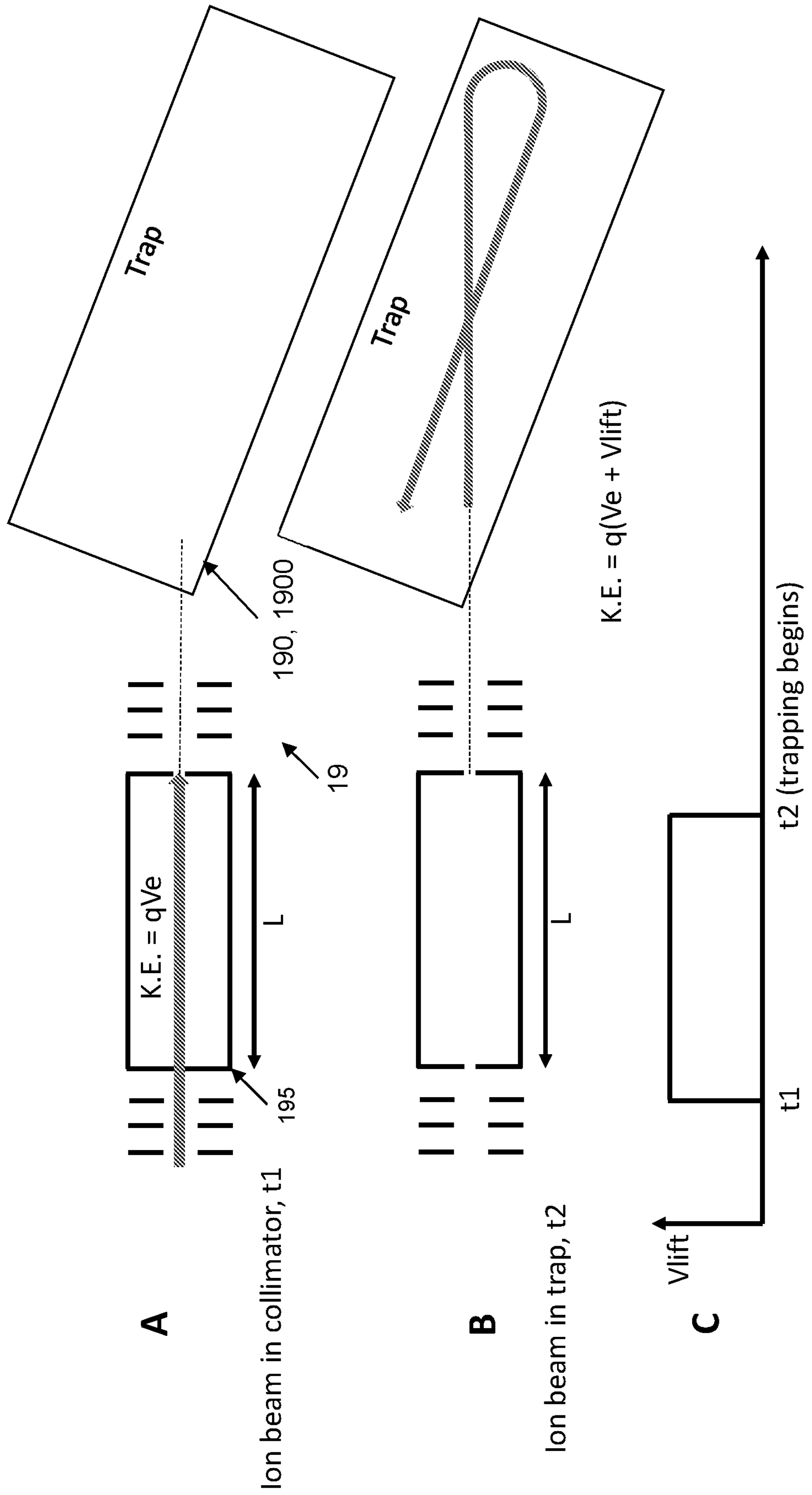
FIG. 19 schematically depicts a CDMS 18 according to an exemplary embodiment.

FIG. 19 schematically depicts a CDMS 19 according to an exemplary embodiment. The CDMS 19 is generally as described with respect to the CDMS 17, wherein the fragmentation device 195 further comprises a lift device as described with the lift device 99 of the CDMS 9. Hence, isolated ions are thus sent back upstream to the external fragmentation device 195, fragmented therein and the product ions introduced into the ion path analogously to the product ions.

Although a preferred embodiment has been shown and described, it will be appreciated by those skilled in the art that various changes and modifications might be made without departing from the scope of the invention, as defined in the appended claims and as described above.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the steps of any method or process so disclosed, may be combined in any combination, except combinations where at most some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims and drawings), or to any novel one, or any novel combination, of the steps of any method or process so disclosed.

REFERENCES

[1] Charge detection mass spectrometry for single ions with a limit of detection of 30 charges—International Journal of Mass Spectrometry 345-347 (2013) 153-159

[2] Charge Detection Mass Spectrometry with Almost Perfect Charge Accuracy—Anal. Chem. 2015, 87, 10330-10337

[3] Optimized Electrostatic Linear Ion Trap for Charge Detection Mass Spectrometry—J. Am. Soc. Mass Spectrom. (2018) October; 29(10):2086-2095

[4] Multiple-Focusing Time-of-Flight Mass Spectrometers Part II. TOFMS with Equal Energy Acceleration—International Journal of Mass Spectrometry and Ion Physics, 9 (1972): 357-373

[5] TOF-SIMS: Materials Analysis by Mass Spectrometry ISBN: 978-1-906715-17-5

[6] Orthogonal acceleration time-of-flight mass spectrometry—Mass Spectrom Rev. 2000 March-April; 19(2):65-107

[7] Energy-Isochronous Time-of-Flight Mass Spectrometers—Proceedings of the NATO Advanced Study Institute on Mass Spectrometry in Biomolecular Sciences Laceo Ameno, Ischia, Italy Jun. 2~Jul. 5, 1993, P111-146

[8] U.S. Pat. No. 9,082,604

[9] Advances in IMAGING and ELECTRON PHYSICS—Mikhail Yavor—Optics of Charged Particle Analysers Volume 157 p230

[10] SIMION© 2003-2019 Scientific Instrument Services Inc

[11] WO 2012/083031 A1

[12] Analysis of harmonics for an elongated FTMS cell with multiple electrode detection—International Journal of Mass Spectrometry and Ion Processes, 157/158 (1996): 215-232

[13] U.S. Pat. No. 6,300,625

[14] Sakurai T, Nakabishi H, Hiasa T, Okanishi K. Nucl. Instrum. Methods A 1999; 427: 182.

[15] Multi-turn time-of-flight mass spectrometers with electrostatic sectors, Michisato Toyoda, Daisuke Okumura, Morio Ishihara, Itsuo Katakuse, J. Mass Spectrom. 2003; 38: 1125-1142, https://doi.org/10.1002/jms.546

[16] M. Nishiguchi, et al., Journal of the Mass Spectrometry Society of Japan 44 (2009) 594.

[17] Benner, W. H.: A gated electrostatic ion trap to repetitiously measure the charge and M/Z of large electrospray ions. Anal. Chem. 69, 4162-4168 (1997)

[18] Infrared multiphoton dissociation tandem charge detection-mass spectrometry of single megadalton electrosprayed ions. Review of Scientific Instruments 82, 084104 (2011)

[19] WO2017042665

The invention claimed is:

1. A charge detection mass spectrometer (CDMS) comprising:

an electrostatic sector field ion trap and an inductive charge detector, wherein the electrostatic sector field ion trap comprises a set of electrostatic sectors, including a first electrostatic sector and a second electrostatic sector, wherein the first electrostatic sector and the second electrostatic sector are mutually spaced apart by a field-free region traversed by an ion path, wherein the inductive charge detector is disposed in the field-free region, and wherein the electrostatic sector field ion trap is configured to define, at least in part, the ion path via the inductive charge detector;

a fragmentation device; and an ion isolating optical element configured to isolate a precursor ion for fragmentation by the fragmentation device.

2. The CDMS according to claim 1, wherein the electrostatic sector field ion trap is configured to move an ion around the ion path defined, wherein moving the ion induces signals in the inductive charge detector, and wherein the CDMS is configured to determine a mass to charge ratio and a charge of the ion using the induced signals, and to determine the mass of the ion based on the determined mass to charge ratio and charge.

3. The CDMS according to claim 2, wherein the CDMS is configured to determine a mass of a precursor ion and the fragmentation device is configured to fragment the same precursor ion.

4. The CDMS according to claim 1, wherein the electrostatic sector field ion trap is configured to define, at least in part, the ion path via the fragmentation device.

5. The CDMS according to claim 1, further comprising means for ejecting ions from the ion path into the fragmentation device, wherein the fragmentation device is external to the electrostatic sector field ion trap.

6. The CDMS according to claim 5, wherein the electrostatic sector field ion trap comprises an ion outlet for exit of ejected ions therethrough from the ion path.

7. The CDMS according to claim 1, wherein the fragmentation device is configured to trap the precursor ion and/or a product ion thereof.

8. The CDMS according to claim 1, wherein the fragmentation device is configured to increase an ion energy of the product ion to be introduced into the ion path.

9. The CDMS according to claim 7, wherein the fragmentation device is configured to introduce the product ion into the ion path by pulsing the product ion into the ion path.

10. The CDMS according to claim 1, wherein the ion isolating optical element comprises and/or is a quadrupole lens, an einzel lens, a deflection plate; and/or is provided by the electrostatic sector field ion trap; or a combination thereof.

11. The CDMS according to claim 1, wherein the electrostatic sector field ion trap is isochronous.

12. The CDMS according to claim 1, wherein the ion path defined by the electrostatic sector field ion trap includes a crossover.

13. The CDMS according to claim 1, wherein the electrostatic sector field ion trap comprises an ion inlet for introduction of ions therethrough into the ion path.

14. The CDMS according to claim 1, wherein the inductive charge detector comprises a first set of charge detector tubes, including a first charge detector tube, optionally—wherein the first charge detector tube, having a length L and a width W, has a ratio of the length L to the width W in a range from 3:2 to 5:2, for example 2:1.

15. The CDMS according to claim 1, comprising a set of electrostatic focus lenses, including a first focus lens, arranged to constrain, at least in part, the ion path in a first dimension, preferably—wherein the first dimension is orthogonal to a direction of the ion path via the inductive charge detector.

16. The CDMS according to claim 1, wherein the inductive charge detector is configured to operate at ground potential.

17. The CDMS according to claim 1, comprising a lift device configured to increase an ion energy of ions to be introduced into the ion path, for example by pulsing the ions into the ion path, and wherein the lift device is configured to trap the ions to be introduced into the ion path.

18. A method of determining masses of ions, the method comprising:

providing a charge detection mass spectrometer comprising an electrostatic sector field ion trap and an inductive charge detector, wherein the electrostatic sector field ion trap comprises a set of electrostatic sectors, including a first electrostatic sector and a second electrostatic sector, wherein the first electrostatic sector and the second electrostatic sector are mutually spaced apart by a field-free region traversed by an ion path, wherein the inductive charge detector is disposed in the field-free region, and wherein the electrostatic sector field ion trap is configured to define, at least in part, the ion path via the inductive charge detector;

moving, by the electrostatic sector field ion trap, a precursor ion around the ion path defined, at least in part, thereby, via the inductive charge detector;

inducing, by the moving precursor ion, a signal in the inductive charge detector;

determining a mass of the precursor ion using the induced signal;

fragmenting the isolated precursor ion and providing a product ion therefrom; and determining a mass of the product ion.

* * * * *